US006153372A

United States Patent [19]

Arai et al.

[11] Patent Number: 6,153,372

[45] **Date of Patent: *Nov. 28, 2000**

[54] PHOTOTHERMOGRAPHIC ELEMENT

[75] Inventors: Tsutomu Arai; Ryo Suzuki; Takahiro Goto, all of Kanagawa, Japan

[73] Assignee: Fuji Photo Film Co., Ltd., Kanagawa, Japan

[ * ] Notice: This patent is subject to a terminal disclaimer.

[21] Appl. No.: 09/165,347

[22] Filed: Oct. 2, 1998

[30] Foreign Application Priority Data

| | | | |
|---|---|---|---|
| Oct. 3, 1997 | [JP] | Japan | 9-287891 |
| Mar. 25, 1998 | [JP] | Japan | 10-078168 |

[51] Int. Cl.[7] ........ C03C 4/04

[52] U.S. Cl. ........ 430/619; 430/611; 430/613; 430/615; 430/944

[58] Field of Search ........ 430/619, 611, 430/613, 615, 944

[56] References Cited

U.S. PATENT DOCUMENTS

| | | | |
|---|---|---|---|
| 4,607,006 | 8/1986 | Hirano et al. | 430/572 |
| 5,541,054 | 7/1996 | Miller et al. | 430/619 |
| 5,851,755 | 12/1998 | Uytterhoeven et al. | 430/619 |
| 5,869,229 | 2/1999 | Okada et al. | 430/619 |

FOREIGN PATENT DOCUMENTS

| | | |
|---|---|---|
| 0559228A1 | 9/1993 | European Pat. Off. . |
| 0821270A1 | 1/1998 | European Pat. Off. . |
| 2063500 | 6/1991 | United Kingdom . |

*Primary Examiner*—Thorl Chea

*Attorney, Agent, or Firm*—Birch, Stewart, Kolasch & Birch, LLP

[57] ABSTRACT

A photothermographic element contains a non-photosensitive organic silver salt, a photosensitive silver halide which has been formed independent of the non-photosensitive organic silver salt, and a binder. An image forming layer contains the photosensitive silver halide, a latex of a polymer having a Tg of −30° C. to 40° C. as a main binder, and a compound of formula (I):

(I)

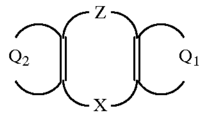

wherein X is —N═, —N(R)—, —0—, or —S—, wherein R is hydrogen, hydroxyl, aliphatic hydrocarbon, aryl or heterocyclic group, Z is a single bond or a group of atoms necessary to form a 5- to 7-membered ring with X, and $Q_1$ and $Q_2$ each are a group of atoms necessary to form an aromatic hydrocarbon or heterocyclic ring fused to the ring completed by Z.

6 Claims, No Drawings

PHOTOTHERMOGRAPHIC ELEMENT

This invention relates to a thermographic image recording element, and more particularly, to a photothermographic element suitable for use in a photomechanical process and especially adapted for scanners and image setters. More specifically, it relates to a photothermographic element having a high speed, high contrast, and minimized speed variations during shelf storage.

BACKGROUND OF THE INVENTION

One well-known method for the exposure of photographic photosensitive elements is an image forming method of the scanner system comprising the steps of scanning an original to produce image signals, subjecting a photographic silver halide photosensitive element to exposure in accordance with the image signals, and forming a negative or positive image corresponding to the image of the original.

There is a desire to have a procedure of providing outputs of a scanner to a film and directly printing on a printing plate without a transfer step as well as a scanner photosensitive element having a ultrahigh contrast with respect to a scanner light source having a soft beam profile.

There are known a number of photosensitive elements having a photosensitive layer on a support wherein images are formed by imagewise exposure. Among these, a technique of forming images through heat development is known as a system capable of simplifying image forming means and contributing to environmental protection.

From the contemporary standpoints of environmental protection and space saving, it is strongly desired in the photomechanical process field to reduce the quantity of spent solution. Needed in this regard is a technology relating to photothermographic elements for use in photomechanical process which can be effectively exposed by means of laser scanners or laser image setters and produce distinct black images having a high resolution and sharpness. These photothermographic elements offer the customer a simple thermographic system that eliminates the need for solution type chemical reagents and is not detrimental to the environment.

The technology of forming images through heat development is disclosed, for example, in U.S. Pat. Nos. 3,152,904 and 3,457,075, D. Morgan and B. Shely, "Thermally Processed Silver Systems" in "Imaging Processes and Materials," Neblette, 8th Ed., Sturge, V. Walworth and A. Shepp Ed., page 2, 1969. These photothermographic elements generally contain a reducible non-photosensitive silver source (e.g., organic silver salt), a catalytic amount of a photocatalyst (e.g., silver halide), and a reducing agent for silver, typically dispersed in an organic binder matrix. Photothermographic elements are stable at room temperature. When they are heated at an elevated temperature (e.g., 80° C. or higher) after exposure, a redox reaction takes place between the reducible silver source (functioning as an oxidizing agent) and the reducing agent to form silver. This redox reaction is promoted by the catalysis of a latent image produced by exposure. Silver formed by reaction of the reducible silver salt in exposed regions provides black images in contrast to unexposed regions, forming an image.

Photothermographic elements of this type are well known in the art. In most of these elements, photosensitive layers are formed by applying coating solutions based on organic solvents such as toluene, methyl ethyl ketone (MEK) and methanol, followed by drying. The use of organic solvents is not only harmful to workers in the manufacturing procedure, but also disadvantageous because of the cost for recovery and disposal of the solvents.

To eliminate these concerns, it is contemplated to form photosensitive layers using coating solutions based on water solvent. Such photosensitive layers are sometimes referred to as "aqueous photosensitive layers," hereinafter. For example, JP-A 52626/1974 and 116144/1978 disclose the use of gelatin as the binder. JP-A 151138/1975 discloses polyvinyl alcohol as the binder. Further, JP-A 61747/1985 discloses a combined use of gelatin and polyvinyl alcohol. Besides, JP-A 28737/1983 discloses a photosensitive layer containing water-soluble polyvinyl acetal as the binder.

It is true that the use of these binders has great environmental and economical advantages in that photosensitive layers can be formed using coating solutions based on water solvent.

However, the use of such polymers as gelatin, polyvinyl alcohol and water-soluble polyacetal as the binder has the following drawbacks. These binders are so poorly compatible with the organic silver salt that they may form coatings which are practically unacceptable in coating surface quality. The silver tone of developed areas becomes far apart from the inherently desirable black color, for example, brown or yellow. There result developed areas of a low blackening density and unexposed areas of a high density. The elements are thus extremely low in commodity value.

There is a desire to have a photothermographic element which is an aqueous photosensitive element advantageous from the environment and economical aspects and has good coating surface quality, improved silver tone upon development, and satisfactory photographic properties.

The use of such aqueous photosensitive layers enables application of the techniques used in conventional well-known photographic silver halide photosensitive materials. More particularly, it becomes possible to preform a photosensitive silver halide emulsion having desired properties and then admix it with an organic silver salt. The freedom of design is significantly improved over the method of preparing photosensitive silver halide in an organic solvent system.

On the other hand, the recent rapid progress of semiconductor laser technology has made it possible to reduce the size of medical image output devices. As a matter of course, there were developed techniques relating to infrared-sensitive photothermal silver halide photographic material which can utilize a semiconductor laser as a light source. The spectral sensitization technique is disclosed, for example, in JP-B 10391/1991 and 52387/1994, JP-A 341432/1993, 194781/1994, and 301141/1994. The antihalation technique is disclosed, for example, in JP-A 13295/1995 and U.S. Pat. No. 5,380,635. Since the infrared exposure system permits the visible absorption of sensitizing dyes and antihalation dyes to be considerably reduced, a substantially colorless photosensitive material can be readily produced.

Since spectral sensitizing dyes capable of absorbing infrared radiation, however, generally have a high reducing power due to a high HOMO (highest occupied molecular orbital), they tend to reduce silver ions in photosensitive materials to exacerbate the fog thereof. In particular, these photosensitive materials experience a substantial change of performance during storage under hot humid conditions and long-term storage. If dyes having a low HOMO are used for preventing deterioration of storage stability, spectral sensitization efficiency and sensitivity become low because their LUMO (lowest unoccupied molecular orbital) is relatively low. These problems relating to sensitivity, storage stability, and performance variation arise not only with wet photographic photosensitive materials, but more outstandingly with photothermographic materials.

SUMMARY OF THE INVENTION

Therefore, an object of the invention is to provide a photothermographic element suitable for use in a photomechanical process and having a high speed, high contrast, and minimized speed variations during shelf storage so that it is especially adapted for scanners and image setters using infrared radiation as the light source.

According to the invention, there is provided a photothermographic element comprising on a support a non-photosensitive organic silver salt, a photosensitive silver halide which has been formed independent of the non-photosensitive organic silver salt, and a binder. The photothermographic element further includes an image forming layer which contains the photosensitive silver halide, a binder, a latex of a polymer having a glass transition temperature of −30° C. to 40° C. accounting for at least 50% by weight of the binder, and at least one compound of the following formula (I):

(I)

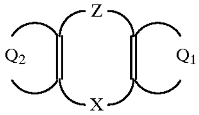

wherein X is -N=, -N(R)-, —O—, or —S—, wherein R is hydrogen, hydroxyl, aliphatic hydrocarbon, aryl or heterocyclic group; Z is a single bond or a group of non-metallic atoms necessary to form a 5- to 7-membered ring with X; and $Q_1$ and $Q_2$ each are a group of non-metallic atoms necessary to form an aromatic hydrocarbon ring or aromatic heterocyclic ring fused to the ring completed by Z.

Preferably, the compound of formula (I) has the following formula (IIa) or (IIb):

(IIa)

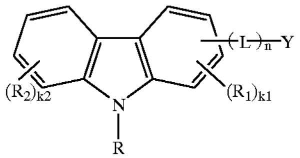

(IIb)

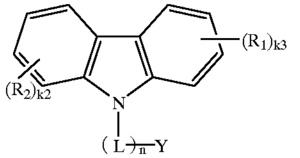

wherein R is hydrogen, hydroxyl, aliphatic hydrocarbon, aryl or heterocyclic group; $R_1$ and $R_2$ each are a monovalent substituent; Y is a group for promoting adsorption to the silver halide; L is a divalent linkage group; letter n is equal to 0 or 1, $k_1$ is an integer of 0 to 3, $k_2$ is an integer of 0 to 4, and $k_3$ is an integer of 0 to 4.

In one preferred embodiment, the photothermographic element contains on the same.side of the support as the image forming layer at least one compound of formula (I) and at least one sensitizing dye of the following formula (S):

(S)

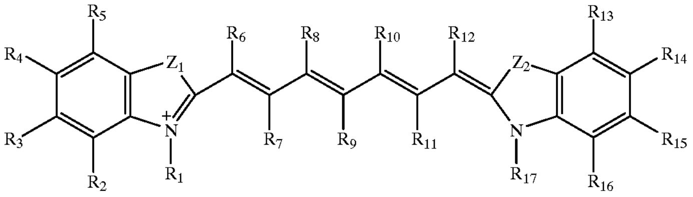

wherein $Z_1$ and $Z_2$ each are S, O or Se, $R_1$ and $R_{17}$ are independently alkyl or sulfoalkyl groups, at least one of which may have substituted thereon a fluoro, chloro, bromo, iodo, alkoxy, aryloxy or ester group; $R_2$ to $R_5$, and $R_{13}$ to $R_{16}$ are independently hydrogen, chloro, bromo, fluoro, nitro, cyano, keto, sulfo, carboxy, ester, sulfonamide, amide, dialkylamino, alkyl, alkenyl, heterocyclic, aryl, alkoxy or aryloxy group which may be substituted or unsubstituted, or $R_2$ and $R_3$, $R_3$ and $R_4$, $R_4$ and $R_5$, $R_{13}$ and $R_{14}$, $R_{14}$ and $R_{15}$, and $R_{15}$ and $R_{16}$, taken together, may form a substituted or unsubstituted benzene ring; $R_6$ to $R_{12}$ are independently hydrogen, substituted or unsubstituted alkyl, chloro, fluoro, bromo, iodo, unsubstituted amino, and when substituted, the substituent may form a 5- or 6-membered heterocyclic ring, or $R_6$ and $R_8$, $R_8$ and $R_{10}$, $R_{10}$ and $R_{12}$, and $R_9$ and $R_{11}$, taken together, may form a substituted or unsubstituted 5- or 6-membered carbocyclic or heterocyclic ring, $R_7$ and $R_9$, taken together, may form a 5- or 6-membered heterocyclic ring or 5-membered carbocyclic ring, $R_1$ and $R_6$, and $R_{12}$ and $R_{17}$, taken together, may form a substituted or unsubstituted 5- or 6-membered heterocyclic ring; and X is an ion for rendering the ionic charge of the dye neutral.

In other preferred embodiments, the image forming layer and/or a layer adjacent thereto contains at least one contrast enhancer; the silver halide has been spectrally sensitized in the wavelength range of 750 to 1,400 nm; the image forming layer has been formed by applying a coating solution of components in a solvent containing at least 60% by weight of water.

DETAILED DESCRIPTION OF THE INVENTION

The photothermographic element according to the invention contains a non-photosensitive organic silver salt, and a photosensitive silver halide which has been formed independent of the non-photosensitive organic silver salt. The element has on a support an image forming layer containing a binder, a photosensitive silver halide, and a compound of formula (I). In the image forming layer, a latex of a polymer having a glass transition temperature Tg of −30° C. to 40° C. is used as a main binder. The image forming layer has been formed by applying a coating solution in which water accounts for at least 60% by weight of a solvent or dispersing medium.

The use of a polymer latex in the image forming layer enables aqueous application using a solvent or dispersing medium comprising the majority of water, which is advantageous from the environmental and economical standpoints. Since the Tg of the polymer in the polymer latex is up to 40° C., the diffusion of photographically effective components is promoted during heat development, resulting in improved photographic properties. Inclusion of the compound of formula (I) provides sufficient supersensitizing effect in the red to infrared region, especially in the practically favorable infrared region, and restrains changes of sensitivity during storage. Where the compound of formula (I) is contained in a photosensitive material along with a contrast enhancer, the photosensitive material exhibits higher contrast.

Compound of formula (I)

The compound of formula (I) is described in detail.

(I)

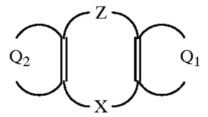

In formula (I), X is —N=, —N(R)—, —O— or —S—, wherein R is hydrogen, hydroxyl, aliphatic hydrocarbon, aryl or heterocyclic group, Z is a single bond or a group of non-metallic atoms necessary to form a 5- to 7-membered ring with X, and $Q_1$ and $Q_2$ each are a group of non-metallic atoms necessary to form an aromatic hydrocarbon ring or aromatic heterocyclic ring fused to the ring completed by Z.

More particularly, Z is a single bond or a group of non-metallic atoms necessary to form a 5- to 7-membered ring with X. When Z is a valence bond, the ring formed by Z is a 5-membered ring. When Z forms a 6- or 7-membered ring, the group of non-metallic atoms represented by Z is a group of non-metallic atoms containing at least one of carbon, nitrogen, oxygen and sulfur atoms, with its examples being shown below.

$—CH_2—$,

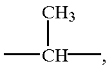

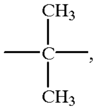

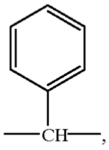

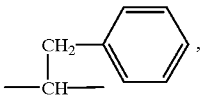

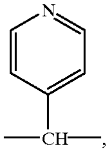

—CH=,

—CH=CH—,

—N=,

-continued

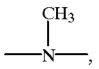

—O—,

—S—

Preferably, Z is a single bond or —CH=, —N=, —O—, or —S—, more preferably a single bond or —O—, or —S—, further preferably a single bond or —S—, and most preferably a single bond.

The ring formed by Z is preferably a 5- or 6-membered ring, more preferably a 5-membered ring. Preferred examples of the ring formed by Z include pyrrole; furan, thiophene, pyridine, pyrazine, oxazine, thiazine, and azepin. Of these, pyrrole and thiazine are preferred, with pyrrole being especially preferred.

In addition to the fused aromatic hydrocarbon rings or fused aromatic heterocyclic rings formed by $Q_1$ and $Q_2$, the ring formed by Z may have a substituent or substituents. Exemplary substituents include alkyl and similar substituents included in the groups exemplified for the group of non-metallic atoms represented by Z; other substituents, some of which overlap the examples of R to be mentioned in conjunction with X, include alkyl groups (including cycloalkyl and aralkyl groups) preferably having 1 to 20 carbon atoms, more preferably 1 to 12 carbon atoms, most preferably 1 to 8 carbon atoms, such as methyl, ethyl, isopropyl, tert-butyl, n-octyl, n-decyl, n-hexadecyl, cyclopropyl, cyclopentyl, cyclohexyl, benzyl, and phenethyl; alkenyl groups preferably having 2 to 20 carbon atoms, more preferably 2 to 12 carbon atoms, most preferably 2 to 8 carbon atoms, such as vinyl, allyl, 2-butenyl and 3-pentenyl; alkynyl groups preferably having 2 to 20 carbon atoms, more preferably 2 to 12 carbon atoms, most preferably 2 to 8 carbon atoms, such as propargyl and 3-pentynyl; aryl groups preferably having 6 to 30 carbon atoms, more preferably 6 to 20 carbon atoms, most preferably 6 to 12 carbon atoms, such as phenyl, p-methylphenyl, and naphthyl; amino groups preferably having 0 to 20 carbon atoms, more preferably 0 to 10 carbon atoms, most preferably 0 to 6 carbon atoms, such as amino, methylamino, dimethylamino, diethylamino, and dibenzylamino; alkoxy groups preferably having 1 to 20 carbon atoms, more preferably 1 to 12 carbon atoms, most preferably 1 to 8 carbon atoms, such as methoxy, ethoxy, and butoxy; aryloxy groups preferably having 6 to 20 carbon atoms, more preferably 6 to 16 carbon atoms, most preferably 6 to 12 carbon atoms, such as phenyloxy and 2-naphthyloxy; acyl groups preferably having 1 to 20 carbon atoms, more preferably 1 to 16 carbon atoms, most preferably 1 to 12 carbon atoms, such as acetyl, benzoyl, formyl, and pivaloyl; alkoxycarbonyl groups preferably having 2 to 20 carbon atoms, more preferably 2 to 16 carbon atoms, most preferably 2 to 12 carbon atoms, such as methoxycarbonyl and ethoxycarbonyl; aryloxycarbonyl groups preferably having 7 to 20 carbon atoms, more preferably 7 to 16 carbon atoms, most preferably 7 to 10 carbon atoms, such as phenyloxycarbonyl; acyloxy groups preferably having 2 to 20 carbon atoms, more preferably 2 to 16 carbon atoms, most preferably 2 to 10 carbon atoms, such as acetoxy and benzoyloxy; acylamino groups (including thioxo type) preferably having 2 to 20 carbon atoms, more preferably 2 to 16 carbon atoms, most preferably 2 to 10 carbon atoms, such as acetylamino, benzoylamino, and thiobenzoylamino; alkoxycarbonylamino groups preferably having 2 to 20 carbon atoms, more preferably 2 to 16 carbon atoms, most preferably 2 to 12 carbon atoms, such as methoxycarbonylamino; aryloxycarbonylamino groups preferably having 7 to 20 carbon atoms, more preferably 7 to 16 carbon atoms, most preferably 7 to 12 carbon atoms, such as phenyloxycarbonylamino; sulfonylamino groups preferably having 1 to 20 carbon atoms, more preferably 1 to 16 carbon atoms, most preferably 1 to 12 carbon atoms, such as methanesulfonylamino and benzenesulfonylamino; sulfamoyl groups preferably having 0 to 20 carbon atoms, more preferably 0 to 16 carbon atoms, most preferably 0 to 12 carbon atoms, such as sulfamoyl, methylsulfamoyl, dimethylsulfamoyl, and phenylsulfamoyl; carbamoyl groups preferably having 1 to 20 carbon atoms, more preferably 1 to 16 carbon atoms, most preferably 1 to 12 carbon atoms, such as carbamoyl, methylcarbamoyl, diethylcarbamoyl, and phenylcarbamoyl; alkylthio groups preferably having 1 to 20 carbon atoms, more preferably 1 to 16 carbon atoms, most preferably 1 to 12 carbon atoms, such as methylthio and ethylthio; arylthio groups preferably having 6 to 20 carbon atoms, more preferably 6 to 16 carbon atoms, most preferably 6 to 12 carbon atoms, such as phenylthio; sulfonyl groups preferably having 1 to 20 carbon atoms, more preferably 1 to 16 carbon atoms, most preferably 1 to 12 carbon atoms, such as mesyl and tosyl; sulfinyl groups preferably having 1 to 20 carbon atoms, more preferably 1 to 16 carbon atoms, most preferably 1 to 12 carbon atoms, such as methanesulfinyl and benzenesulfinyl; ureido groups preferably having 1 to 20 carbon atoms, more preferably 1 to 16 carbon atoms, most preferably 1 to 12 carbon atoms, such as ureido, methylureido, and phenylureido; phosphoramide groups preferably having 1 to 20 carbon atoms, more preferably 1 to 16 carbon atoms, most preferably 1 to 12 carbon atoms, such as diethylphosphoramide and phenylphosphoramide; hydroxy groups, mercapto groups, halogen atoms (e.g., fluorine, chlorine, bromine and iodine atoms), cyano groups, sulfo groups, carboxyl groups, nitro groups, hydroxamic acid groups, sulfino groups, hydrazino groups, imino groups, and heterocyclic groups (e.g., imidazolyl, pyridyl, furyl, piperidyl, and morpholino). These groups may be further substituted. Where more than one substituent is included, they may be the same or different.

Preferred substituents are alkyl, aralkyl, aryl, amino, acyl, alkoxycarbonyl, aryloxycarbonyl, carbonylamino (inclusive of acylamino, alkoxy- or aryloxycarbonylamino, and ureido groups), sulfonylamino, sulfamoyl, carbamoyl, hydroxy, hydrazino, and heterocyclic groups, with the alkyl, aralkyl, aryl, amino, hydroxy, hydrazino, and heterocyclic groups being more preferred.

Each of $Q_1$ and $Q_2$ is a group of non-metallic atoms necessary to form an aromatic hydrocarbon (or arene) ring or aromatic heterocyclic ring fused to the ring completed by Z. The arene or aromatic heterocyclic rings formed by $Q_1$ and $Q_2$ may be monocyclic or polycyclic (fused rings).

The arene rings formed by $Q_1$ and $Q_2$ are preferably monocyclic or bicyclic arene rings having 6 to 30 carbon atoms (e.g., benzene and naphthalene), more preferably benzene rings having 6 to 20 carbon atoms, most preferably benzene rings having 6 to 15 carbon atoms. The arene ring formed by $Q_1$ or $Q_2$ may have a ring (other than arene) fused thereto at a position other than the position where it is fused to the ring completed by Z. Examples of such a fused ring include thiophene, furan, pyran, pyrrole, pyrroline, imidazole, imidazoline, pyrazole, pyrazoline, thiazole, isothiazole, oxazole, isoxazole, triazole, pyridine, pyrazine, pyrimidine, and pyridazine. Of these, pyridine, pyrazine, pyrimidine, and pyridazine are preferred, with pyridine being most preferred.

The aromatic heterocyclic rings formed by $Q_1$ and $Q_2$ are aromatic heterocyclic rings containing at least one atom of nitrogen (N), oxygen (O) and sulfur (S), and may be monocyclic or form a fused ring with another ring. Preferred aromatic heterocyclic rings are 5- or 6-membered aromatic heterocyclic rings containing nitrogen atoms, more preferably 5- or 6-membered aromatic heterocyclic rings containing one or two nitrogen atoms. Examples of the aromatic heterocyclic rings include thiophene, furan, pyrrole, imidazole, pyrazole, thiazole, isothiazole, oxazole, isoxazole, triazole, pyridine, pyrazine, pyrimidine, and pyridazine. Of these, pyridine, pyrazine, pyrimidine, and pyridazine are preferred, with pyridine being most preferred.

Where the aromatic heterocyclic ring formed by $Q_1$ or $Q_2$ has a ring fused thereto other than the ring completed by Z, examples of the fused ring include benzene, thiophene, furan, pyran, pyrrole, pyrroline, imidazole, imidazoline, pyrazole, pyrazoline, thiazole, isothiazole, oxazole, isoxazole, triazole, pyridine, pyrazine, pyrimidine, and pyridazine. Of these, benzene, pyridine, pyrazine, pyrimidine, and pyridazine are preferred, with benzene being most preferred.

Preferred arene or aromatic heterocyclic rings formed by $Q_1$ and $Q_2$ are benzene, pyridine, pyrazine, pyrimidine, and pyridazine, with benzene and pyridine being more preferred. Benzene is most preferred.

The arene or aromatic heterocyclic rings formed by $Q_1$ and $Q_2$ may have substituents, examples of which are the same as mentioned above as the substituents on the ring formed by Z. Preferred substituents on the arene or aromatic heterocyclic rings formed by $Q_1$ and $Q_2$ are alkyl, alkenyl, aralkyl, aryl, amino, acyl, alkoxycarbonyl, aryloxycarbonyl, acylamino, alkoxy- or aryloxycarbonyl, carbonylamino (such as ureido), sulfonylamino, sulfamoyl, carbamoyl, hydroxy, hydrazino, imino (wherein the carbon atom of an imino group may form a ring), and heterocyclic groups. Of these, alkyl, aralkyl, aryl, amino, carbonylamino, sulfonylamino, hydrazino, imino, and heterocyclic groups are more preferred, with the alkyl, aralkyl, aryl, amino, carbonylamino, sulfonylamino, hydrazino, and imino groups being most preferred.

X is —N═, —N(R)—, —O—, or —S—, wherein R is hydrogen, hydroxyl, aliphatic hydrocarbon, aryl or heterocyclic group. Preferably X is —N(R)— or —S—, more preferably —N(R)—.

The aliphatic hydrocarbon groups represented by R include normal, branched or cyclic alkyl groups preferably having 1 to 30 carbon atoms, more preferably 1 to 20 carbon atoms, most preferably 1 to 12 carbon atoms, alkenyl groups preferably having 2 to 30 carbon atoms, more preferably 2 to 20 carbon atoms, most preferably 2 to 12 carbon atoms, and alkynyl groups preferably having 2 to 30 carbon atoms, more preferably 2 to 20 carbon atoms, most preferably 2 to 12 carbon atoms, with the alkyl groups being preferred.

The aryl groups represented by R are monocyclic or bicyclic aryl groups preferably having 6 to 30 carbon atoms, such as phenyl and naphthyl. Preferred are phenyl groups having 6 to 20 carbon atoms, especially phenyl groups having 6 to 12 carbon atoms.

The heterocyclic groups represented by R are 3- to 10-membered, saturated or unsaturated heterocyclic groups containing at least one atom of N, O, and S. These heterocyclic groups may be monocyclic or form a ring fused to another ring. Preferred heterocyclic groups are 5- or 6-membered aromatic heterocyclic groups, more preferably 5- or 6-membered aromatic heterocyclic groups containing nitrogen atoms, most preferably 5- or 6-membered aromatic heterocyclic groups containing one or two nitrogen atoms.

Illustrative examples of the heterocyclic groups include monovalent groups derived from pyrrolidine, piperidine, piperazine, morpholine, thiophene, furan, pyrrole, imidazole, pyrazole, pyridine, pyrazine, pyridazine, triazole, triazine, indole, indazole, purine, thiadiazole, oxadiazole, quinoline, phthalazine, naphthyridine, quinoxaline, quinazoline, cinnoline, pteridine, acridine, phenanthroline, phenazine, tetrazole, thiazole, oxazole, benzimidazole, benzoxazole, benzthiazole, benzotriazole, and tetrazaindene. Preferred heterocyclic groups are monovalent groups derived from pyrrole, imidazole, pyrazole, pyridine, pyrazine, pyridazine, triazole, triazine, indole, indazole, thiadiazole, oxadiazole, quinoline, phthalazine, quinoxaline, quinazoline, cinnoline, tetrazole, thiazole, oxazole, benzimidazole, benzoxazole, benzthiazole, benzotriazole, and tetrazaindene. More preferred are monovalent groups derived from imidazole, pyrazole, pyridine, pyrazine, indole, indazole, thiadiazole, oxadiazole, quinoline, thiazole, oxazole, benzimidazole, benzoxazole, benzthiazole, benzotriazole, and tetrazaindene. Further preferred are monovalent groups derived from imidazole, pyridine, quinoline, thiazole, oxazole, benzimidazole, benzoxazole, benzthiazole, and benzotriazole.

The aliphatic hydrocarbon, aryl and heterocyclic groups represented by R may have substituents, examples of which are the same as the substituents on the ring formed by Z. Preferred substituents on the aliphatic hydrocarbon, aryl and heterocyclic groups represented by R are alkyl, alkenyl, aralkyl, aryl, amino, acyl, alkoxycarbonyl, aryloxycarbonyl, carbonylamino, sulfonylamino, sulfamoyl, carbamoyl, hydroxy, hydrazino, and heterocyclic groups. More preferred substituents are alkyl, alkenyl, aralkyl, aryl, amino, carbonylamino, sulfonylamino, hydrazino, and heterocyclic groups. Further preferred substituents are alkyl, aralkyl, aryl, amino, carbonylamino, sulfonylamino, hydrazino, and heterocyclic groups.

Preferably R represents hydrogen, aliphatic hydrocarbon, aryl and heterocyclic groups, more preferably hydrogen, alkyl, alkenyl, and aryl, further preferably hydrogen, alkyl and aryl, and most preferably hydrogen and alkyl.

Preferred among the compounds of formula (I) are compounds having thianthrene, xanthene, phenoxthine, carbazole, carboline, phenanthridine, acridine, phenanthroline, phenazine, phenarsazine, phenothiazine, phenoxazine, and pyradinocarbazole skeletons. More preferred are compounds having carbazole, phenothiazine, and phenoxazine skeletons. Further preferred are compounds having carbazole and phenothiazine skeletons, with the compounds having a carbazole skeleton being most preferred.

The compound of formula (I) may have in its molecule a non-diffusion group or a group for promoting adsorption to silver halide. Preferably the compound has a silver halide adsorption promoting group.

The non-diffusion group is a non-diffusion group as in photographic couplers, generally known as ballast group. When a compound of formula (I) is added to a particular layer, the ballast group is effective for preventing the compound from readily diffusing into another layer. The ballast group has a total of at least 8 carbon atoms, preferably 8 to 100 carbon atoms, more preferably 8 to 60 carbon atoms, most preferably 10 to 40 carbon atoms. Preferred ballast groups are aliphatic hydrocarbon (e.g., alkyl, alkenyl, and aralkyl), aryl, and heterocyclic groups, alone or in combination with such groups as ether, thioether, carbonyl, amino, sulfonyl, and phosphoryl. The ballast groups may also be polymer moieties. Illustrative examples of the ballast group are described in Research Disclosure, 1995/2, 37938, pages 82–89, JP-A 280747/1989 and 283548/1989.

Examples of the silver halide adsorption promoting group include cyclic thioamide groups such as 4-thiazoline-2-thion, 4-imidazoline-2-thion, 2-thiohydantoin, rhodanine, thiobarbituric acid, 1,2,4-triazoline-3-thion, 1,3,4-oxazoline-2-thion, benzimidazoline-2-thion, benzoxazoline-2-thion, benzthiazolidine-2-thion, thiotriazine, and 1,3-imidazoline-2-thion, aliphatic mercapto groups, aromatic mercapto groups, heterocyclic mercapto groups (which, when a nitrogen atom is adjacent to the carbon atom to which a SH group is attached, are of the same definition as cyclic thioamide groups in tautomerism therewith, examples of which have been already described), and 5- or 6-membered nitrogenous heterocyclic rings composed of a combination of nitrogen, oxygen, sulfur and carbon atoms, such as benzotriazole, triazole, tetrazole, indazole, benzimidazole, imidazole, benzothiazole, thiazole, thiazoline, benzoxazole, oxazole, oxazoline, thiadiazole, oxathiazole, triazine, and azaindene. These groups may have suitable substituents, examples of which are the same as the aforementioned substituents on the ring formed by Z.

Of the compounds of formula (I), compounds of the following formula (II) or (III) are preferred.

(II)

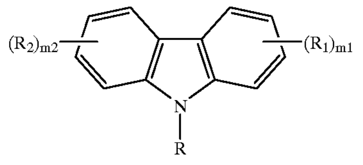

(III)

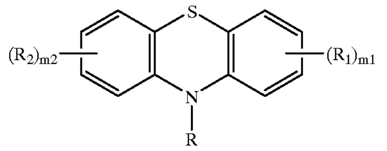

In formulas (II) and (III), R is as defined in formula (I), with its preferred range being also the same. $R_1$ and $R_2$ are independently monovalent substituents, which are exemplified by the substituents mentioned for $Q_1$ and $Q_2$ in formula (I). Letters $m_1$ and $m_2$ are integers of 0 to 4. Also preferably the compounds have a silver halide adsorption promoting group.

Of the compounds of formula (II), compounds of formula (IIa) or (IIb) are more preferred.

(IIa)

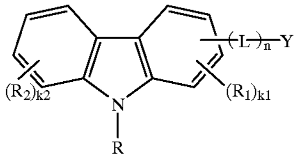

(IIb)

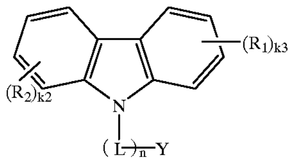

In formulas (IIa) and (IIb), R is as defined in formula (I), with its preferred range being also the same. Y is a group for promoting adsorption to silver halide, examples of which are as described above. L is a divalent linkage group. $R_1$ and $R_2$ are monovalent substituents, examples of which are the same as the substituents mentioned above in conjunction with $Q_1$ and $Q_2$ in formula (I). Letter n is equal to 0 or 1, $k_1$ is an integer of 0 to 3, $k_2$ and $k_3$ each are an integer of 0 to 4.

The divalent linkage groups represented by L include such atoms as carbon (C), nitrogen (N), sulfur (S), and oxygen (O) and groups of such atoms. Illustrative examples are alkylene, alkenylene, alkynylene, arylene, —O—, —S—, —N($R_0$)—, —N=, —CO—, and —$SO_2$—, alone and combinations thereof, wherein $R_0$ is hydrogen, hydroxy, aliphatic hydrocarbon, aryl or heterocyclic group. If possible, these groups may have substituents, examples of which are the same as the aforementioned substituents on the ring formed by Z.

Of the compounds of formula (IIa), compounds of the following formula (IIa-1) are preferred.

(IIa-1)

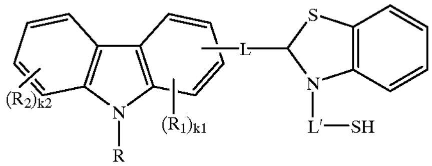

In formula (IIa-1), R is as defined in formula (I), with its preferred range being also the same. $R_1$, $R_2$, $k_1$, $k_2$, and L are as defined in formulas (IIa) and (IIb). L' is an alkylene group. The alkylene groups represented by L' preferably have 2 to 6 carbon atoms, more preferably 2 to 4 carbon atoms, most preferably 2 or 3 carbon atoms, and may have substituents, examples of which are the same as the aforementioned substituents on the ring formed by Z. Preferred illustrative examples of the alkylene group are ethylene, trimethylene, propylene, and tetramethylene. Of these, ethylene, trimethylene, and propylene are more preferred. Ethylene and propylene are further preferred, with ethylene being most preferred.

Of the compounds of formula (IIa-1), compounds of the following formula (IIa-2) are especially preferred.

(IIa-2)

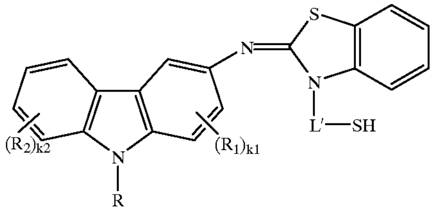

In formula (IIa-2), R is as defined in formula (I), with its preferred range being also the same. $R_1$, $R_2$, $k_1$, $k_2$, and L' are as defined in formula (IIa-1), with their preferred ranges being also the same.

Illustrative examples of the compound of formula (I) are given below although the invention is not limited thereto.

1.

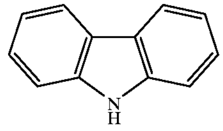

2.

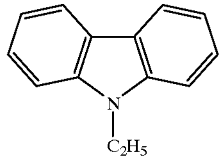

3.

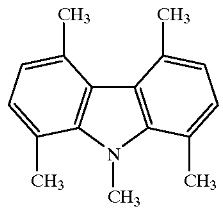

4.

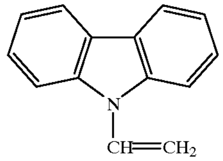

-continued
5.
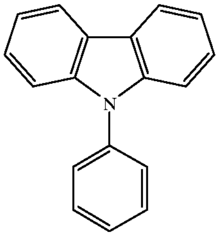
6.
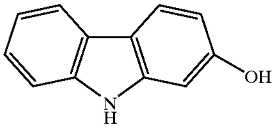
7.
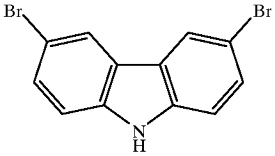
8.
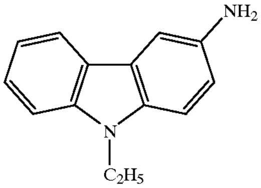
9.
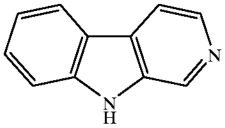
10.
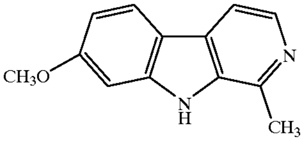
11.
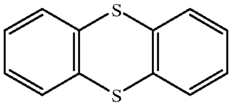
12.
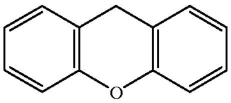
13.
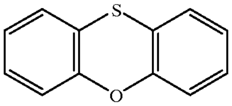
14.
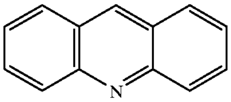
15.
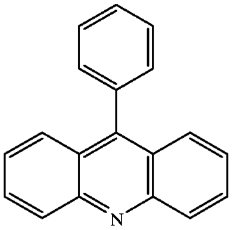
16.
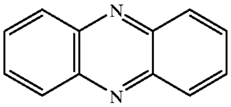
17.
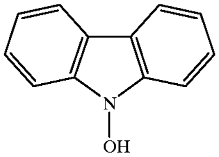
18.
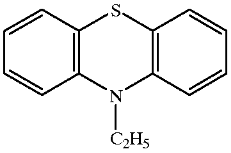
19.
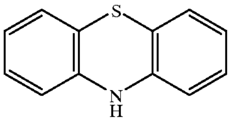
20.
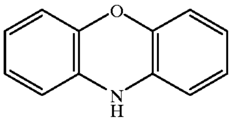

-continued
21.
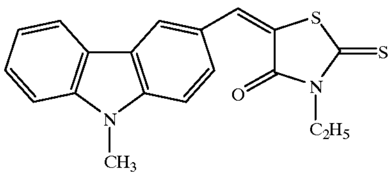
22.
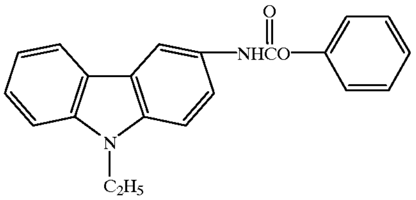
23.
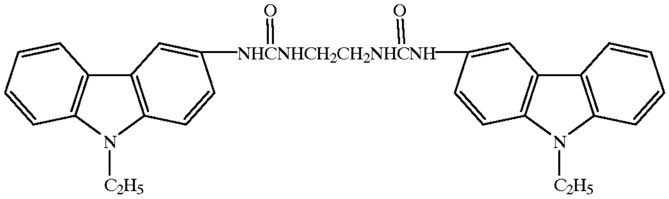
24.
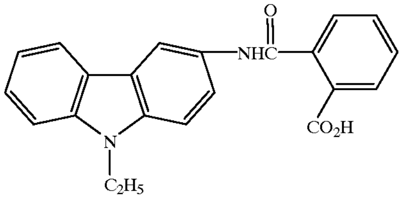
25.
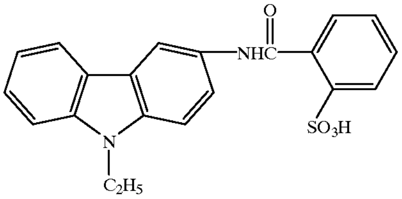
26.
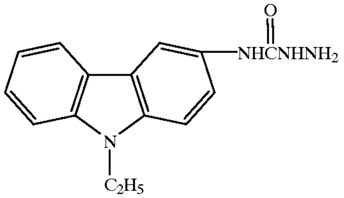
27.
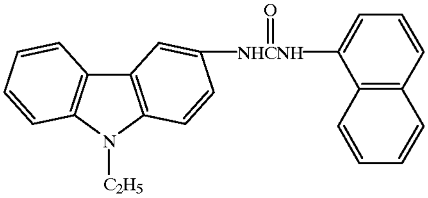
28.
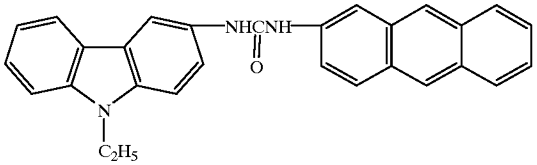
29.
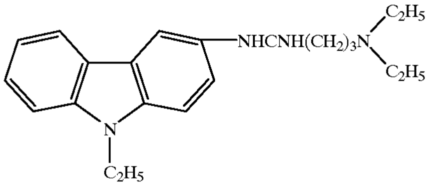
30.
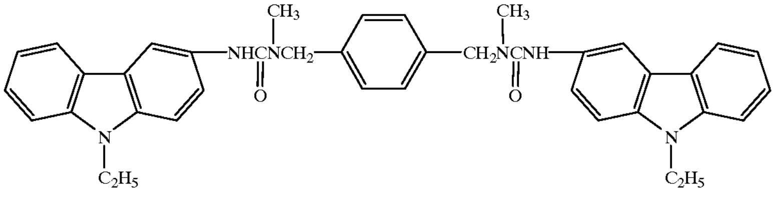
31.
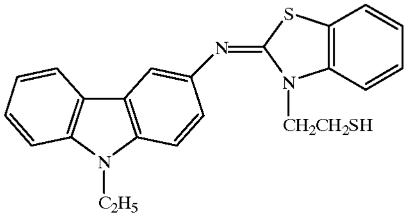
32.
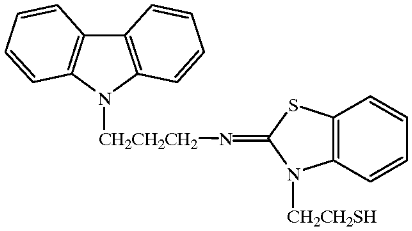

-continued
33.
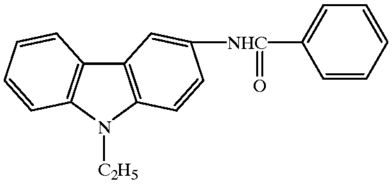
34.
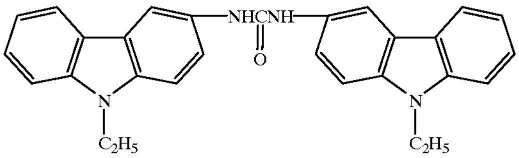
35.
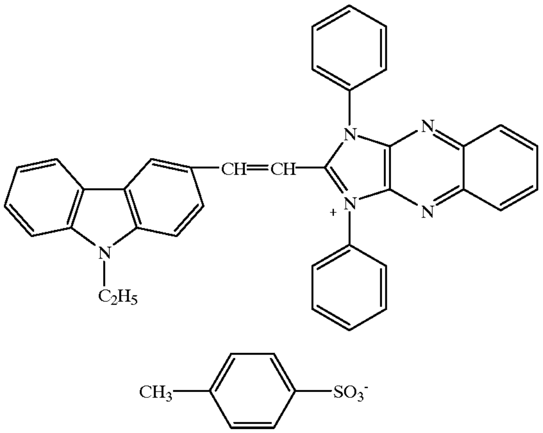
36.
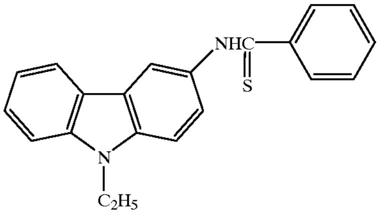
37.
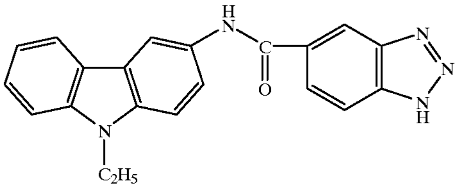
38.
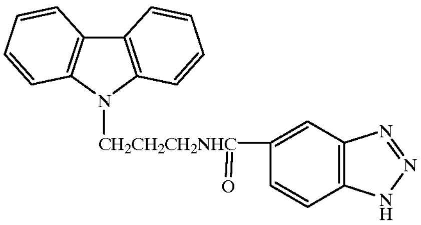
39.
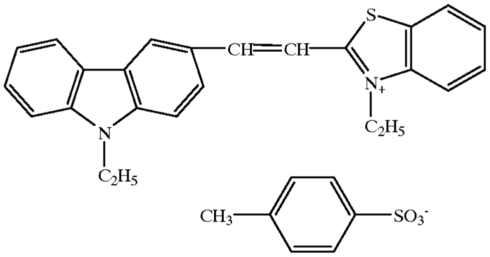
40.
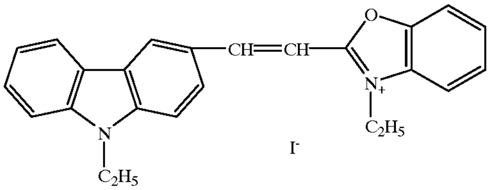
41.
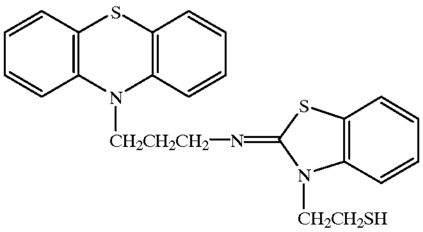
42.
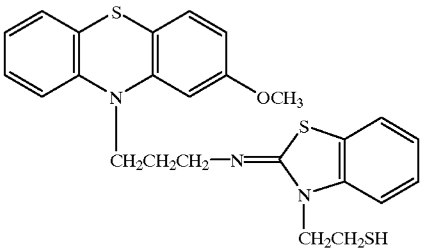

-continued

43.

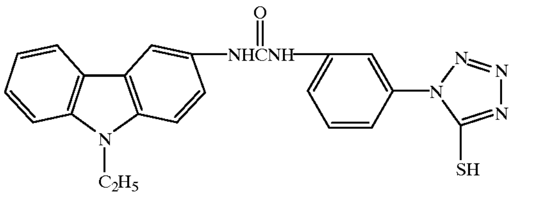

44.

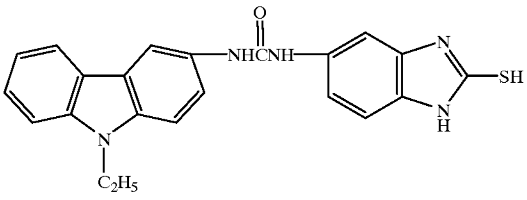

45.

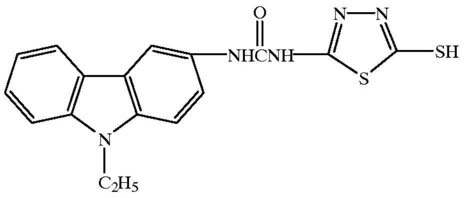

46.

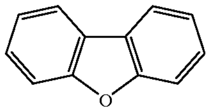

47.

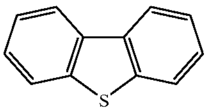

48.

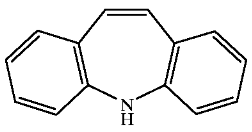

49.

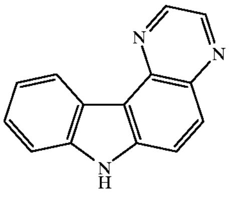

50.

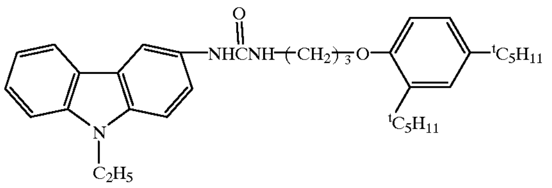

51.

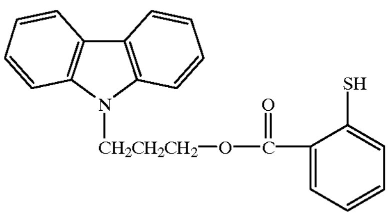

52.

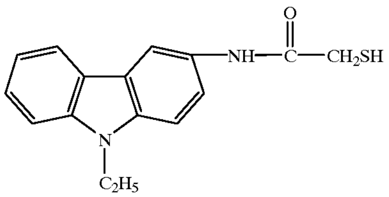

53.

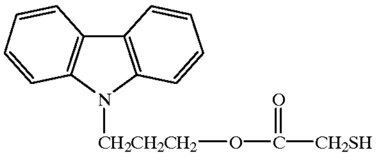

To illustrate the synthesis of the compounds of formula (I), their synthesis examples are given below.

Synthesis Example 1

Synthesis of Compound 21

In 20 ml of acetic acid were dissolved 2.23 g (0.01 mol) of 3-formyl-9-methylcarbazole, 1.85 g (0.015 mol) of 3-ethylrhodanine, and 2.21 g (0.027 mol) of sodium acetate. The solution was stirred for 6 hours while heating at 80° C. It was cooled to room temperature whereupon crystals precipitated. The crystals were collected by filtration and recrystallized from methanol, yielding 2.58 g (7.33 mmol) of the end Compound 21.

Yield 73%, mp. 190–192° C.

Synthesis Example 2

Synthesis of Compound 22

In 400 ml of acetonitrile was dissolved 63.1 g (0.30 mol) of 3-amino-9-ethylcarbazole. The solution was ice cooled below 5° C. After 41.9 ml (0.30 mol) of triethylamine was added under a nitrogen atmosphere, 47.0 g (0.30 mol) of phenyl chloroformate was added dropwise to the solution so slowly that the reaction solution might not exceed 10° C. After the completion of dropwise addition, the solution was stirred below 5° C. for 30 minutes, then warmed to room temperature, and stirred at the temperature for a further 3 hours. After the insoluble matter was filtered off, the filtrate was concentrated, worked up by silica gel column chromatography (developing solvent: methylene chloride), and recrystallized from methylene chloride/n-hexane, yielding 49.6 g (0.150 mol) of the end Compound 22.

Yield 50%, mp. 142–143° C.

Synthesis Example 3

Synthesis of Compound 23

In 20 ml of dimethylacetamide was dissolved 6.61 g (0.02 mol) of Compound 22. With stirring, 0.60 g (0.01 mol) of ethylenediamine was added. After 4 hours of stirring at 50 to 60° C., the solution was cooled to room temperature whereupon crystals precipitated. The crystals were collected by filtration and recrystallized from methanol, yielding 5.10 g (9.58 mmol) of the end Compound 23.

Yield 96%, mp. >250° C.

Synthesis Example 4

Synthesis of Compound 24

In 50 ml of acetonitrile were dissolved 10.5 g (0.05 mol) of 3-amino-9-ethylcarbazole and 7.4 g (0.05 mol) of phthalic anhydride. The solution was stirred for 4 hours at room temperature whereupon crystals precipitated. The crystals were collected by filtration and recrystallized from methanol, yielding 12.0 g (0.033 mol) of the end Compound 24.

Yield 66%, mp. 210–212° C.

Synthesis Example 5

Synthesis of Compound 25

In 50 ml of acetonitrile were dissolved 10.5 g (0.05 mol) of 3-amino-9-ethylcarbazole and 9.2 g (0.05 mol) of o-sulfobenzoic anhydride. The solution was stirred for 4 hours at room temperature whereupon paste crystals precipitated. The crystals were collected by filtration and recrystallized from methanol, yielding 9.0 g (0.023 mol) of the end Compound 25.

Yield 46%, mp. 204–206° C. (decomposed)

Synthesis Example 6

Synthesis of Compound 26

In 10 ml of acetonitrile was dissolved 3.30 g (0.01 mol) of Compound 22. With stirring, 0.55 g (0.011 mol) of hydrazine monohydrate was added. After 1 hour of refluxing, the solution was cooled to room temperature whereupon crystals precipitated. The crystals were collected by filtration and recrystallized from methanol, yielding 1.82 g ($6.79\times10^{-3}$ mol) of the end Compound 26.

Yield 68%, mp. >250° C.

Synthesis Example 7

Synthesis of Compound 27

In 50 ml of acetonitrile was dissolved 10.5 g (0.05 mol) of 3-amino-9-ethylcarbazole. With the solution ice cooled below 5° C., 8.50 g (0.05 mol) of 1-naphthyl isocyanate was added dropwise to the solution so slowly that the reaction solution might not exceed 10° C. After the completion of dropwise addition, the solution was stirred below 5° C. for 30 minutes, warmed to room temperature, and allowed to stand overnight whereupon a solid precipitated. The solid was collected by filtration and recrystallized from dimethylformamide/methanol, yielding 12.2 g (0.032 mol) of the end Compound 27.

Yield 64%, mp. >250° C. (decomposed)

Synthesis Example 8

Synthesis of Compound 28

In a mixture of 10 ml of acetonitrile and 2 ml of dimethylacetamide were dissolved 3.30 g (10.0 mmol) of Compound 22 and 2.0 g (10.3 mmol) of 2-aminoanthracene. With stirring, 10.3 mmol of imidazole was added. After 6 hours of stirring at 50° C., the solution was cooled to room temperature whereupon a solid precipitated. The solid was collected by filtration and recrystallized from dimethylformamide/methanol, yielding 2.10 g (4.89 mmol) of the end Compound 28.

Yield 49%, mp. >250° C. (decomposed)

Synthesis Example 9

Synthesis of Compound 29

In 10 ml of dimethylacetamide were dissolved 3.30 g (10.0 mmol) of Compound 22 and 1.30 g (10.0 mmol) of N,N-diethyl-1,3-propanediamine. With stirring, 1.0 g (10.0 mmol) of triethylamine was added. After 6 hours of stirring at 50° C., the solution was cooled to room temperature, and about 100 ml of water was added thereto. The precipitated solid was collected by filtration and recrystallized from methanol, yielding 2.88 g (7.85 mmol) of the end Compound 29.

Yield 79%, mp. 143–144° C.

Synthesis Example 10

Synthesis of Compound 31

In 100 ml of dimethylformamide were dissolved 6.31 g (0.03 mol) of 3-amino-9-ethylcarbazole and 8.22 g (0.03 mol) of 2,3-dihydrothiazole[2,3-b]benzothiazolium bromide. Then 4.19 ml (0.03 mol) of triethylamine was added. After 3 hours of stirring at 50° C., the solution was cooled to room temperature, and a mixture of 200 ml of methanol and 50 ml of water was added thereto. The precipitated solid was collected by filtration and recrystallized from dimethylformamide, yielding 7.50 g (19.6 mmol) of the end Compound 31.

Yield 65%, mp. 208–210° C.

In the practice of the invention, the compound of formula (I) may be added to either a photosensitive layer serving as an image forming layer or another non-photosensitive layer, but preferably to a photosensitive layer serving as an image forming layer.

The amount of the compound of formula (I) added is preferably $10^{-4}$ to 1 mol/Ag, more preferably $10^{-3}$ to 0.3 mol/Ag, further preferably $10^{-3}$ to 0.1 mol/Ag, as expressed by a molar amount per mol of Ag, although the exact amount varies depending on the desired purpose. The compounds of formula (I) may be used alone or in admixture of two or more.

Contrast enhancer

In the practice of the invention, contrast enhancers are preferably used for forming ultrahigh contrast images. Included are hydrazine derivatives as described in U.S. Pat. Nos. 5,464,738, 5,496,695, 5,512,411, 5,536,622, Japanese Patent Application Nos. 228627/1995, 215822/1996, 130842/1996, 148113/1996, 156378/1996, 148111/1996, and 148116/1996; compounds having a quaternary nitrogen atom as described in Japanese Patent Application No. 83566/1996, and acrylonitrile compounds as described in U.S. Pat. No. 5,545,515. Illustrative examples are compounds 1 to 10 in U.S. Pat. No. 5,464,738, compounds H-1 to H-28 in U.S. Pat. No. 5,496,695, compounds I-1 to I-86 in Japanese Patent Application No. 215822/1996, compounds H-1 to H-62 in 130842/1996, compounds I-1 to I-21 in 148113/1996, compounds 1 to 50 in 148111/1996, compounds 1 to 40 in 148116/1996, and compounds P-1 to P-26 and T-1 to T-18 in 83566/1996, and compounds CN-1 to CN-13 in U.S. Pat. No. 5,545,515.

Any of the aforementioned ultrahigh contrast enhancers may be used as the contrast enhancer according to the invention insofar as they have the function for achieving the objects of the invention. Preferably, hydrazine derivatives are used.

Any of the hydrazine derivatives may be used as the contrast enhancer according to the invention insofar as they have the function for achieving the objects of the invention.

Preferred hydrazine derivatives are of the following formula (H). It is preferred that the photothermographic element of the invention contain a hydrazine derivative of formula (H).

The hydrazine derivatives of formula (H) are described in detail.

(H)

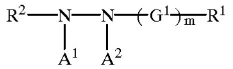

In formula (H), $R^2$ is an aliphatic, aromatic or heterocyclic group. $R^1$ is hydrogen or a block group. $G^1$ is —CO—, —COCO—, —C(═S)—, —$SO_2$—, —SO—, —$PO(R^3)$— or iminomethylene group. $R^3$ is selected from the same range as defined for $R^1$ and may be different from $R^1$. Both $A^1$ and $A^2$ are hydrogen, or one of $A^1$ and $A^2$ is hydrogen and the other is a substituted or unsubstituted alkylsulfonyl, substituted or unsubstituted arylsulfonyl or substituted or unsubstituted acyl group. Letter m is equal to 0 or 1. $R^1$ is an aliphatic, aromatic or heterocyclic group when m is 0.

In formula (H), the aliphatic groups represented by $R^2$ are preferably substituted or unsubstituted, normal, branched or cyclic alkyl, alkenyl and alkynyl groups having 1 to 30 carbon atoms.

In formula (H), the aromatic groups represented by $R^2$ are preferably monocyclic or fused ring aryl groups, for example, phenyl and naphthyl groups derived from benzene and naphthalene rings. The heterocyclic groups represented by $R^2$ are preferably monocyclic or fused ring, saturated or unsaturated, aromatic or non-aromatic heterocyclic groups while the heterocycles in these groups include pyridine, pyrimidine, imidazole, pyrazole, quinoline, isoquinoline, benzimidazole, thiazole, benzothiazole, piperidine, triazine, morpholine, and piperazine rings.

Aryl, alkyl and aromatic heterocyclic groups are most preferred as $R^2$.

The groups represented by $R^2$ may have substituents. Exemplary substituents include halogen atoms (eg., fluorine, chlorine, bromine and iodine), alkyl groups (inclusive of aralkyl, cycloalkyl and active methine groups), alkenyl groups, alkynyl groups, aryl groups, heterocyclic groups, heterocyclic groups containing a quaternized nitrogen atom (e.g., pyridinio), acyl groups, alkoxycarbonyl groups, aryloxycarbonyl groups, carbamoyl groups, carboxy groups or salts thereof, sulfonylcarbamoyl groups, acylcarbamoyl groups, sulfamoylcarbamoyl groups, carbazoyl groups, oxalyl groups, oxamoyl groups, cyano groups, thiocarbamoyl groups, hydroxy groups, alkoxy groups (inclusive of groups having recurring ethylenoxy or propylenoxy units), aryloxy groups, heterocyclic oxy groups, acyloxy groups, (alkoxy or aryloxy)carbonyloxy groups, carbamoyloxy groups, sulfonyloxy groups, amino groups, (alkyl, aryl or heterocyclic) amino groups, N-substituted nitrogenous heterocyclic groups, acylamino groups, sulfonamide groups, ureido groups, thioureido groups, imide groups, (alkoxy or aryloxy)carbonylamino groups, sulfamoylamino groups, semicarbazide groups, thiosemicarbazide groups, hydrazino groups, quaternary ammonio groups, oxamoylamino groups, (alkyl or aryl)sulfonylureido groups, acylureido groups, acylsulfamoylamino groups, nitro groups, mercapto groups, (alkyl, aryl or heterocyclic) thio groups, (alkyl or aryl) sulfonyl groups, (alkyl or aryl)sulfinyl groups, sulfo groups or salts thereof, sulfamoyl groups, acylsulfamoyl groups, sulfonylsulfamoyl groups or salts thereof, groups containing a phosphoramide or phosphate structure, silyl and stannyl groups. These substituents may be further substituted with such substituents.

Preferred substituents that $R^2$ may have include, where $R_2$ is an aromatic or heterocyclic group, alkyl (inclusive of active methylene), aralkyl, heterocyclic, substituted amino, acylamino, sulfonamide, ureido, sulfamoylamino, imide, thioureido, phosphoramide, hydroxy, alkoxy, aryloxy, acyloxy, acyl, alkoxycarbonyl, aryloxycarbonyl, carbamoyl, carboxy (inclusive of salts thereof), (alkyl, aryl or heterocyclic) thio, sulfo (inclusive of salts thereof), sulfamoyl, halogen, cyano, and nitro groups.

Where $R^2$ is an aliphatic group, preferred substituents include alkyl, aryl, heterocyclic, amino, acylamino, sulfonamide, ureido, sulfamoylamino, imide, thioureido, phosphoramide, hydroxy, alkoxy, aryloxy, acyloxy, acyl, alkoxycarbonyl, aryloxycarbonyl, carbamoyl, carboxy (inclusive of salts thereof), (alkyl, aryl or heterocyclic) thio, sulfo (inclusive of salts thereof), sulfamoyl, halogen, cyano, and nitro groups.

In formula (H), $R^1$ is hydrogen or a block group. Examples of the block group include aliphatic groups (e.g., alkyl, alkenyl and alkynyl groups), aromatic groups (monocyclic or fused ring aryl groups), heterocyclic groups, alkoxy, aryloxy, amino and hydrazino groups.

The alkyl groups represented by $R^1$ are preferably substituted or unsubstituted alkyl groups having 1 to 10 carbon atoms, for example, methyl, ethyl, trifluoromethyl, difluoromethyl, 2-carboxytetrafluoroethyl, pyridiniomethyl, difluoromethoxymethyl, difluorocarboxymethyl, 3-hydroxypropyl, hydroxymethyl, 3-methanesulfonamidopropyl, benzenesulfonamidomethyl, trifluoroacetylmethyl, dimethylaminomethyl, phenylsulfonylmethyl, o-hydroxybenzyl, methoxymethyl, phenoxymethyl, 4-ethylphenoxymethyl, phenylthiomethyl, t-butyl, dicyanomethyl, diphenylmethyl, triphenylmethyl, methoxycarbonyldiphenylmethyl, cyanodiphenylmethyl, and methylthiodiphenylmethyl groups. The alkenyl groups are preferably those having 1 to 10 carbon atoms, for example, vinyl, 2-ethoxycarbonylvinyl, 2-trifluoro-2-methoxycarbonylvinyl, 2,2-dicyanovinyl, and 2-cyano-2-methoxycarbonylvinyl groups. The alkynyl groups are preferably those having 1 to 10 carbon atoms, for example, ethynyl and 2-methoxycarbonylethynyl groups. The aryl groups are preferably monocyclic or fused ring aryl groups, especially those containing a benzene ring, for example, phenyl, perfluorophenyl, 3,5-dichlorophenyl, 2-methanesulfonamidophenyl, 2-carbamoylphenyl, 4,5-dicyanophenyl, 2-hydroxymethylphenyl, 2,6-dichloro-4-cyanophenyl, and 2-chloro-5-octylsulfamoylphenyl groups.

The heterocyclic groups represented by $R^1$ are preferably 5- and 6-membered, saturated or unsaturated, monocyclic or fused ring, heterocyclic groups containing at least one of nitrogen, oxygen and sulfur atoms, for example, morpholino, piperidino (N-substituted), imidazolyl, indazolyl (e.g., 4-nitroindazolyl), pyrazolyl, triazolyl, benzimidazolyl, tetrazolyl, pyridyl, pyridinio (e.g., N-methyl-3-pyridinio), quinolinio, quinolyl, hydantoyl, and imidazolidinyl groups.

The alkoxy groups are preferably those having 1 to 8 carbon atoms, for example, methoxy, 2-hydroxyethoxy, benzyloxy, and t-butoxy groups. The aryloxy groups are preferably substituted or unsubstituted phenoxy groups. The amino groups are preferably unsubstituted amino, alkylamino having 1 to 10 carbon atoms, arylamino, and saturated or unsaturated heterocyclic amino groups (inclusive of nitrogenous heterocyclic amino groups containing a quaternized nitrogen atom). Examples of the amino group include 2,2,6,6-tetramethylpiperidin-4-ylamino, propylamino, 2-hydroxyethylamino, anilino, o-hydroxyanilino, 5-benzotriazolylamino, and N-benzyl-3-pyridinioamino groups. The hydrazino groups are preferably substituted or unsubstituted hydrazino groups and substituted or unsubstituted phenylhydrazino groups (e.g., 4-benzenesulfonamidophenylhydrazino).

The groups represented by $R^1$ may be substituted ones, with examples of the substituent being as exemplified for the substituent on $R^2$.

In formula (H), $R^1$ may be such a group as to induce cyclization reaction to cleave a $G^1$–$R^1$ moiety from the remaining molecule to generate a cyclic structure containing the atoms of the —$G^1$–$R^1$ moiety. Such examples are described in JP-A 29751/1988, for example.

The hydrazine derivative of formula (H) may have incorporated therein a group capable of adsorbing to silver halide. Such adsorptive groups include alkylthio, arylthio, thiourea, thioamide, mercapto heterocyclic and triazole groups as described in U.S. Pat. Nos. 4,385,108 and 4,459,347, JP-A 195233/1984, 200231/1984, 201045/1984, 201046/1984, 201047/1984, 201048/1984, 201049/1984, 170733/1986, 270744/1986, 948/1987, 234244/1988, 234245/1988, and 234246/1988. These adsorptive groups to silver halide may take the form of precursors. Such precursors are exemplified by the groups described in JP-A 285344/1990.

$R^1$ and $R^2$ in formula (H) may have incorporated therein a ballast group or polymer commonly used in immobile photographic additives such as couplers. The ballast group is a group having at least 8 carbon atoms and relatively inert with respect to photographic properties. It may be selected from, for example, alkyl, aralkyl, alkoxy, phenyl, alkylphenyl, phenoxy, and alkylphenoxy groups. The polymer is exemplified in JP-A 100530/1989, for example.

$R^1$ or $R^2$ in formula (H) may have a plurality of hydrazino groups as substituents. In this case, the compounds of formula (H) are polymeric with respect to hydrazino groups. Exemplary polymeric compounds are described in JP-A 86134/1989, 16938/1992, 197091/1993, WO 95-32452 and 95-32453, Japanese Patent Application Nos. 351132/1995, 351269/1995, 351168/1995, 351287/1995, and 351279/1995.

$R^1$ or $R^2$ in formula (H) may contain a cationic group (e.g., a group containing a quaternary ammonio group and a nitrogenous heterocyclic group containing a quaternized nitrogen atom), a group containing recurring ethylenoxy or propylenoxy units, an (alkyl, aryl or heterocyclic) thio group, or a group which is dissociable with a base (e.g., carboxy, sulfo, acylsulfamoyl, and carbamoylsulfamoyl). Exemplary compounds containing such a group are described in, for example, in JP-A 234471/1995, 333466/1993, 19032/1994, 19031/1994, 45761/1993, 259240/1991, 5610/1995, and 244348/1995, U.S. Pat. Nos. 4,994,365 and 4,988,604, and German Patent No. 4006032.

In formula (H), each of $A^1$ and $A^2$ is a hydrogen atom, a substituted or unsubstituted alkyl- or arylsulfonyl group having up to 20 carbon atoms (preferably a phenylsulfonyl group or a phenylsulfonyl group substituted such that the sum of Hammett substituent constants may be −0.5 or more), or a substituted or unsubstituted acyl group having up to 20 carbon atoms (preferably a benzoyl group, a benzoyl group substituted such that the sum of Hammett substituent constants may be −0.5 or more, or a linear, branched or cyclic, substituted or unsubstituted, aliphatic acyl group wherein the substituent is selected from a halogen atom, ether group, sulfonamide group, carbonamide group, hydroxyl group, carboxy group and sulfo group). Most preferably, both $A^1$ and $A^2$ are hydrogen atoms.

The preferable range of the hydrazine derivatives of the general formula (H) is described.

In formula (H), $R^2$ is preferably phenyl, alkyl of 1 to 3 carbon atoms or aromatic heterocyclic groups.

Where $R^2$ represents phenyl or aromatic heterocyclic groups, preferred substituents thereon include nitro, cyano, alkoxy, alkyl, acylamino, ureido, sulfonamide, thioureido, carbamoyl, sulfamoyl, sulfonyl, carboxy (or salts thereof), sulfo (or salts thereof), alkoxycarbonyl, and chloro groups.

Where $R_2$ represents substituted alkyl groups of 1 to 3 carbon atoms, it is more preferably substituted methyl groups, and further preferably di- or tri-substituted methyl groups. Exemplary preferred substituents on these methyl groups include methyl, phenyl, cyano, (alkyl, aryl or heterocyclic) thio, alkoxy, aryloxy, chloro, heterocyclic, alkoxycarbonyl, aryloxycarbonyl, carbamoyl, sulfamoyl, amino, acylamino, and sulfonamide groups, and especially, substituted or unsubstituted phenyl groups.

Where $R^2$ represents substituted methyl groups, preferred examples thereof are t-butyl, dicyanomethyl, dicyanophenylmethyl, triphenylmethyl (trityl), diphenylmethyl, methoxycarbonyldiphenylmethyl, cyanodiphenylmethyl, methylthiodiphenylmethyl, cyclopropyldiphenylmethyl groups, with trityl being most preferred.

Where $R^2$ represents aromatic heterocyclic groups, it is preferred that the heterocycles in $R^2$ be pyridine, quinoline, pyrimidine, triazine, benzothiazole, benzimidazole, and thiophene rings.

Most preferably, $R^2$ in formula (H) represents substituted or unsubstituted phenyl groups.

In formula (H), m is equal to 0 or 1. When m is 0, $R^1$ represents aliphatic, aromatic or heterocyclic groups. When m is 0, $R^1$ more preferably represents phenyl groups, substituted alkyl groups of 1 to 3 carbon atoms or alkenyl groups. Of these groups, the phenyl groups and substituted alkyl groups of 1 to 3 carbon atoms are the same as the preferred range of $R^2$ mentioned above. When $R^1$ represents alkenyl groups, preferred $R^1$ groups are vinyl groups, especially vinyl groups having one or two substituents selected from the group consisting of cyano, acyl, alkoxycarbonyl, nitro, trifluoromethyl, and carbamoyl. Exemplary are 2,2-dicyanovinyl, 2-cyano-2-methoxycarbonylvinyl, and 2-acetyl-2-ethoxycarbonylvinyl.

Preferably m is equal to 1.

Where $R^2$ is a phenyl or aromatic heterocyclic group and $G^1$ is —CO—, the groups represented by $R^1$ are preferably selected from hydrogen, alkyl, alkenyl, alkynyl, aryl and heterocyclic groups, more preferably from hydrogen, alkyl and aryl groups, and most preferably from hydrogen atoms and alkyl groups. Where $R^1$ represents alkyl groups, preferred substituents thereon are halogen, alkoxy, aryloxy, alkylthio, arylthio, hydroxy, sulfonamide, amino, acylamino, and carboxy groups.

Where $R^2$ is a substituted methyl group and $G^1$ is —CO—, the groups represented by $R^1$ are preferably selected from hydrogen, alkyl, aryl, heterocyclic, alkoxy, and amino groups (including unsubstituted amino, alkylamino, arylamino and heterocyclic amino groups), more preferably from hydrogen, alkyl, aryl, heterocyclic, alkoxy, alkylamino, arylamio and heterocyclic amino groups. Where $G^1$ is —COCO—, independent of $R^2$, $R^1$ is preferably selected from alkoxy, aryloxy, and amino groups, more preferably from substituted amino groups, specifically alkylamino, arylamino and saturated or unsaturated heterocyclic amino groups.

Where $G^1$ is —$SO_2$—, independent of $R^2$, $R^1$ is preferably selected from alkyl, aryl and substituted amino groups.

In formula (H), $G^1$ is preferably —CO— or —COCO—, and most preferably —CO—.

Illustrative, non-limiting, examples of the compound represented by formula (H) are given below.

TABLE 1

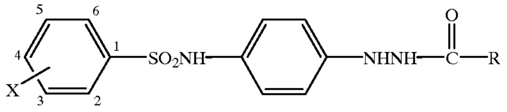

| | X = | R = —H | R = —$C_2F_4$—COOH or (—$C_2F_4$—$COO^{\ominus}$ $K^{\oplus}$) | R = 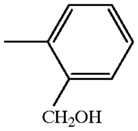 | R = 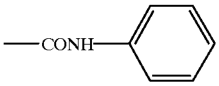 |
|---|---|---|---|---|---|
| H-1 | 3-NHCO—$C_9H_{19}$(n) | 1a | 1b | 1c | 1d |
| H-2 | 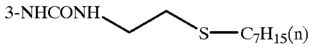 | 2a | 2b | 2c | 2d |
| H-3 | 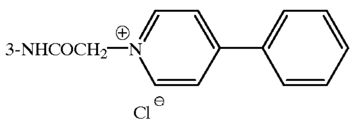 | 3a | 3b | 3c | 3d |
| H-4 | 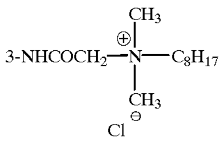 | 4a | 4b | 4c | 4d |
| H-5 | 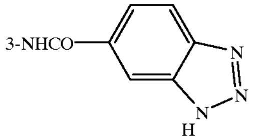 | 5a | 5b | 5c | 5d |
| H-6 | 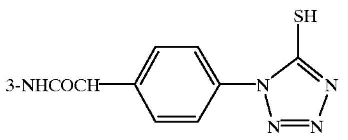 | 6a | 6b | 6c | 6d |
| H-7 | 2,4-$(CH_3)_2$-3-$SC_2H_4$—$(OC_2H_4)_4$—$OC_8H_{17}$ | 7a | 7b | 7c | 7d |

TABLE 2
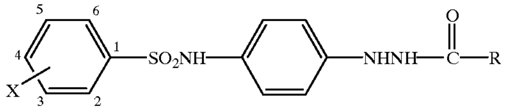
| | | R = | | | |
|---|---|---|---|---|---|
| | X = | —H | —$CF_2H$ | 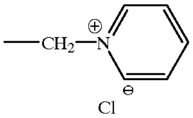 | 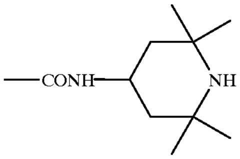 |
| H-8 | 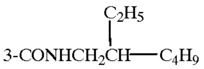 | 8a | 8e | 8f | 8g |
| H-9 | 6-$OCH_3$-3-$C_5H_{11}$(t) | 9a | 9e | 9f | 9g |
| H-10 | 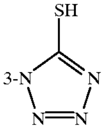 | 10a | 10e | 10f | 10g |
| H-11 | 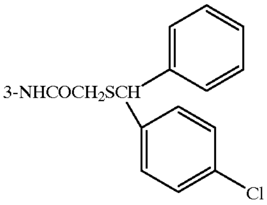 | 11a | 11e | 11f | 11g |
| H-12 | 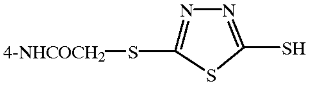 | 12a | 12e | 12f | 12g |
| H-13 | 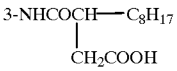 | 13a | 13e | 13f | 13g |
| H-14 | 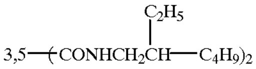 | 14a | 14e | 14f | 14g |

TABLE 3
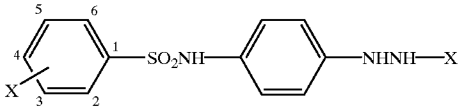
| | Y = | X = —CHO | —$COCF_3$ | —$SO_2CH_3$ | 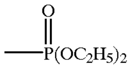 |
|---|---|---|---|---|---|
| H-15 | 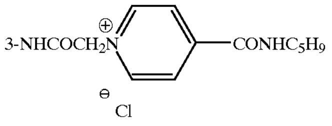 | 15a | 15h | 15i | 15j |
| H-16 | 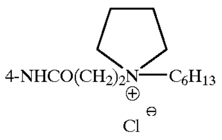 | 16a | 16h | 16i | 16j |
| H-17 | 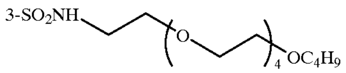 | 17a | 17h | 17i | 17j |
| H-18 | 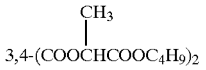 | 18a | 18h | 18i | 18j |
| H-19 | 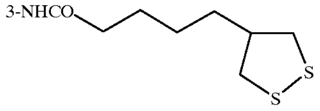 | 19a | 19h | 19i | 19j |
| H-20 | 3-$NHSO_2NH$—$C_8H_{17}$ | 20a | 20h | 20i | 20j |
| H-21 |  | 21a | 21h | 21i | 21j |

TABLE 4
| | | R = | | | |
|---|---|---|---|---|---|
| | | —H | —$CF_3$ | 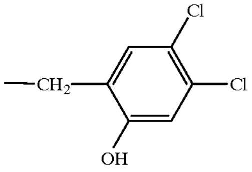 | 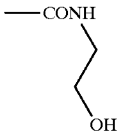 |
| H-22 | 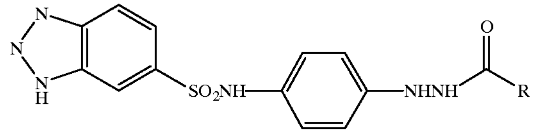 | 22a | 22h | 22k | 22l |
| H-23 | 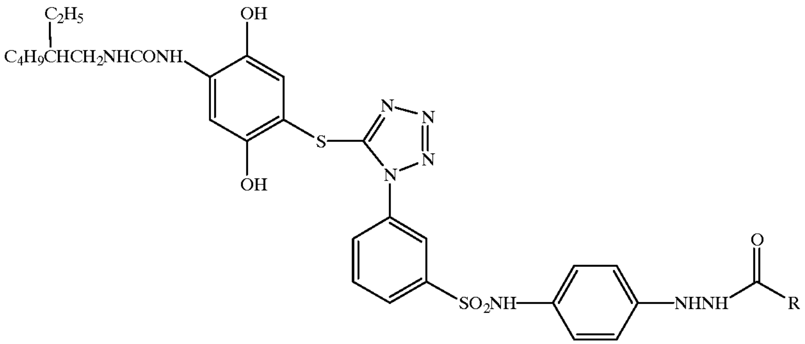 | 23a | 23h | 23k | 231 |

TABLE 4-continued
| | | R = | | | |
|---|---|---|---|---|---|
| | | —H | —$CF_3$ | 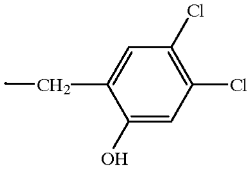 | 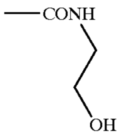 |
| H-24 | 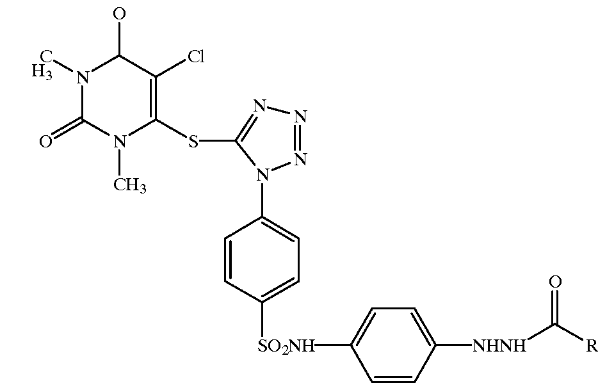 | 24a | 24h | 24k | 241 |
| H-25 | 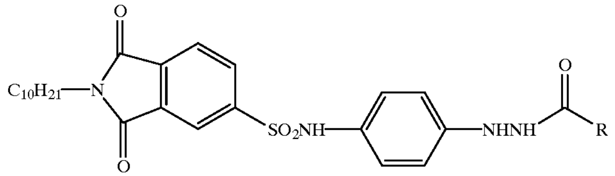 | 25a | 25h | 25k | 251 |

TABLE 4-continued
| | R = | | | |
|---|---|---|---|---|
| | —H | $—CF_3$ | 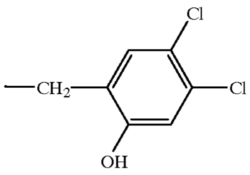 | 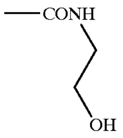 |
| H-26 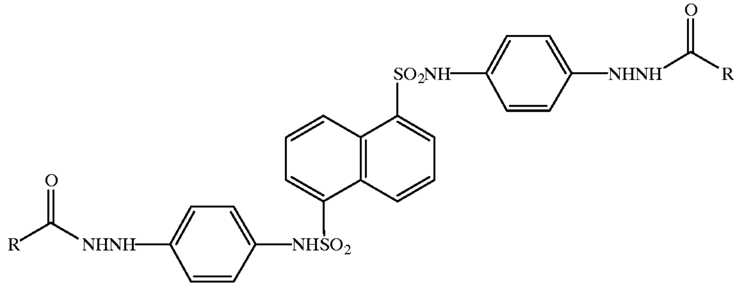 | 26a | 26h | 26k | 261 |
| H-27 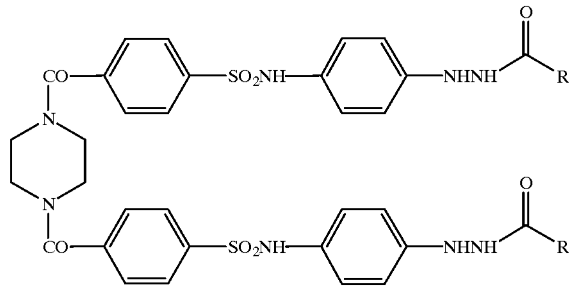 | 27a | 27h | 27k | 271 |

TABLE 4-continued
| | | R = | | | |
|---|---|---|---|---|---|
| | | —H | —$CF_3$ | 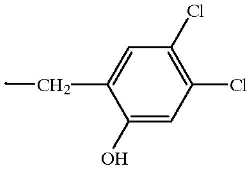 | 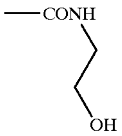 |
| H-28 | 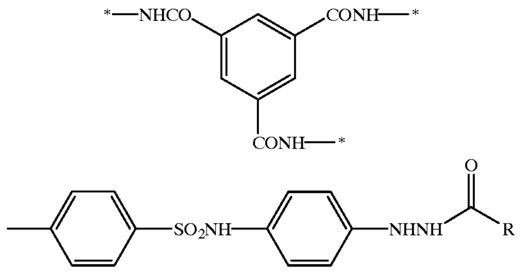 | 28a | 28h | 28k | 281 |

TABLE 5
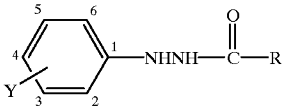
| | Y = | R = —H | —$CH_2OCH_3$ | 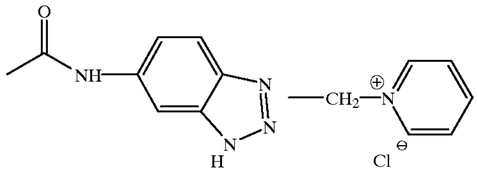 | |
|---|---|---|---|---|---|
| H-29 | 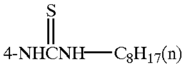 | 29a | 29m | 29n | 29f |
| H-30 | 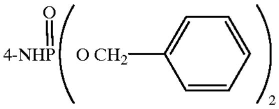 | 30a | 30m | 30n | 30f |
| H-31 | 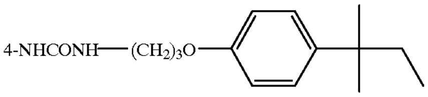 | 31a | 31m | 31n | 31f |
| H-32 | 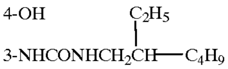 | 32a | 32m | 32n | 32f |
| H-33 | 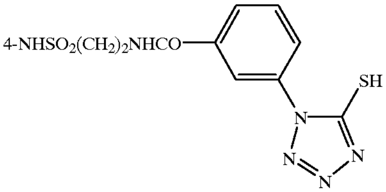 | 33a | 33m | 33n | 33f |
| H-34 | 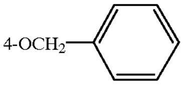 | 34a | 34m | 34n | 34f |
| H-35 | 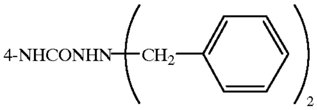 | 35a | 35m | 35n | 35f |

TABLE 6
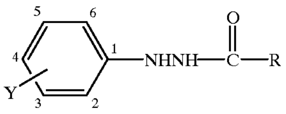
| | | R = | | | |
|---|---|---|---|---|---|
| | Y = | —H | $—CF_2SCH_3$ | $—CONHCH_3$ | 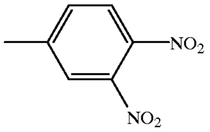 |
| H-36 | $2-NHSO_2CH_3$— 4-$NHCONH(CH_2)_3$— 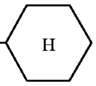 | 36a | 36o | 36p | 36q |
| H-37 | $2-OCH_3$- $4-NHSO_2C_{12}H_{25}$ | 37a | 37o | 37p | 37q |
| H-38 | $3-NHCOC_{11}H_{23}$- $4-NHSO_2CF_3$ | 38a | 38o | 38p | 38q |
| H-39 | 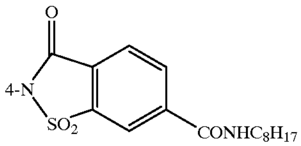 | 39a | 39o | 39p | 39q |
| H-40 | $4-OCO(CH_2)_2COOC_6H_{13}$ | 40a | 40o | 40p | 40q |
| H-41 | 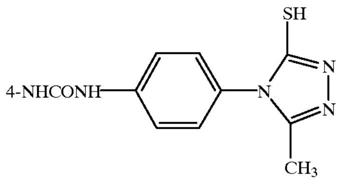 | 41a | 41o | 41p | 41q |
| H-42 | 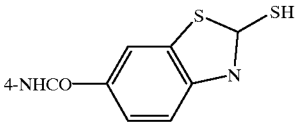 | 42a | 42o | 42p | 42q |

TABLE 7
H-43
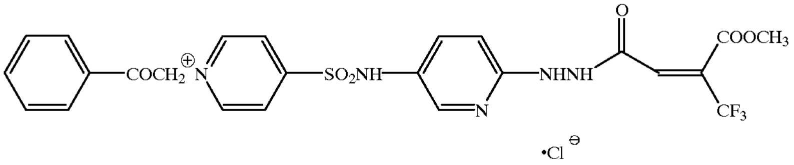
H-44
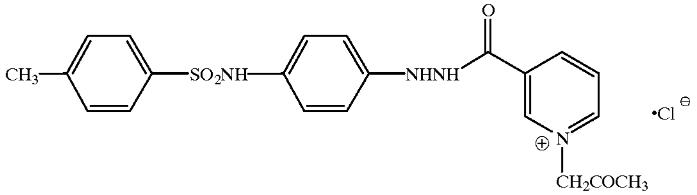
H-45
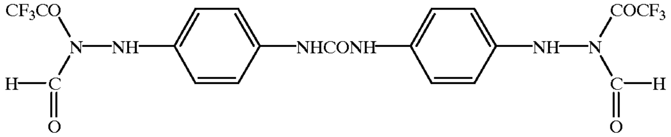
H-46
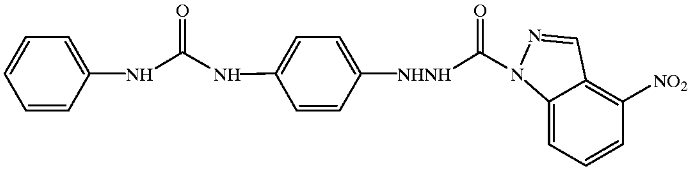
H-47
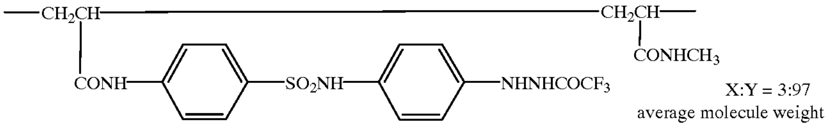
X:Y = 3:97
average molecule weight - 100,000
H-48
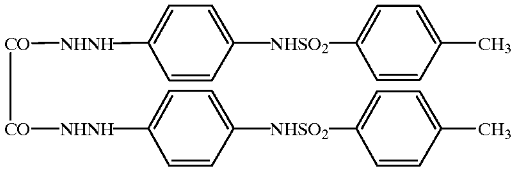
H-49
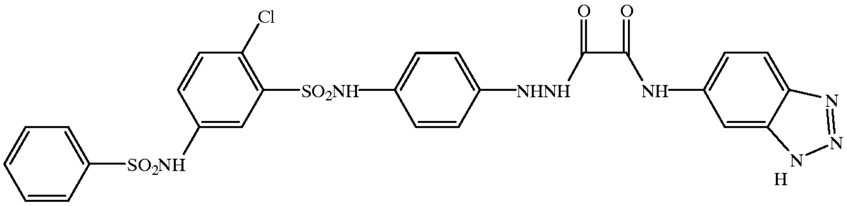
H-50
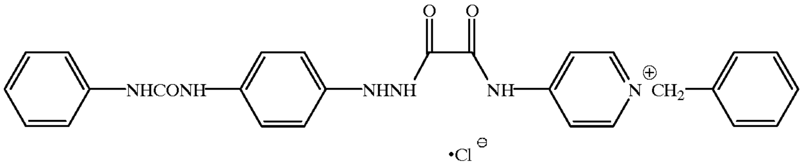

TABLE 8
| | |
|---|---|
| H-51 | 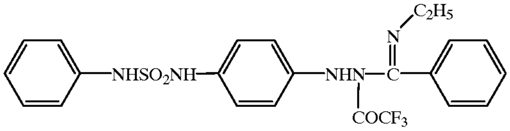 |
| H-52 | 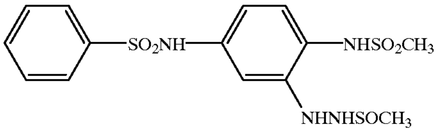 |
| H-53 | 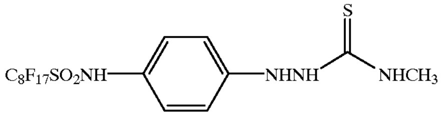 |
TABLE 9
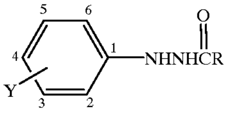
| | | R = | | | |
|---|---|---|---|---|---|
| | Y = | —H | $—CH_2OCH_3$ | 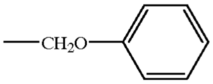 | $—CONHC_3H_7$ |
| H-54 | $2-OCH_3$ | 54a | 54m | 54r | 54s |
| H-55 | $2-OCH_3$<br>$5-C_8H_{17}(t)$ | 55a | 55m | 55r | 55s |
| H-56 | $4-NO_2$ | 56a | 56m | 56r | 56s |
| H-57 | $4-CH_3$ | 57a | 57m | 57r | 57s |
| H-58 | 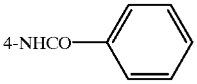 | 58a | 58m | 58r | 58s |
| H-59 | 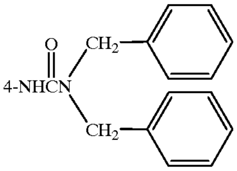 | 59a | 59m | 59r | 59s |

TABLE 10
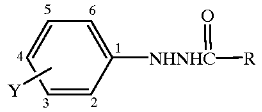
| | | R = | | | |
|---|---|---|---|---|---|
| | Y = | —H | 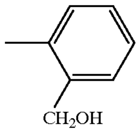 | 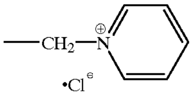 | 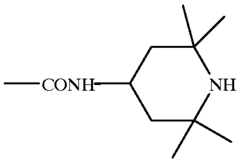 |
| H-60 | 2-$OCH_3$ 5-$OCH_3$ | 60a | 60c | 60f | 60g |
| H-61 | 4-$C_8H_{17}$(t) | 61a | 61c | 61f | 61g |
| H-62 | 4-$OCH_3$ | 62a | 62c | 62f | 62g |
| H-63 | 3-$NO_2$ | 63a | 63c | 63f | 63g |
| H-64 | 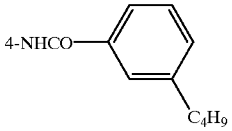 | 64a | 64c | 64f | 64g |
| H-65 | 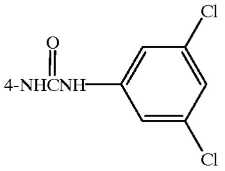 | 65a | 65c | 65f | 65g |
TABLE 11
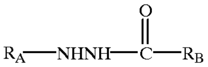
| | | $R_B$ = | | | |
|---|---|---|---|---|---|
| | $R_A$ = | —H | 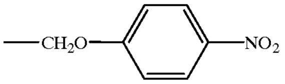 | 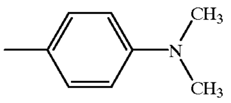 | 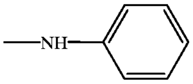 |
| H-66 | 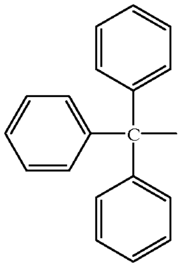 | 66a | 66u | 66v | 66t |

TABLE 11-continued
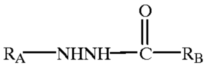
| | $R_A$ = | $R_B$ = —H | 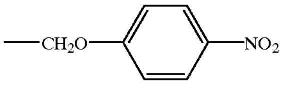 | 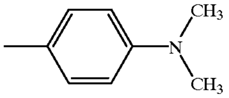 | 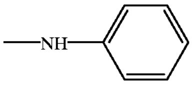 |
|---|---|---|---|---|---|
| H-67 | 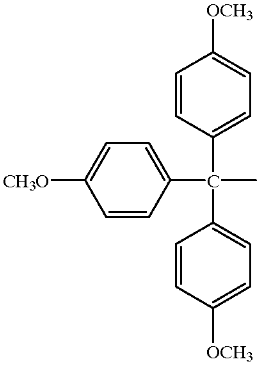 | 67a | 67u | 67v | 67t |
| H-68 | 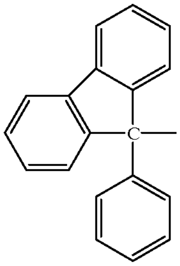 | 68a | 68u | 68v | 68t |
| H-69 | 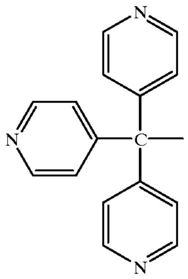 | 69a | 69u | 69v | 69t |
| H-70 | 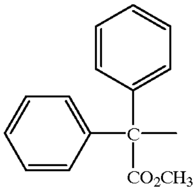 | 70a | 70u | 70v | 70t |

TABLE 11-continued
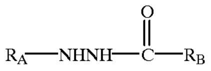
| | $R_A$ = | $R_B$ = | | | |
|---|---|---|---|---|---|
| | | —H | 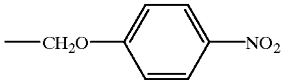 | 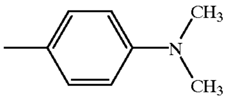 | 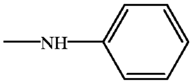 |
| H-71 | 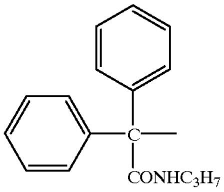 | 71a | 71u | 71v | 71t |
TABLE 12
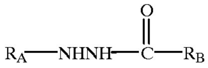
| | $R_A$ = | $R_B$ = | | | |
|---|---|---|---|---|---|
| | | 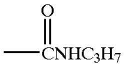 | 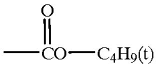 | —$OC_4H_9$(t) | 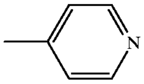 |
| H-72 | 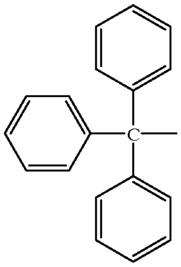 | 72s | 72x | 72y | 72w |
| H-73 | 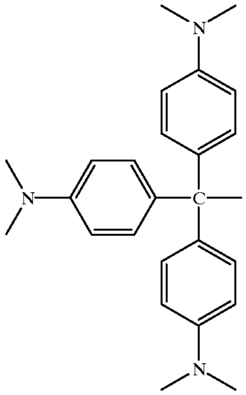 | 73s | 73x | 73y | 73w |

TABLE 12-continued
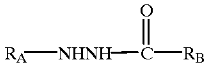
| | $R_B$ = | | | |
|---|---|---|---|---|
| $R_A$ = | 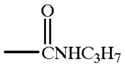 | 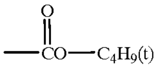 | $—OC_4H_9(t)$ | 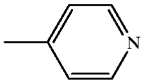 |
| H-74 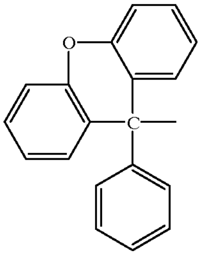 | 74s | 74x | 74y | 74w |
| H-75 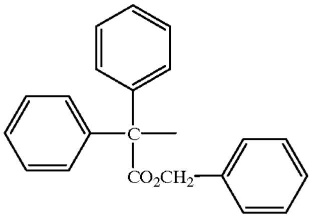 | 75s | 75x | 75y | 75w |
| H-76 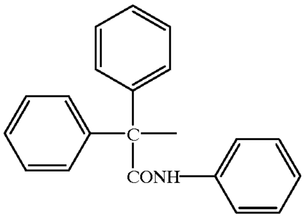 | 76s | 76x | 76y | 76w |

TABLE 13
| |
|---|
| 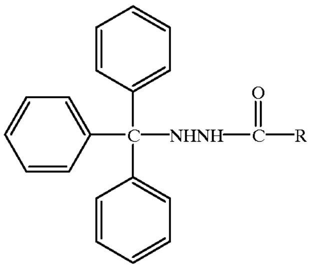 |
| R = |
| | |
|---|---|
| H-77 | 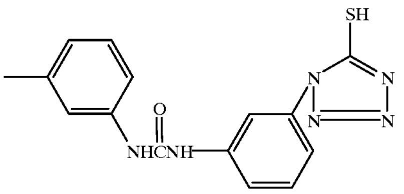 |
| H-78 | 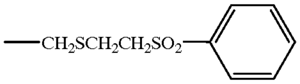 |
| H-79 | $-CH_2OCH_2CH_2SCH_2CH_2OCH_3$ |
| H-80 | $-CF_2CF_2COOH$ |
| H-81 | 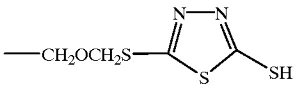 |
| H-82 | 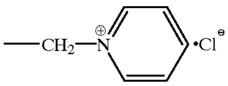 |
TABLE 14
| | |
|---|---|
| H-83 | 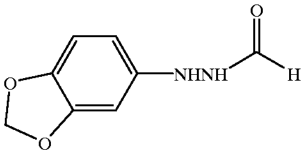 |
| H-84 | 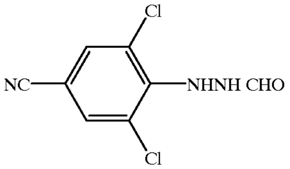 |
| H-85 | 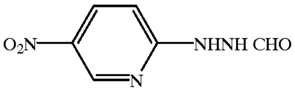 |
| H-86 | 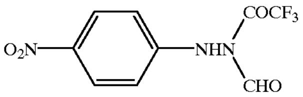 |
| H-87 | 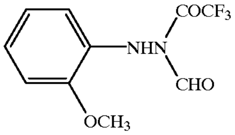 |
| H-88 | 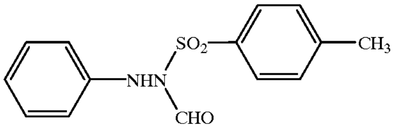 |
TABLE 15
| | |
|---|---|
| H-89 | 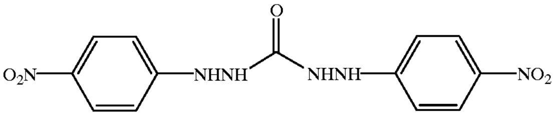 |
| H-90 | 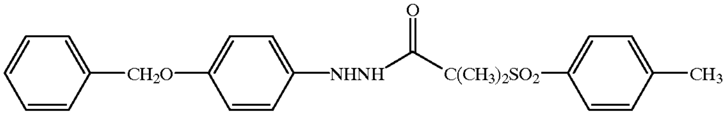 |

TABLE 15-continued
H-91
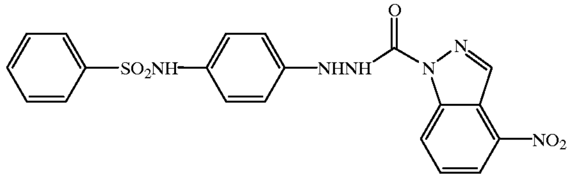
H-92
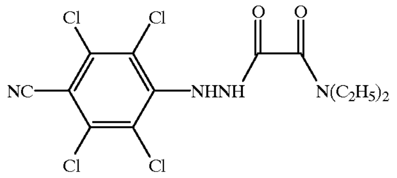
H-93
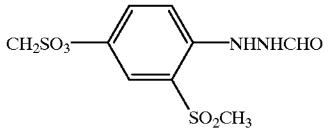
H-94
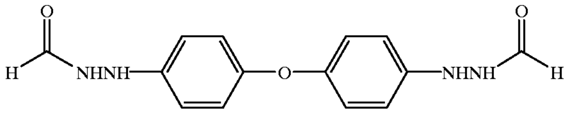

TABLE 16
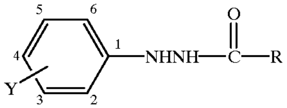
| | Y = | R = 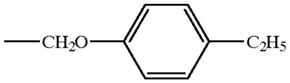 | 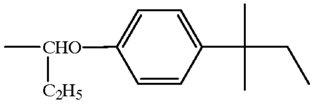 | 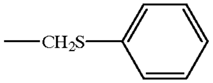 | —$CH_2$—Cl |
|---|---|---|---|---|---|
| H-95 | 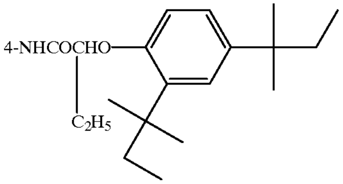 | 95-1 | 95-2 | 95-3 | 95-4 |
| H-96 | 4-COOH | 96-1 | 96-2 | 96-3 | 96-4 |
| H-97 | 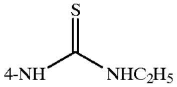 | 97-1 | 97-2 | 97-3 | 97-4 |
| H-98 | 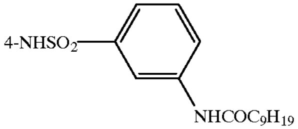 | 98-1 | 98-2 | 98-3 | 98-4 |

TABLE 16-continued
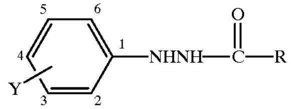
| | Y = | R = 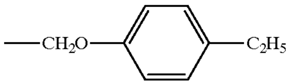 | 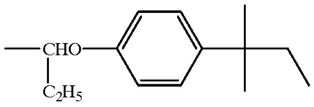 | 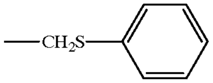 | —$CH_2$—Cl |
|---|---|---|---|---|---|
| H-99 | 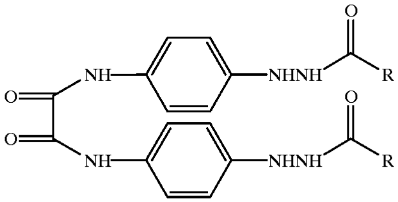 | 99-1 | 99-2 | 99-3 | 99-4 |
| H-100 | 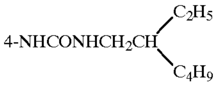 | 100-1 | 100-2 | 100-3 | 100-4 |

TABLE 17
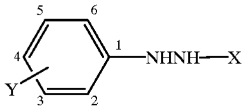
| | Y = | X = | | | |
|---|---|---|---|---|---|
| | | 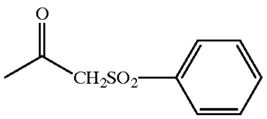 | 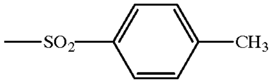 | 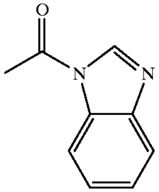 | 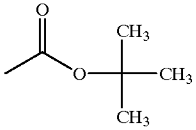 |
| H-101 | 4-$NO_2$ | 101-5 | 101-6 | 101-7 | 101y |
| H-102 | 2,4-$OCH_3$ | 102-5 | 102-6 | 102-7 | 102y |
| H-103 | 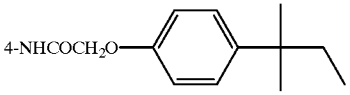 | 103-5 | 103-6 | 103-7 | 103y |
| X = | | X = | | | |
| Y = | 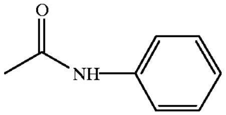 | 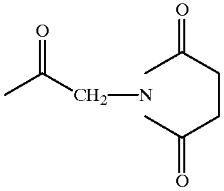 | 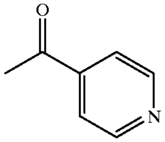 | 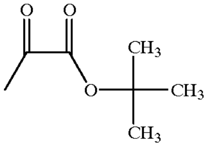 | |
| H-104 | 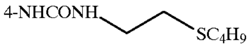 | 104-8 | 104-9 | 104w' | 104x |
| H-105 | 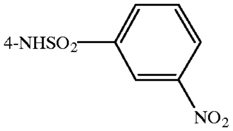 | 105-8 | 105-9 | 105w' | 105x |

TABLE 18
Y—NHNH—X
| Y = | | X = | | | |
|---|---|---|---|---|---|
| | | 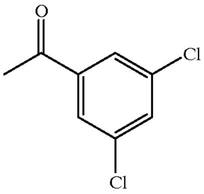 | 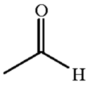 | 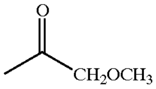 | 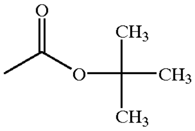 |
| H-106 | 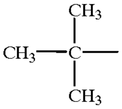 | 106-10 | 106a | 106m | 106y |
| H-107 | 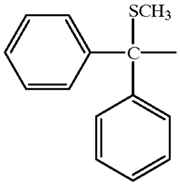 | 107-10 | 107a | 107m | 107y |
| H-108 | 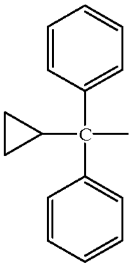 | 108-10 | 108a | 108m | 108y |
| H-109 | 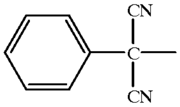 | 109-10 | 109a | 109m | 109y |
| H-110 | 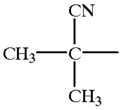 | 110-10 | 110a | 110m | 110y |
| H-111 | 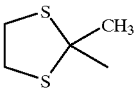 | 111-10 | 111a | 111m | 111y |

TABLE 19
Y—NHNH—X
| | | X = | | | |
|---|---|---|---|---|---|
| Y = | | 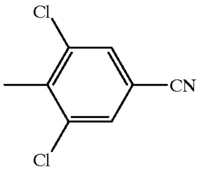 | 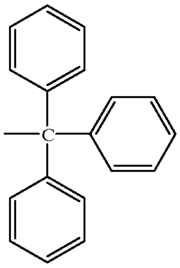 | 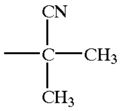 | 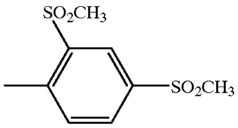 |
| H-112 | 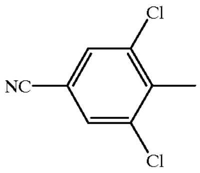 | 112-11 | 112-12 | 112-13 | 112-14 |
| H-113 | 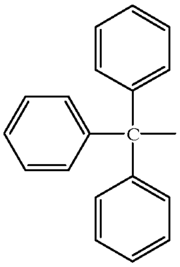 | 113-11 | 113-12 | 1i3-13 | 113-14 |
| H-114 | 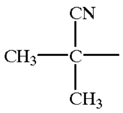 | 114-11 | 114-12 | 114-13 | 114-14 |
| H-115 | 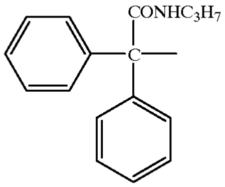 | 115-11 | 115-12 | 115-13 | 115-14 |
| H-116 | 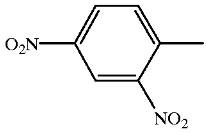 | 116-11 | 116-12 | 116-13 | 116-14 |
| H-117 | 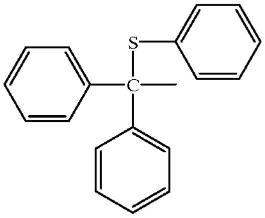 | 117-11 | 117-12 | 117-13 | 117-14 |

TABLE 20
H-118
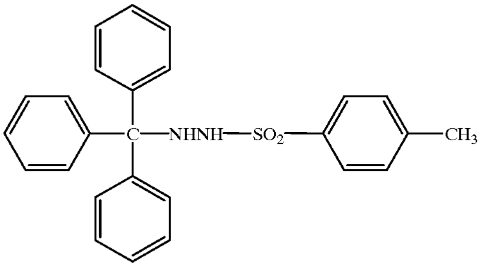
H-119
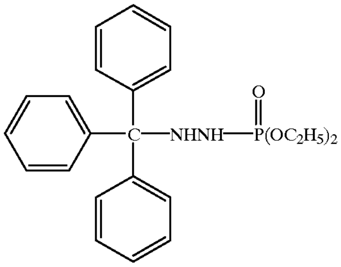
H-120
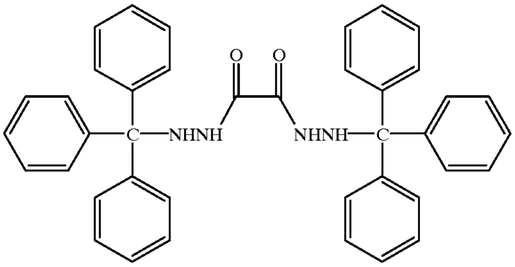
H-121
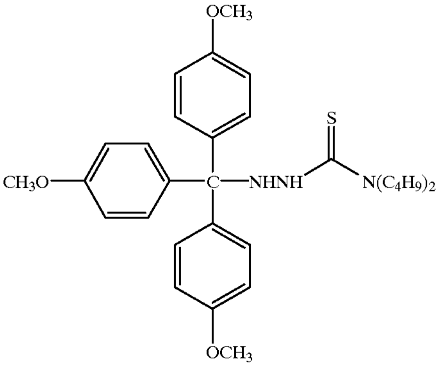
H-122
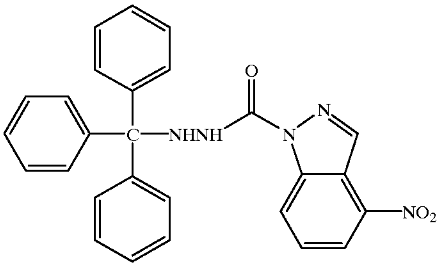

TABLE 20-continued
| | |
|---|---|
| H-123 | 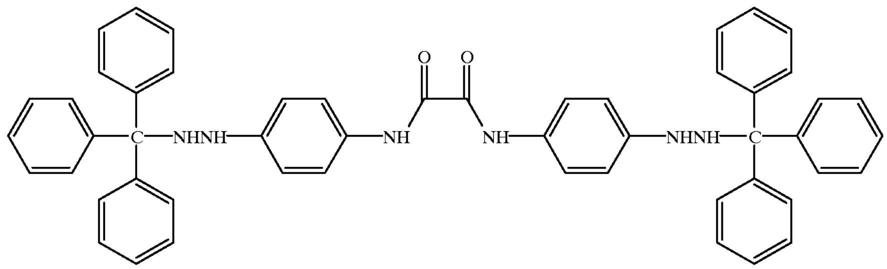 |
TABLE 21
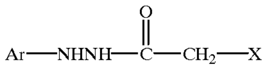
| | Ar = | X = —OH | —SH | —NHCOCF$_3$ | —NHSO$_2$CH$_3$ | —NHSO$_2$ph | —N(CH$_3$)$_2$ |
|---|---|---|---|---|---|---|---|
| H-124 | 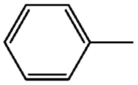 | 124a | 124b | 124c | 124d | 124e | 124f |
| H-125 | 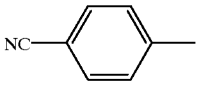 | 125a | 125b | 125c | 125d | 126e | 125f |
| H-126 | 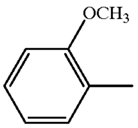 | 126a | 126b | 126c | 126d | 126e | 126f |
| H-127 | 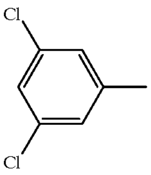 | 127a | 127b | 127c | 127d | 127e | 127f |
| H-128 | 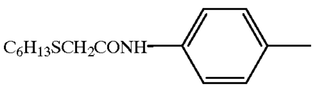 | 128a | 128b | 128c | 128d | 128e | 128f |
| H-129 | 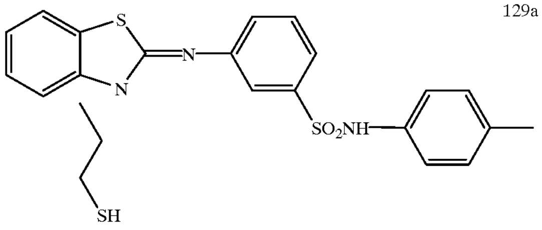 | 129a | 129b | 129c | 129d | 129e | 129f |

TABLE 21-continued
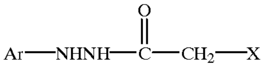
| | Ar = | X = —OH | —SH | $—NHCOCF_3$ | $—NHSO_2CH_3$ | $—NHSO_2ph$ | $—N(CH_3)_2$ |
|---|---|---|---|---|---|---|---|
| H-130 | 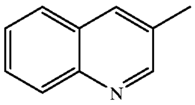 | 130a | 130b | 130c | 130d | 130e | 130f |
| H-131 | 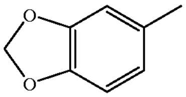 | 131a | 131b | 131c | 131d | 131e | 131f |
| H-132 | 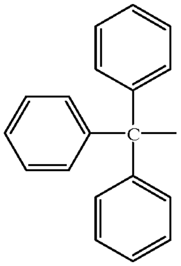 | 132a | 132b | 132c | 132d | 132e | 132f |
| H-133 | 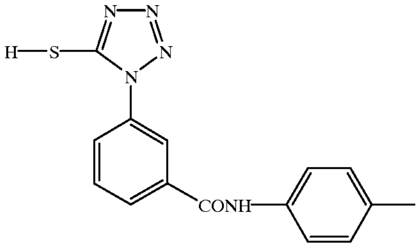 | 133a | 133b | 133c | 133d | 133e | 133f |
| H-134 | 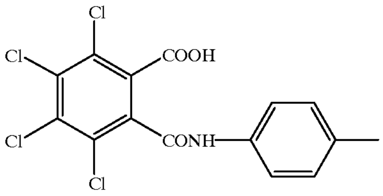 | 134a | 134b | 134c | 134d | 134e | 134f |

TABLE 22

| | |
|---|---|
| H-135 | 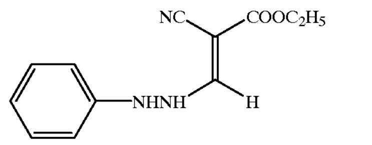 |
| H-136 | 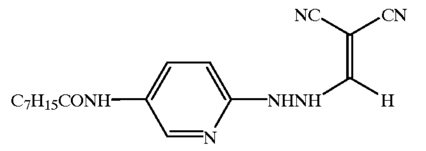 |
| H-137 | 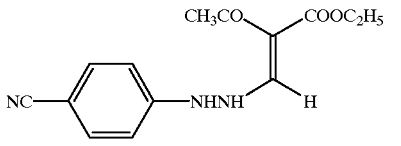 |
| H-138 | 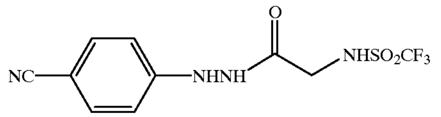 |
| H-139 | 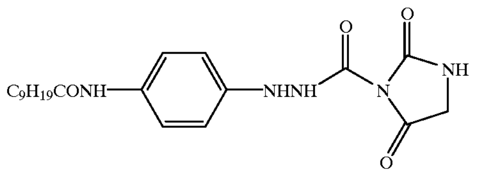 |
| H-140 | 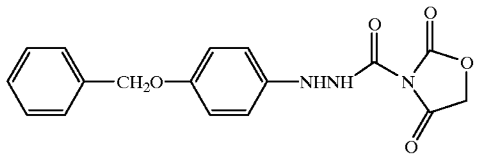 |

The hydrazine derivatives of formula (H) may be used alone or in admixture of two or more.

In addition to the above-described ones, the following hydrazine derivatives are also preferable for use in the practice of the invention. If desired, any of the following hydrazine derivatives may be used in combination with the hydrazine derivatives of formula (H). The hydrazine derivatives which are used herein can be synthesized by various methods as described in the following patents.

Exemplary hydrazine derivatives which can be used herein include the compounds of the chemical formula [1] in JP-B 77138/1994, more specifically the compounds described on pages 3 and 4 of the same; the compounds of the general formula (I) in JP-B 93082/1994, more specifically compound Nos. 1 to 38 described on pages 8 to 18 of the same; the compounds of the general formulae (4), (5) and (6) in JP-A 230497/1994, more specifically compounds 4–1 to 4–10 described on pages 25 and 26, compounds 5–1 to 5–42 described on pages 28 to 36, and compounds 6–1 to 6–7 described on pages 39 and 40 of the same; the compounds of the general formulae (1) and (2) in JP-A 289520/1994, more specifically compounds 1—1 to 1–17 and 2–1 described on pages 5 to 7 of the same; the compounds of the chemical formulae [2] and [3] in JP-A 313936/1994, more specifically the compounds described on pages 6 to 19 of the same; the compounds of the chemical formula [1] in JP-A 313951/1994, more specifically the compounds described on pages 3 to 5 of the same; the compounds of the general formula (I) in JP-A 5610/1995, more specifically compounds I-1 to I-38 described on pages 5 to 10 of the same; the compounds of the general formula (II) in JP-A 77783/1995, more specifically compounds II-1 to II-102 described on pages 10 to 27 of the same; the compounds of the general formulae (H) and (Ha) in JP-A 104426/1995, more specifically compounds H-1 to H-44 described on pages 8 to 15 of the same; the compounds having an anionic group in proximity to a hydrazine group or a nonionic group capable of forming an intramolecular hydrogen bond with the hydrogen atom of hydrazine described in EP 713131A, especially compounds of the general formulae (A), (B), (C), (D), (E), and (F), more specifically compounds N-1 to N-30 described therein; and the compounds of the general formula (1) in EP 713131A, more specifically compounds D-1 to D-55 described therein.

Also useful are the hydrazine derivatives described in "Known Technology," Aztech K. K., Mar. 22, 1991, pages 25–34 and Compounds D-2 and D-39 described in JP-A 86354/1987, pages 6–7.

In the practice of the invention, the hydrazine nucleating agent is used as solution in water or a suitable organic solvent. Suitable solvents include alcohols (e.g, methanol, ethanol, propanol, and fluorinated alcohols), ketones (e.g., acetone and methyl ethyl ketone), dimethylformamide, dimethyl sulfoxide and methyl cellosolve.

A well-known emulsifying dispersion method may be used for dissolving the hydrazine derivative with the aid of an oil such as dibutyl phthalate, tricresyl phosphate, glyceryl triacetate or diethyl phthalate or an auxiliary solvent such as ethyl acetate or cyclohexanone whereby an emulsified dispersion is mechanically prepared. Alternatively, a method known as a solid dispersion method is used for dispersing the hydrazine derivative in powder form in a suitable solvent in a ball mill, colloidal mill or ultrasonic mixer.

The hydrazine nucleating agent may be added to an image forming layer or any other layer on the image forming layer side of a support, and preferably to the image forming layer or a layer disposed adjacent thereto or both.

The nucleating agent is preferably used in an amount of $1\times10^{-6}$ mol to 1 mol, more preferably $1\times10^{-5}$ mol to $5\times10^{-1}$ mol, and most preferably $2\times10^{-5}$ mol to $2\times10^{-1}$ mol per mol of silver halide.

Other useful contrast enhancers which can be used herein are substituted alkene derivatives, substituted isoxazole derivatives, and specific acetal compounds of the following formulas (B-I), (B-II), and (B-III), respectively.

(B-I)

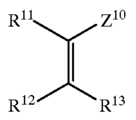

In formula (B-I), $R^{11}$, $R^{12}$, and $R^{13}$ are independently hydrogen or monovalent substituents, and $Z^{10}$ is an electron attractive group or silyl group. $R^{11}$ and $Z^{10}$, $R^{12}$ and $R^{13}$, $R^{11}$ and $R^{12}$, or $R^{13}$ and $Z^{10}$, taken together, may form a cyclic structure.

(B-II)

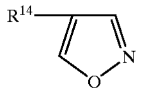

In formula (B-II), $R^{14}$ is a monovalent substituent.

(B-III)

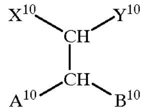

In formula (B-III), $X^{10}$ and $Y^{10}$ are independently hydrogen or monovalent substituents, $A^{10}$ and $B^{10}$ are independently alkoxy, alkylthio, alkylamino, aryloxy, arylthio, heterocyclic thio, or anilino groups. $X^{10}$ and $Y^{10}$, or $A^{10}$ and $B^{10}$, taken together, may form a cyclic structure.

First, the substituted alkene derivatives of formula (B-I) are described in detail. In formula (B-I), $R^{11}$, $R^{12}$, and $R^{13}$ are independently hydrogen or monovalent substituents, and $Z^{10}$ is an electron attractive group or silyl group. $R^{11}$ and $Z^{10}$, $R^{12}$ and $R^{13}$, $R^{11}$ and $R^{12}$, or $R^{13}$ and $Z^{10}$, taken together, may form a cyclic structure.

When $R^{11}$, $R^{12}$, and $R^{13}$ represent monovalent substituents. Exemplary monovalent substituents include halogen atoms (e.g., fluorine, chlorine, bromine and iodine atoms), alkyl groups (including aralkyl, cycloalkyl and active methine groups), alkenyl groups, alkynyl groups, aryl groups, heterocyclic groups, quaternized nitrogen atom-containing heterocyclic groups (such as pyridinio), acyl groups, alkoxycarbonryl groups, aryloxycarbonyl groups, carbamoyl groups, carboxy groups or salts thereof, imino groups, thiocarbonyl groups, sulfonylcarbamoyl groups, acylcarbamoyl groups, sulfamoylcarbamoyl groups, carbazoyl groups, oxalyl groups, oxamoyl groups, cyano groups, thiocarbamoyl groups, hydroxy groups, alkoxy groups (including groups containing recurring ethylenoxy or propylenoxy units), aryloxy groups, heterocyclic oxy groups, acyloxy groups, (alkoxy or aryloxy)carbonyloxy groups, carbamoyloxy groups, sulfonyloxy groups, amino groups, (alkyl, aryl or heterocyclic) amino groups, N-substituted nitrogenous heterocyclic groups, acylamino groups, sulfonamide groups, ureido groups, thioureido groups, imide groups, (alkoxy or aryloxy) carbonylamino groups, sulfamoylamino groups, semicarbazide groups, thiosemicarbazide groups, hydrazino groups, quaternary ammonio groups, oxamoylamino groups, (alkyl or aryl) sulfonylureido groups, acylureido groups, acylsulfamoylamino groups, nitro groups, mercapto groups, (alkyl, aryl or heterocyclic) thio groups, (alkyl or aryl)sulfonyl groups, (alkyl or aryl) sulfinyl groups, sulfo groups or salts thereof, sulfamoyl groups, acylsulfamoyl groups, sulfonylsulfamoyl groups or salts thereof, phosphoramide or phosphate structure-bearing groups, silyl groups, and stannyl groups. These substituents may be further replaced by other substituents selected from the foregoing examples.

In formula (B-I), $Z^{10}$ is an electron attractive group or silyl group. The electron attractive group is a substituent whose Hammett substituent constant σp has a positive. value. Exemplary electron attractive groups are cyano groups, alkoxycarbonyl groups, aryloxycarbonyl groups, carbamoyl groups, imino groups, thiocarbonyl groups, sulfamoyl groups, alkylsulfonyl groups, arylsulfonyl groups, nitro groups, halogen atoms, perfluoroalkyl groups, acyl groups, formyl groups, phosphoryl groups, carboxy groups (or salts thereof), sulfo groups (or salts thereof), heterocyclic groups, alkenyl groups, alkynyl groups, acyloxy groups, acylthio groups, sulfonyloxy groups, sulfonamide groups, and aryl groups having such electron attractive groups substituted thereon. The heterocyclic groups include saturated or unsaturated heterocyclic groups, for example, pyridyl, quinolyl, pyrazinyl, benzotriazolyl, imidazolyl, benzimidazolyl, hydantoin-1-yl, succinimide and phthalimide groups.

The electron attractive group represented by $Z^{10}$ in formula (B-I) may have a substituent or substituents which are selected from the same substituents that the monovalent substituents represented by $R^{11}$, $R^{12}$ and $R^{13}$ in formula (B-I) may have.

In formula (B-I), $R^{11}$ and $Z^{10}$, $R^{12}$ and $R^{13}$, $R^{11}$ and $R^{12}$ or $R^{13}$ and $Z^{10}$, taken together, may form a cyclic structure, which is a saturated carbocyclic or saturated heterocyclic one.

Described below is the preferred range of the compounds of formula (B-I). Preferred examples of the electron attractive group represented by $Z^{10}$ in formula (B-I) include groups having 0 to 20 carbon atoms in total, for example, cyano, alkoxycarbonyl, aryloxycarbonyl, carbamoyl, imino, sulfamoyl, alkylsulfonyl, arylsulfonyl, nitro, perfluoroalkyl, acyl, formyl, phosphoryl, acyloxy, and acylthio groups, sulfonamide groups, and phenyl groups having an electron attractive group substituted thereon. More preferred examples include cyano, alkoxycarbonyl, carbamoyl, imino, sulfamoyl, alkylsulfonyl, arylsulfonyl, acyl, formyl, phosphoryl, and trifluoromethyl groups, and phenyl groups having an electron attractive group substituted thereon. Further preferred examples include cyano, formyl, acyl, alkoxycarbonyl, imino and carbamoyl groups. Cyano and formyl groups are most preferred.

Examples of the silyl group represented by $Z^{10}$ in formula (B-I) include trimethylsilyl, t-butyldimethylsilyl, phenyldimethylsilyl, triethylsilyl, triisopropylsilyl and trimethylsilyldimethylsilyl groups.

The monovalent substituents represented by $R^{11}$, $R^{12}$ and $R^{13}$ in formula (B-I) are preferably groups having 0 to 25 carbon atoms in total, for example, the same groups as the electron attractive groups represented by $Z^{10}$ in formula (B-I), as well as alkyl, hydroxy (or salts thereof), mercapto (or salts thereof), alkoxy, aryloxy, heterocyclic oxy, alkylthio, arylthio, heterocyclic thio, amino, alkylamino, arylamino, heterocyclic amino, ureido, amide, and substituted or unsubstituted aryl groups.

In formula (B-I), $R^{11}$ is preferably an electron attractive group or aryl group. When $R^{11}$ represents electron attractive groups, they are preferably cyano, nitro, acyl, formyl, alkoxycarbonyl, aryloxycarbonyl, imino, alkylsulfonyl, arylsulfonyl, carbamoyl, sulfamoyl, trifluoromethyl, phosphoryl, carboxy (or salts thereof), and saturated or unsaturated heterocyclic groups; more preferably cyano, acyl, formyl, alkoxycarbonyl, carbamoyl, imino, sulfamoyl, carboxy (or salts thereof), and saturated or unsaturated heterocyclic groups; most preferably cyano, formyl, acyl, alkoxycarbonyl, carbamoyl, and saturated or unsaturated heterocyclic groups.

When $R^{11}$ represents aryl groups, they are preferably substituted or unsubstituted phenyl groups having 6 to 20 carbon atoms in total wherein the substituents, if any, are arbitrary.

The monovalent substituents represented by $R^{12}$ and $R^{13}$ in formula (B-I) are preferably the same groups as the electron attractive groups represented by $Z^{10}$ in formula (B-I), as well as alkyl, hydroxy (or salts thereof), mercapto (or salts thereof), alkoxy, aryloxy, heterocyclic oxy, alkylthio, arylthio, heterocyclic thio, amino, alkylamino, arylamino, heterocyclic amino, and substituted or unsubstituted phenyl groups.

More preferably, one of $R^{12}$ and $R^{13}$ in formula (B-I) is hydrogen and the other is a monovalent substituent. In this case, preferred monovalent substituents are alkyl, hydroxy (or salts thereof), mercapto (or salts thereof), alkoxy, aryloxy, heterocyclic oxy, alkylthio, arylthio, heterocyclic thio, amino, alkylamino, arylamino, heterocyclic amino, substituted or unsubstituted phenyl and heterocyclic groups; more preferably hydroxy (or salts thereof), mercapto (or salts thereof), alkoxy, heterocyclic oxy, alkylthio, heterocyclic thio and heterocyclic groups.

It is also preferred that $Z^{10}$ and $R^{11}$, or $R^{12}$ and $R^{13}$ in formula (B-I) form a cyclic structure together. The cyclic structures formed are saturated carbocyclic or saturated heterocyclic structures having 1 to 25 carbon atoms in total.

Especially preferred of the compounds of formula (B-I) are those wherein $Z^{10}$ is a cyano, formyl, acyl, alkoxycarbonyl or carbamoyl group, $R^{11}$ is an electron withdrawing group or aryl group, one of $R^{12}$ and $R^{13}$ is hydrogen and the other is a hydroxy (or salts thereof), mercapto (or salts thereof), alkoxy, heterocyclic oxy, alkylthio, heterocyclic thio or heterocyclic group. Also preferred are compounds within the above range wherein $Z^{10}$ and $R^{11}$, or $R^{12}$ and $R^{13}$ form a cyclic structure together.

Secondly, the substituted isoxazole derivatives of formula (B-II) are described in detail. In formula (B-II), $R^{14}$ is a monovalent substituent. The definition and examples of the monovalent substituent represented by $R^{14}$ are the same as described for the monovalent substituents represented by $R^{11}$ to $R^{13}$ in formula (B-I).

In formula (B-II), the monovalent substituents represented by $R^{14}$ are preferably electron attractive groups or aryl groups. Preferred examples of the electron attractive groups include groups having 0 to 25 carbon atoms in total, such as cyano, nitro, acyl, formyl, alkoxycarbonyl, aryloxycarbonyl, alkylsulfonyl arylsulfonyl, carbamoyl, sulfamoyl, trifluoromethyl, phosphoryl, imino, and saturated or unsaturated heterocyclic groups; more preferably cyano, acyl, formyl, alkoxycarbonyl, carbamoyl, sulfamoyl, alkylsulfonyl, arylsulfonyl, and heterocyclic groups; most preferably cyano, formyl, acyl, alkoxycarbonyl, carbamoyl, and heterocyclic groups.

When $R^{14}$ represents aryl, preferred aryl groups are substituted or unsubstituted phenyl groups having 6 to 25 carbon atoms in total. The substituents on the aryl groups are the same as described for the monovalent substituents represented by $R^{11}$ to $R^{13}$ in formula (B-I).

Preferably in formula (B-II), $R^{14}$ represents cyano, alkoxycarbonyl, heterocyclic, or substituted or unsubstituted phenyl groups, and especially cyano or alkoxycarbonyl groups.

Thirdly, the acetal compounds of formula (B-III) are described in detail. In formula (B-III), $X^{10}$ and $Y^{10}$ are independently hydrogen or monovalent substituents, $A^{10}$ and $B^{10}$ are independently alkoxy, alkylthio, alkylamino, aryloxy, arylthio, heterocyclic thio, or anilino groups. $X^{10}$ and $Y^{10}$, or $A^{10}$ and $B^{10}$, taken together, may form a cyclic structure.

The monovalent substituents represented by $X^{10}$ and $Y^{10}$ are the same as described for the monovalent substituents represented by $R^{11}$ to $R^{13}$ in formula (B-I). Exemplary substituents are alkyl (inclusive of perfluoroalkyl and trichloromethyl), aryl, heterocyclic, halogen, cyano, nitro, alkenyl, alkynyl, acyl, alkoxycarbonyl, aryloxycarbonyl, imino, thiocarbonyl, alkylsulfonyl, arylsulfonyl, carbamoyl, sulfamoyl, phosphoryl, carboxy (or salts thereof), sulfo (or salts thereof), hydroxy (or salts thereof), mercapto (or salts thereof), alkoxy, aryloxy, alkylthio, arylthio, heterocyclic thio, amino, alkylamino, arylamino, heterocyclic amino, and silyl groups. These groups may further have substituents. $X^{10}$ and $Y^{10}$ may bond together to form a cyclic structure, which may be either saturated carbocyclic or saturated heterocyclic.

In formula (B-III), the groups represented by $X^{10}$ and $Y^{10}$ are preferably groups having 1 to 30 carbon atoms in total, more preferably 1 to 20 carbon atoms in total, and may further have substituents.

In formula (B-III), preferred monovalent substituents represented by $X^{10}$ and $Y^{10}$ are aryl, silyl or electron attractive groups. The electron attractive groups and silyl groups are as defined for $Z^{10}$ in formula (B-I).

More preferably, the substituents represented by $X^{10}$ and $Y^{10}$ in formula (B-III) are electron attractive groups, for example, cyano, alkoxycarbonyl, aryloxycarbonyl, carbamoyl, imino, sulfamoyl, alkylsulfonyl, arylsulfonyl, nitro, perfluoroalkyl, acyl, formyl, phosphoryl, acyloxy, acylthio, heterocyclic groups and phenyl groups having an electron attractive group substituted thereon.

More preferably, $X^{10}$ and $Y^{10}$ in formula (B-III) represent cyano, alkoxycarbonyl, carbamoyl, sulfamoyl, alkylsulfonyl, arylsulfonyl, acyl, formyl, imino, phosphoryl, trifluoromethyl and heterocyclic groups, and phenyl groups having an electron attractive group substituted thereon. Further preferred are cyano, alkoxycarbonyl, carbamoyl, alkylsulfonyl, arylsulfonyl, acyl, and heterocyclic groups, and phenyl groups having an electron attractive group substituted thereon. It is also preferred that $X^{10}$ and $Y^{10}$ bond together to form a saturated carbocyclic or saturated heterocyclic ring having 3 to 20 carbon atoms in total.

In formula (B-III), $A^{10}$ and $B^{10}$ are independently alkoxy, alkylthio, alkylamino, aryloxy, arylthio, anilino or heterocyclic thio groups. $A^{10}$ and $B^{10}$, taken together, may form a ring.

The groups represented by $A^{10}$ and $B^{10}$ in formula (B-III) are preferably groups having 1 to 30 carbon atoms in total, more preferably 1 to 20 carbon atoms in total, and may further have substituents.

It is more preferred in formula (B-III) that $A^{10}$ and $B^{10}$ bond together to form a ring. Examples of $A^{10}$ bonded to $B^{10}$ (that is, —$A^{10}$—$B^{10}$—) include —O—$(CH_2)_2$—O—, —O—$(CH_2)_3$—O—, —S—$(CH_2)_2$—S—$(CH_2)_2$—O—, —S—$(CH_2)_3$—S—, —S—Ph—S—, —N($CH_3$)—$(CH_2)_2$—O—, —O—$(CH_2)_3$—S—, —N($CH_3$)—Ph—S—, and —N(Ph)—$(CH_2)_2$—S—.

Illustrative examples of the compounds of formulas (B-I), (B-II), and (B-III) are given below although the invention is not limited thereto.

B-1
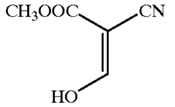
B-2
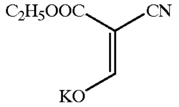
B-3
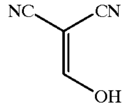
B-4
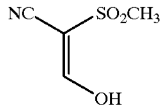
B-5
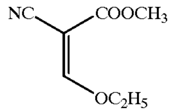
B-6
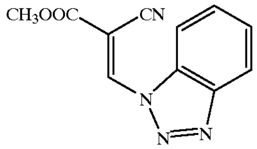
B-7
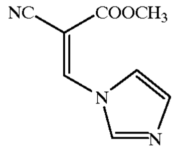
B-8
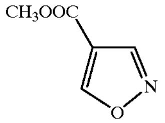
B-9
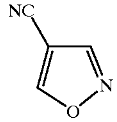
B-10
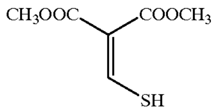
B-11
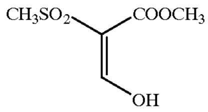
-continued
B-12
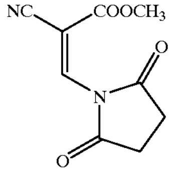
B-13
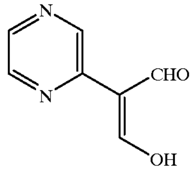
B-14
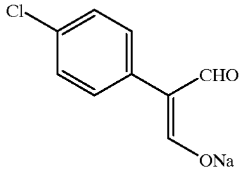
B-15
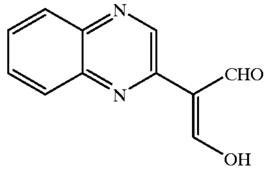
B-16
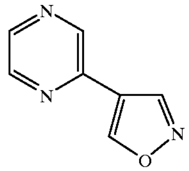
B-17
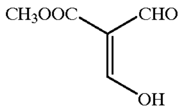
B-18
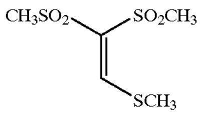
B-19
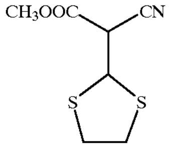
B-20
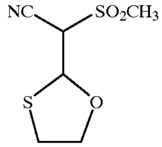

-continued
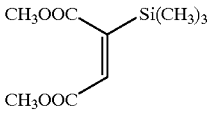
B-21
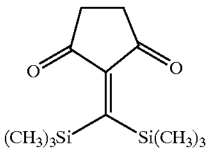
B-22
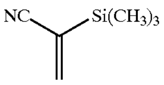
B-23
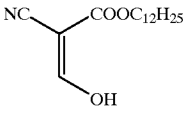
B-24
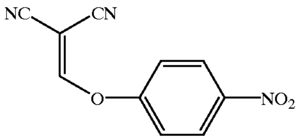
B-25
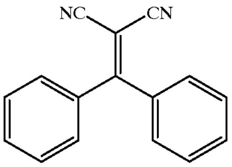
B-26
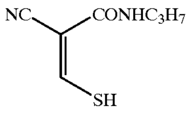
B-27
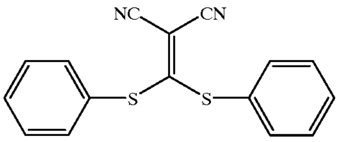
B-28
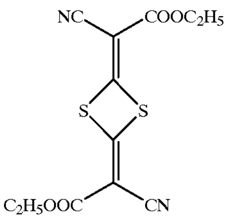
B-29
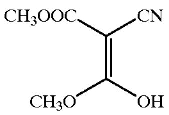
B-30
-continued
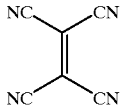
B-31
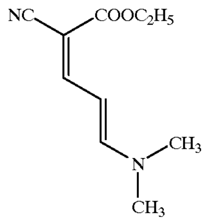
B-32
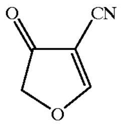
B-33
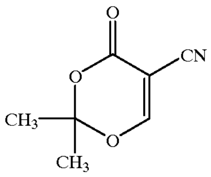
B-34
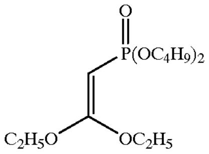
B-35
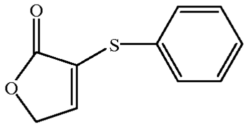
B-36
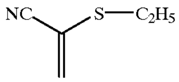
B-37
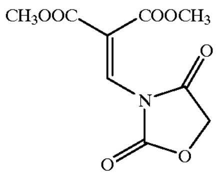
B-38
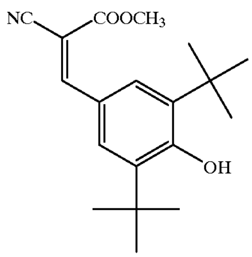
B-39

-continued
B-40
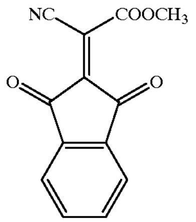
B-41
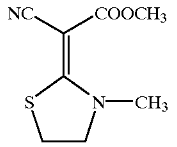
B-42
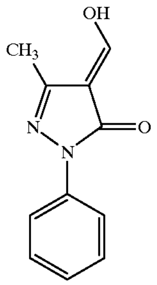
B-43
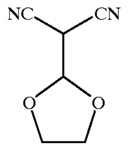
B-44
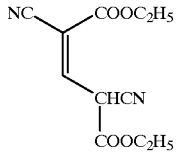
B-45
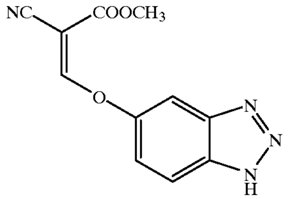
B-46
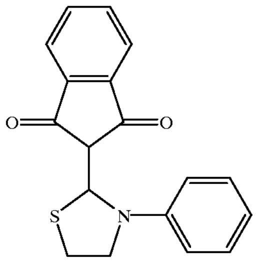
-continued
B-47
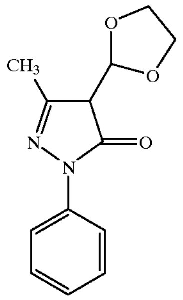
B-48
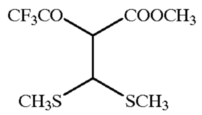
B-49
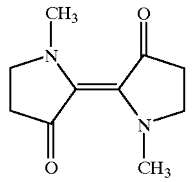
B-50
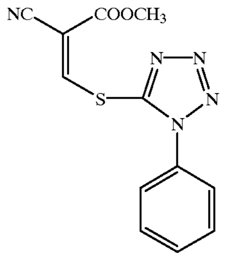
B-51
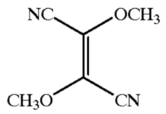
B-52
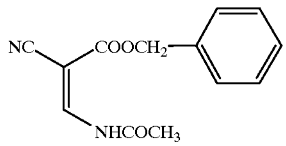
B-53
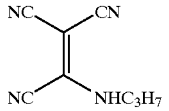
B-54
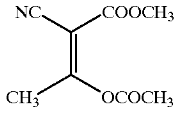

-continued

B-55

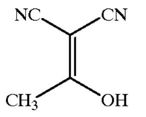

B-56

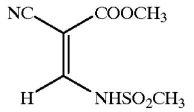

The compounds of formulas (B-I), (B-II), and (B-III) can be readily synthesized by well-known methods, for example,,the methods described in U.S. Pat. Nos. 5,545,515 and 5,635,339.

In the practice of the invention, the compound of formula (B-I) to (B-III) is used as solution in water or a suitable organic solvent. Suitable solvents include alcohols (e.g., methanol, ethanol, propanol, and fluorinated alcohols), ketones (e.g., acetone and methyl ethyl ketone), dimethylformamide, dimethyl sulfoxide and methyl cellosolve.

A well-known emulsifying dispersion method may be used for dissolving the compound of formula (B-I) to (B-III) with the aid of an oil such as dibutyl phthalate, tricresyl phosphate, glyceryl triacetate or diethyl phthalate or an auxiliary solvent such as ethyl acetate or cyclohexanone whereby an emulsified dispersion is mechanically prepared. Alternatively, a method known as a solid dispersion method is used for dispersing the compound of formula (B-I) to (B-III) in powder form in a suitable solvent in a ball mill, colloidal mill or ultrasonic mixer.

The compound of formula (B-I) to (B-III) may be added to an image forming layer or any other layer on the image forming layer side of a support, and preferably to the image forming layer or a layer disposed adjacent thereto or both.

The compound of formula (B-I) to (B-III) is preferably used in an amount of $1\times10^{-6}$ mol to 1 mol, more preferably $1\times10^{-5}$ mol to $5\times10^{-1}$ mol, and most preferably $2\times10^{-5}$ mol to $2\times10^{-1}$ mol per mol of silver. The compounds of formula (B-I) to (B-III) may be used alone or in admixture of two or more.

Also in the practice of the invention, ultrahigh contrast promoting agents may be used in combination with the aforementioned contrast enhancers for forming ultrahigh contrast images. Such ultrahigh contrast promoting agents include the amine compounds described in U.S. Pat. No. 5,545,505, specifically Compounds AM-1 to AM-5 therein, the hydroxamic acids described in U.S. Pat. No. 5,545,507, specifically HA-1 to HA-11 therein, the acrylonitriles described in U.S. Pat. No. 5,545,507, specifically CN-1 to CN-13 therein, the hydrazine compounds described in U.S. Pat. No. 5,558,983, specifically CA-1 to CA-6 therein, the onium salts described in Japanese Patent Application No. 132836/1996, specifically A-1 to A-42, B-1 to B-27 and C-1 to C-14.

The synthesis methods, addition methods, and addition amounts of these ultrahigh contrast enhancers and ultrahigh contrast promoting agents are as described in the above-listed patents.

Sensitizing dye

A sensitizing dye may be used in the practice of the invention. There may be used any of the sensitizing dyes which can spectrally sensitize silver halide grains in a desired wavelength region when adsorbed to the silver halide grains The sensitizing dyes used herein include cyanine dyes, merocyanine dyes, complex cyanine dyes, complex merocyanine dyes, holopolar cyanine dyes, styryl dyes, hemicyanine dyes, oxonol dyes, and hemioxonol dyes. Useful sensitizing dyes which can be used herein are described in Research Disclosure, Item 17643 IV-A (December 1978, page 23), ibid., Item 1831 X (August 1979, page 437) and the references cited therein. It is advantageous to select a sensitizing dye having appropriate spectral sensitivity to the spectral properties of a particular light source of various laser imagers, scanners, image setters and process cameras.

Exemplary dyes for spectral sensitization to red light include compounds I-1 to I-38 described in JP-A 18726/1979, compounds I-1 to I-35 described in JP-A 75322/1994, and compounds I-1 to I-34 described in JP-A 287338/1995 for He—Ne laser light sources, dyes 1 to 20 described in JP-B 39818/1980, compounds I-1 to I-37 described in JP-A 284343/1987, and compounds I-1 to I-34 described in JP-A 287338/1995 for LED light sources.

It is also advantageous to spectrally sensitize silver halide grains in the wavelength range of 750 to 1,400 nm. Such spectral sensitization may be advantageously done with various known dyes including cyanine, merocyanine, styryl, hemicyanine, oxonol, hemioxonol, and xanthene dyes. Useful cyanine dyes are cyanine dyes having a basic nucleus such as a thiazoline, oxazoline, pyrroline, pyridine, oxazole, thiazole, selenazole or imidazole nucleus. Preferred examples of the useful merocyanine dye contain an acidic nucleus such as a thiohydantoin, rhodanine, oxazolidinedione, thiazolinedione, barbituric acid, thiazolinone, malononitrile or pyrazolone nucleus in addition to the above-mentioned basic nucleus. Among the above-mentioned cyanine and merocyanine dyes, those having an imino or carboxyl group are especially effective. A suitable choice may be made of well-known dyes as described, for example, in U.S. Pat. Nos. 3,761,279, 3,719,495, and 3,877,943, BP 1,466,201, 1,469,117, and 1,422,057, JP-B 10391/1991 and 52387/1994, JP-A 341432/1993, 194781/1994, and 301141/1994. Especially preferred dye structures are cyanine dyes having a thioether bond, examples of which are the cyanine dyes described in JP-A 58239/1987, 138638/1991, 138642/1991, 255840/1992, 72659/1993, 72661/1993, 222491/1994, 230506/1990, 258757/1994, 317868/1994, and 324425/1994, Publication of International Patent Application No. 500926/1995.

These sensitizing dyes may be used alone or in admixture with two or more. A combination of sensitizing dyes is often used for the purpose of supersensitization. In addition to the compound of formula (I), the emulsion may contain, along with the sensitizing dye, a dye which itself has no spectral sensitization function or a compound which does not substantially absorb visible light, but is capable of supersensitization. Useful sensitizing dyes, combinations of dyes showing supersensitization, and compounds showing supersensitization are described in Research Disclosure, Vol. 176, 17643 (December 1978), page 23, IV J and JP-B 35 25500/1974 and 4933/1968., JP-A 19032/1984 and 192242/1984.

Preferred, non-limiting examples of the sensitizing dyes which can be used herein are given below.

D-1
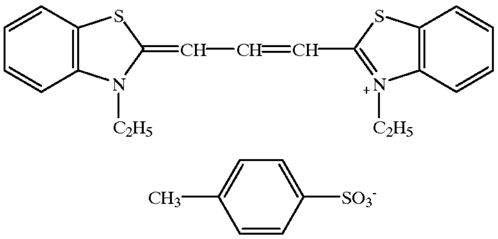
D-2
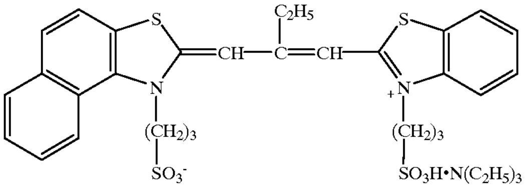
D-3
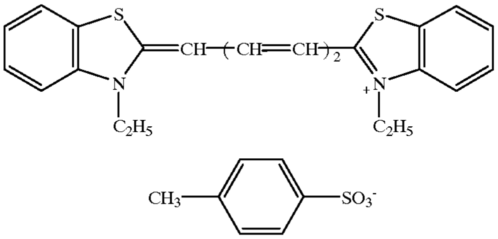
D-4
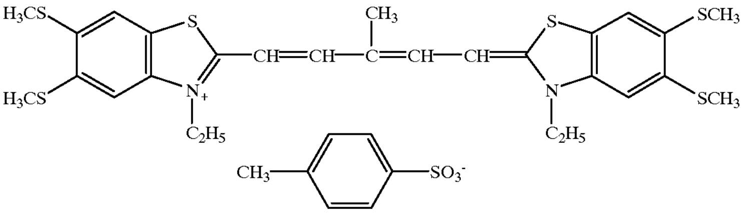
D-5
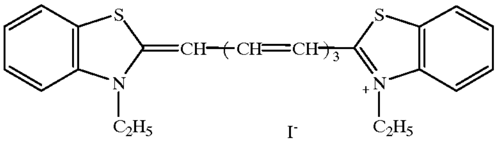
D-6
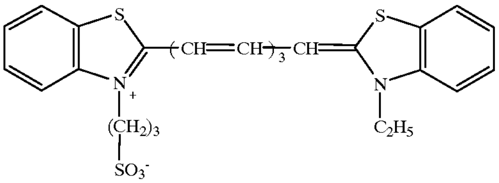
D-7
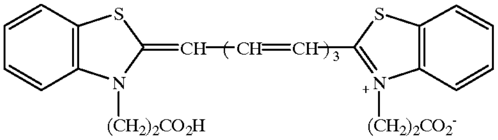
D-8
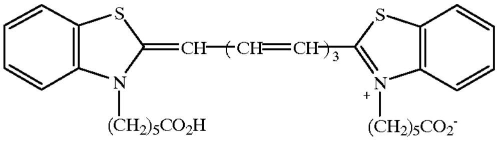
D-9
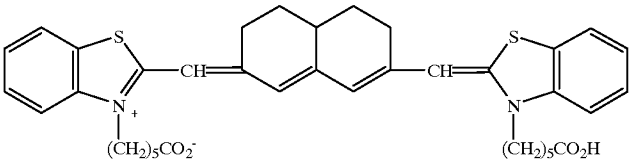
D-10
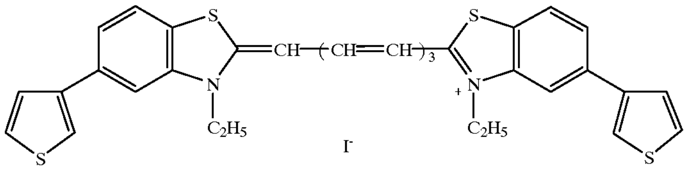

-continued
D-11
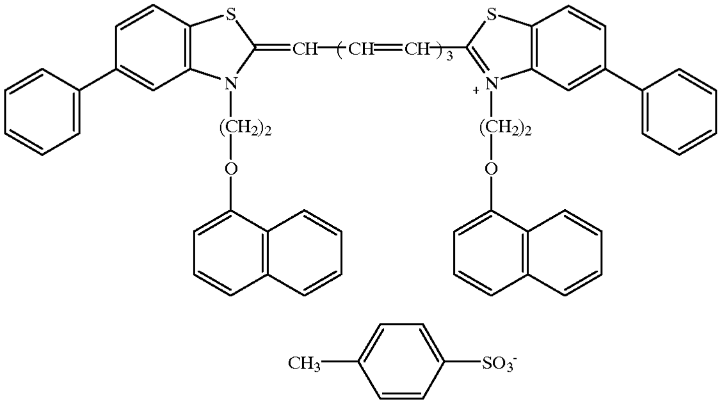
D-12
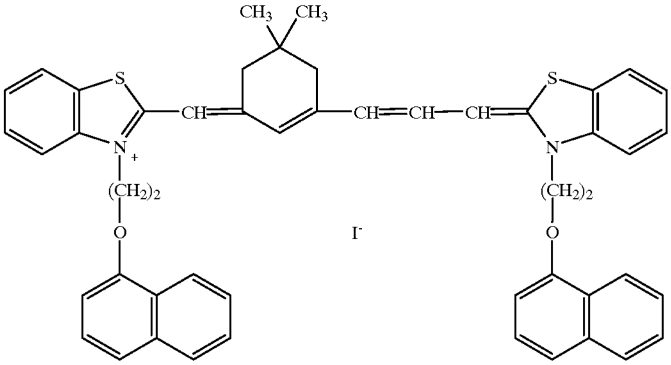
D-13
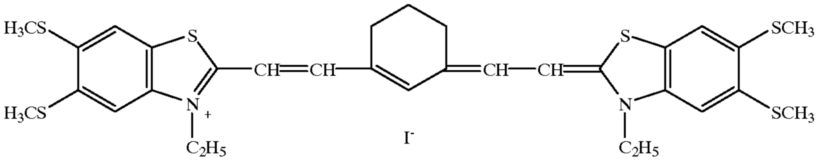
D-14
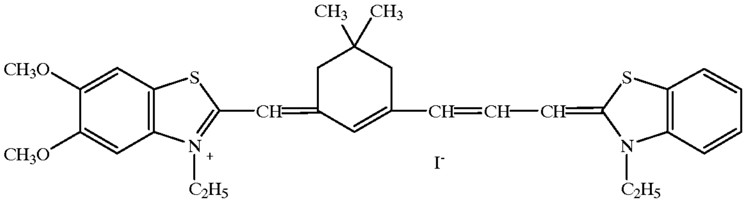
D-15
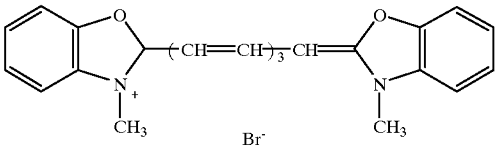
D-16
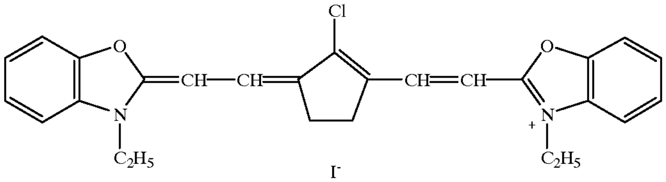

-continued
D-17
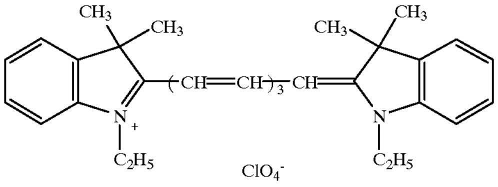
D-18
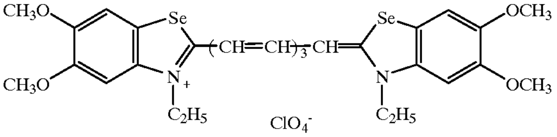
D-19
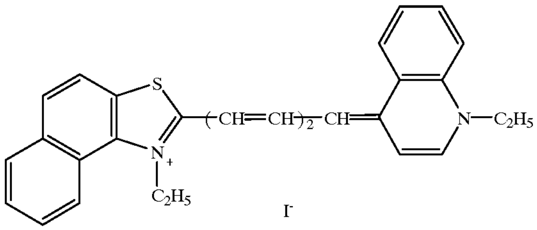
D-20
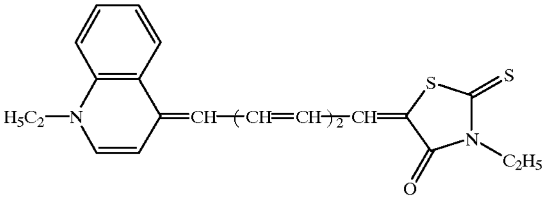
D-21
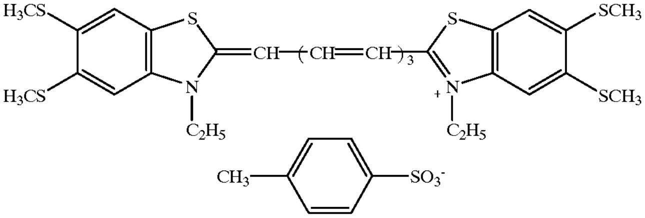
D-22
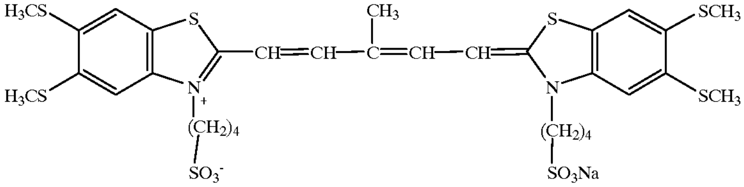
D-23
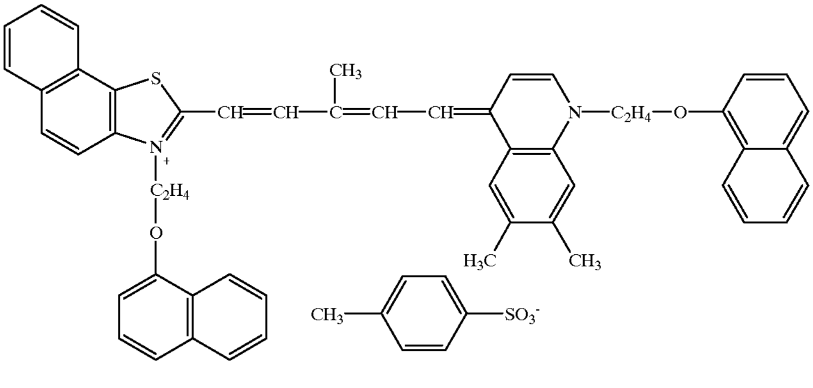
D-24
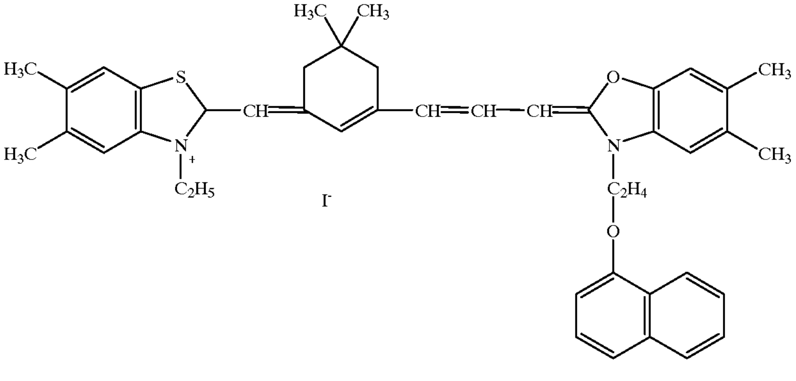

Preferred among the aforementioned sensitizing dyes are sensitizing dyes of the following formula (S).

(S)

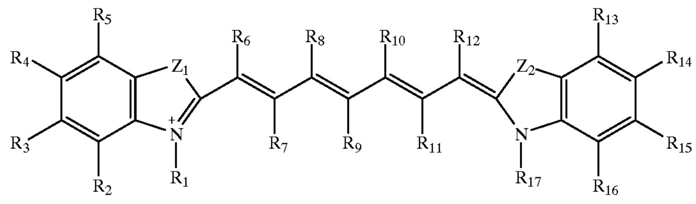

In formula (S), $Z_1$ and $Z_2$ each are a sulfur (S), oxygen (O) or selenium (Se) atom. $R_1$ and $R_{17}$ are independently alkyl r sulfoalkyl groups, at least one of which may have substituted thereon a fluoro, chloro, bromo, iodo, alkoxy, aryloxy or ester group. $R_2$ to $R_5$, $R_{13}$ to $R_{16}$ are independently hydrogen, chloro, bromo, fluoro, nitro, cyano, keto, sulfo, carboxy, ester, sulfonamide, amide, dialkylamino, alkyl, alkenyl, heterocyclic, aryl, alkoxy or aryloxy group which may be substituted or unsubstituted. Alternatively, $R_2$ and $R_3$, $R_3$ and $R_4$, $R_4$ and $R_5$, $R_{13}$ and $R_{14}$, $R_{14}$ and $R_{15}$ and $R_{15}$ and $R_{16}$, taken together, form a substituted or unsubstituted benzene ring. $R_6$ to $R_{12}$ are independently hydrogen, substituted or unsubstituted alkyl, chloro, fluoro, bromo, iodo, and unsubstituted amino, and when substituted, the substituent may form a 5- or 6-membered heterocyclic ring. Alternatively, $R_6$ and $R_8$, $R_8$ and $R_{10}$, $R_{10}$ and $R_{12}$ and $R_9$ and $R_{11}$, taken together, form a substituted or unsubstituted 5- or 6-membered carbocyclic or heterocyclic ring. Alternatively, $R_7$ and $R_9$, taken together, form a substituted or unsubstituted 5- or 6-membered heterocyclic ring or 5-membered carbocyclic ring. Alternatively, $R_1$ and $R_6$, and $R_{12}$ and $R_{17}$, taken together, may form a substituted or unsubstituted 5- or 6-membered heterocyclic ring. X is an ion for rendering the ionic charge of the dye neutral.

Typical examples of the sensitizing dye having formula (S) are given below although the sensitizing dye is not limited thereto.

S-1

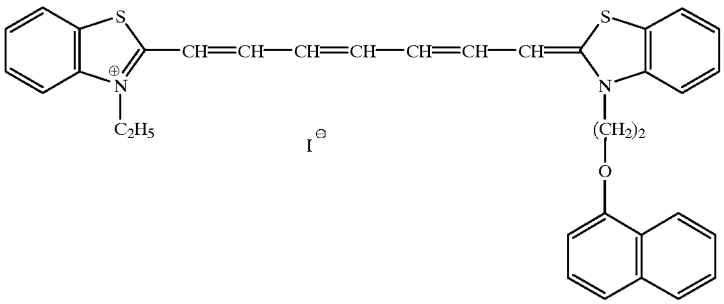

S-2

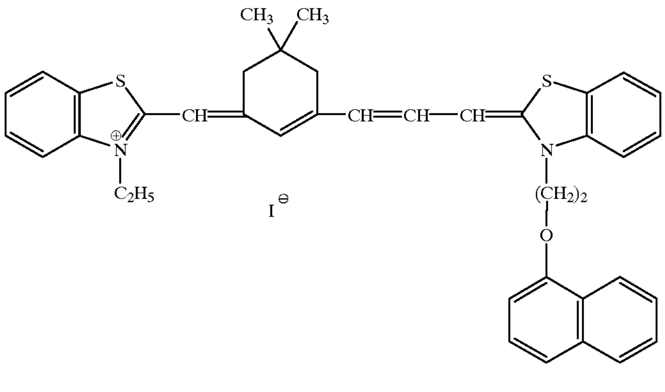

-continued
S-3
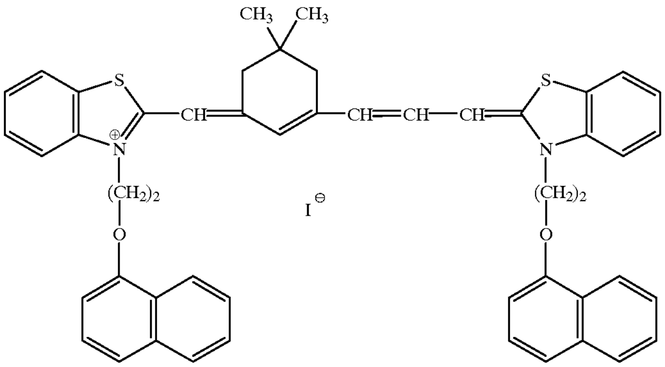
S-4
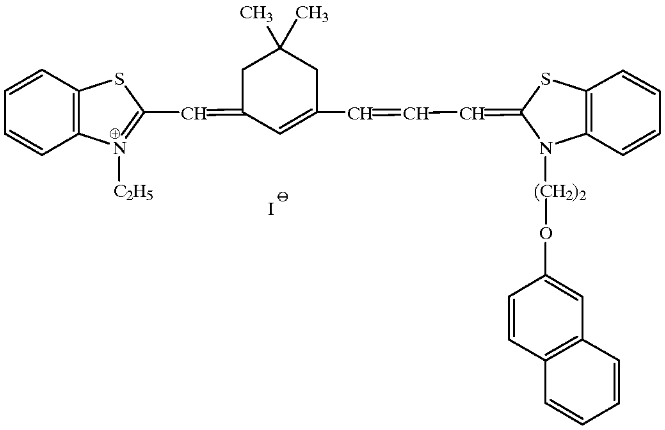
S-5
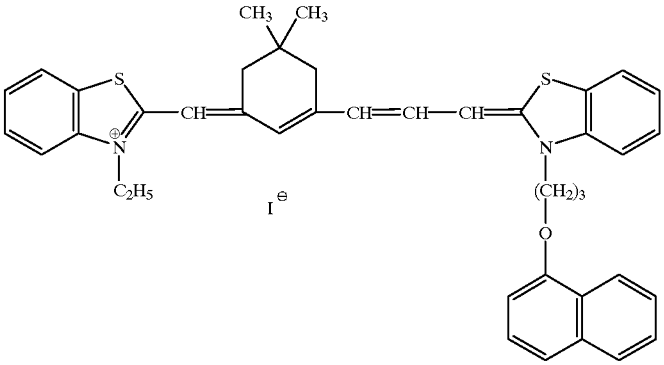
S-6
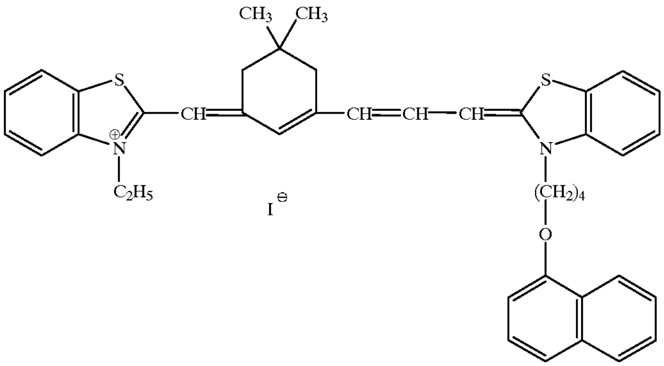

-continued
S-7
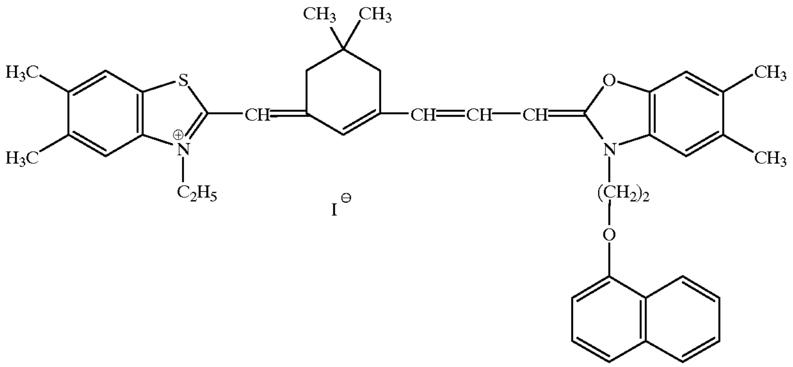
S-8
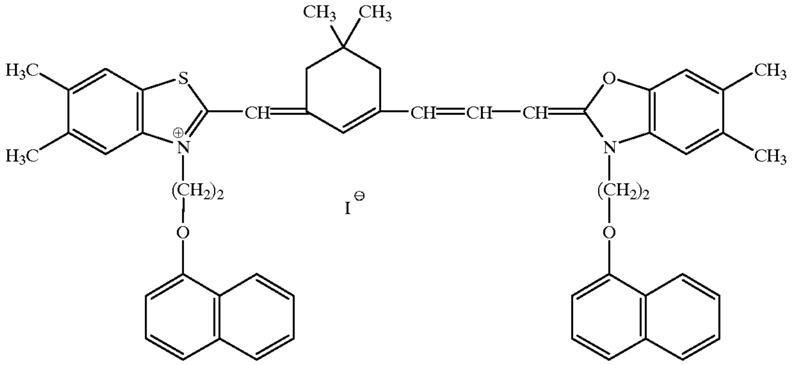
S-9
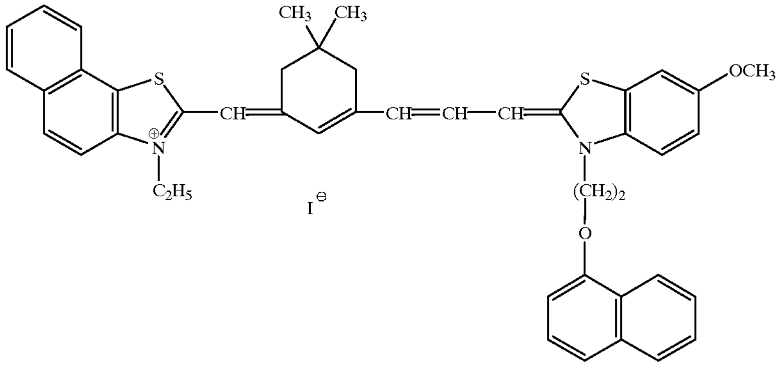
S-10
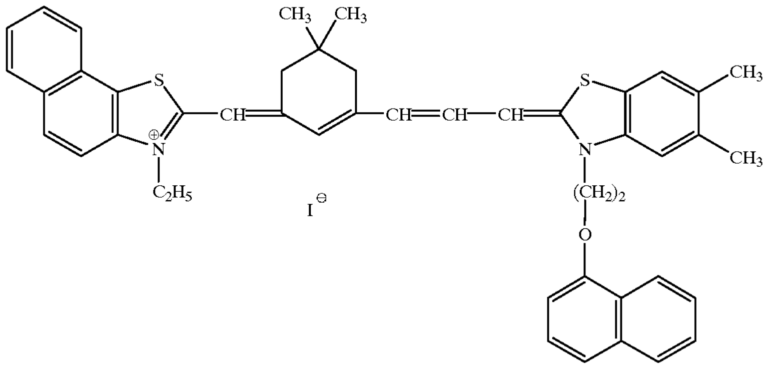

-continued
S-11
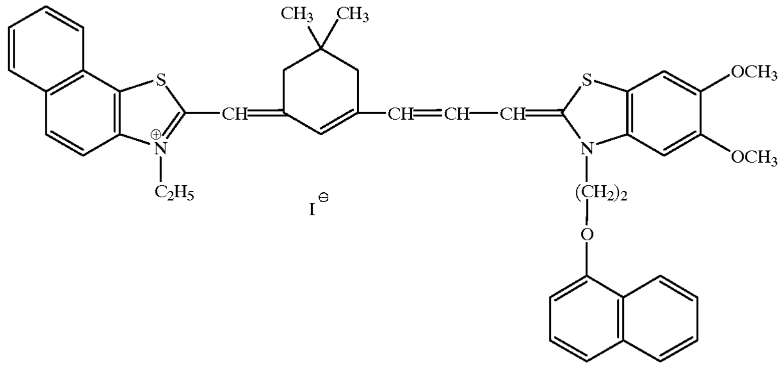
S-12
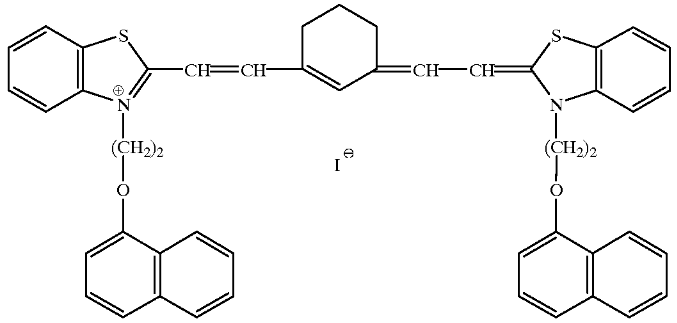
S-13
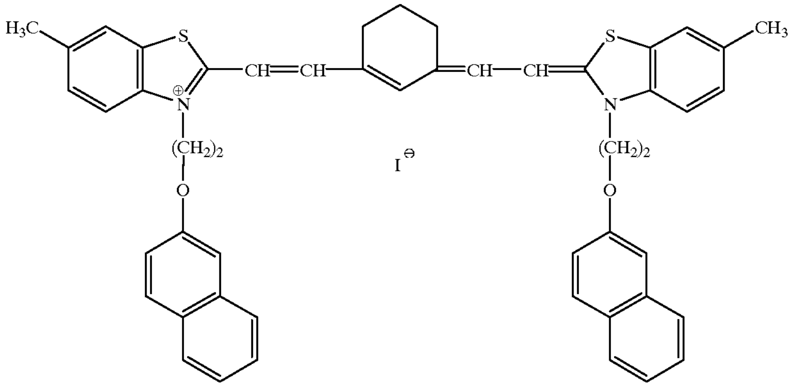
S-14
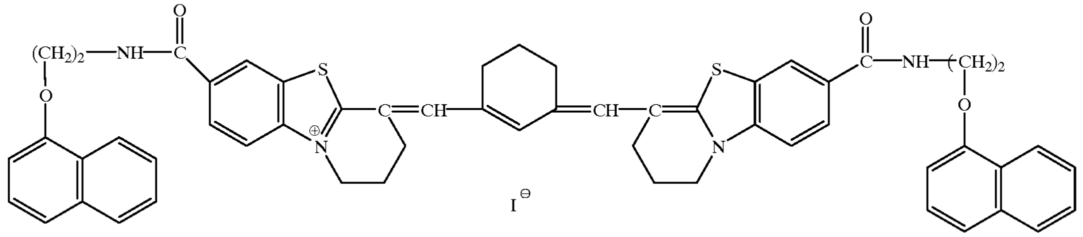
S-15
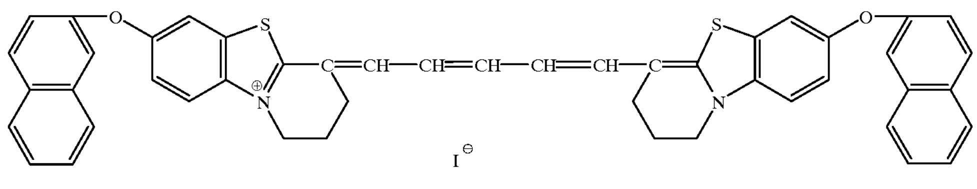

-continued
S-16
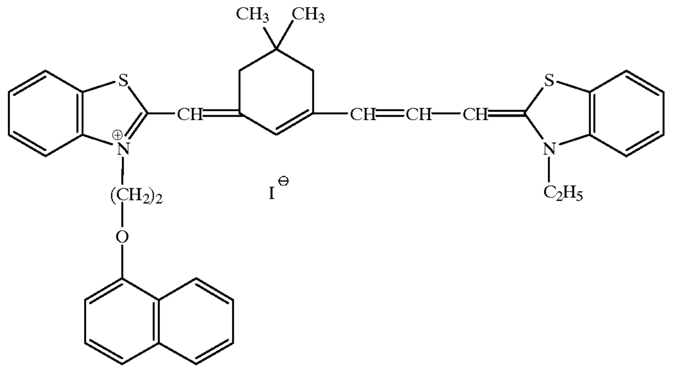
S-17
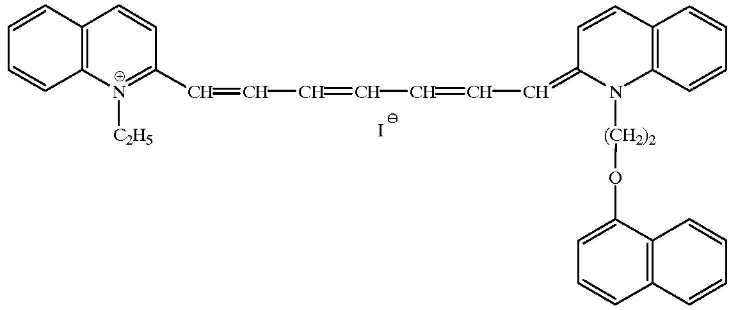
S-18
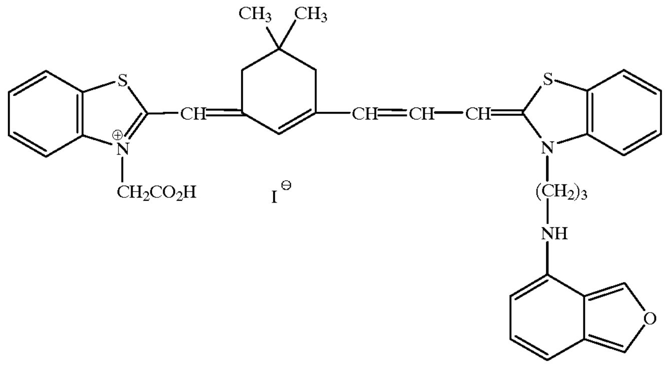
S-19
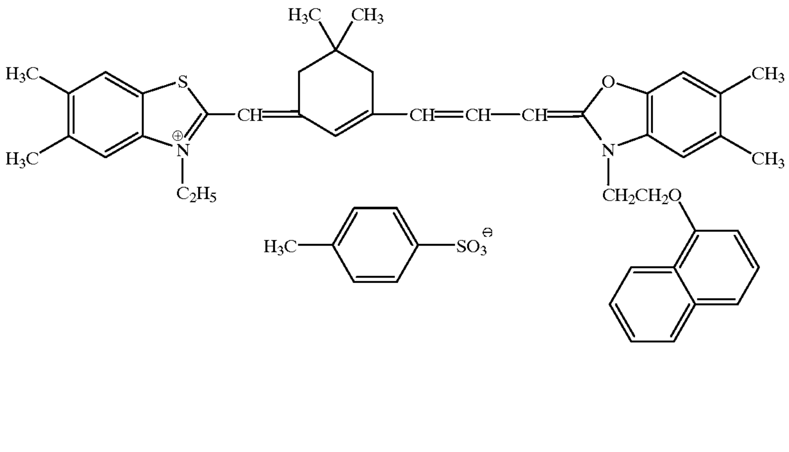

-continued

S-20

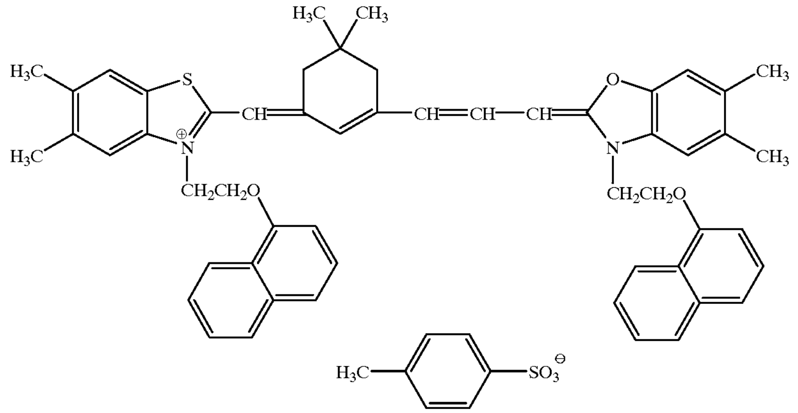

S-21

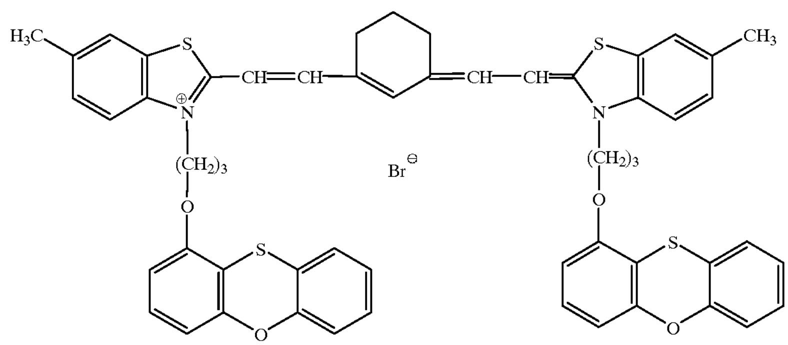

S-22

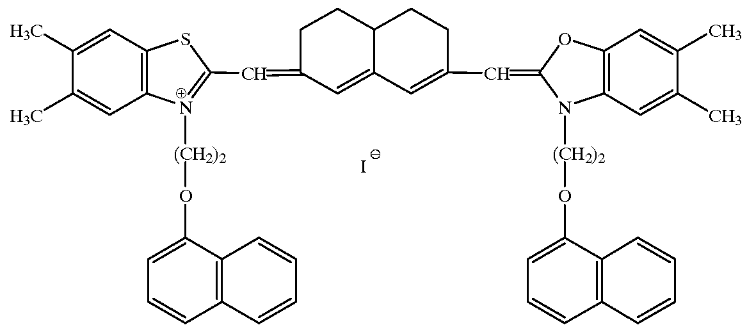

The sensitizing dyes of formula (S) which are used herein can be synthesized by the methods described in the following references.

a) F. M. Harmer, "Heterocyclic Compounds—Cyanine Dyes and Related Compounds," John Wiley & Sons, New York and London, 1964, b) D. M. Sturmer, "Heterocyclic Compounds—Special topics in heterocyclic chemistry," Chapter 18, §4, pp. 482–515, John Wiley & Sons, New York and London, 1977, c) Zh. Org. Khim., vol. 17, No. 1, pp. 167–169 (1981), vol. 15, No. 2, pp. 400–407 (1979), vol. 14, No. 10, pp. 2214–2221 (1978), vol. 13, No. 11, pp. 2440–2443 (1977), vol. 19, No. 10, pp. 2134–2142 (1982), Ukr. Khim. Zh., vol. 40, No. 6, pp. 625–629 (1974), Khim. Geterotsikl. Soedin., No. 2, pp. 175–178 (1976), Russian Patent Nos. 420,643 and 341,823, JP-A 217761/1984, U.S. Pat. Nos. 4,334,000, 3,671,648, 3,623,881, 3,573,921, EP 288261A1 and 102781A2, and JP-B 46930/1974.

The amount of the sensitizing dye may be properly determined in accordance with a desired sensitivity and fog although it is preferably about $10^{-6}$ to 1 mol, more preferably about $10^{-5}$ to $10^{-1}$ mol, further preferably about $10^{-4}$ to $10^{-1}$ mol per mol of the silver halide. In the case of the sensitizing dye of formula (S), the addition amount is usually about $1\times10^{-6}$ to $1\times10^{-1}$ mol, preferably $1\times10^{-6}$ to $10^{-3}$ mol, more preferably $10^{-5}$ to $10^{-1}$ mol, and especially $10^{-4}$ to $10^{-1}$ mol, per mol of the silver halide in the photographic emulsion.

The sensitizing dye may be added to a silver halide emulsion by directly dispersing the dye in the emulsion or by dissolving the dye in a solvent and adding the solution to the emulsion. The solvent used herein includes water, methanol, ethanol, propanol, acetone, methyl cellosolve, 2,2,3,3-tetrafluoropropanol, 2,2,2-trifluoroethanol, 3-methoxy-1-propanol, 3-methoxy-1-butanol, 1-methoxy-2-propanol, N,N-dimethylformamide and mixtures thereof.

Also useful are a method of dissolving a dye in a volatile organic solvent, dispersing the solution in water or hydrophilic colloid and adding the dispersion to an emulsion as disclosed in U.S. Pat. No. 3,469,987, a method of dissolving a dye in an acid and adding the solution to an emulsion or forming an aqueous solution of a dye with the aid of an acid or base and adding it to an emulsion as disclosed in JP-B 23389/1969, 27555/1969 and 22091/1982, a method of forming an aqueous solution or colloidal dispersion of a dye with the aid of a surfactant and adding it to an emulsion as disclosed in U.S. Pat. Nos. 3,822,135 and 4,006,025, a method of directly dispersing a dye in hydrophilic colloid and adding the dispersion to an emulsion as disclosed in JP-A 102733/1978 and 105141/1983, and a method of dissolving a dye using a compound capable of red shift and adding the solution to an emulsion as disclosed in JP-A 74624/1976. It is also acceptable to apply ultrasonic waves to form a solution.

The time when the sensitizing dye is added to the silver halide emulsion according to the invention is at any step of an emulsion preparing process which has been ascertained effective. The sensitizing dye may be added to the emulsion at any stage or step before the emulsion is coated, for example, at a stage prior to the silver halide grain forming step and/or desalting step, during the desalting step and/or a stage from desalting to the start of chemical ripening as disclosed in U.S. Pat. Nos. 2,735,766, 3,628,960, 4,183,756, and 4,225,666, JP-A 184142/1983 and 196749/1985, and a stage immediately before or during chemical ripening and a stage from chemical ripening to emulsion coating as disclosed in JP-A 113920/1983. Also as disclosed in U.S. Pat. No. 4,225,666 and JP-A 7629/1983, an identical compound may be added alone or in combination with a compound of different structure in divided portions, for example, in divided portions during a grain forming step and during a chemical ripening step or after the completion of chemical ripening, or before or during chemical ripening and after the completion thereof. The type of compound or the combination of compounds to be added in divided portions may be changed.

Silver halide

The photosensitive silver halides used herein include silver chloride, silver chlorobromide, silver iodochlorobromide, and silver bromide. Higher silver chloride contents are preferable because Dmin becomes lower.

It is described how to prepare silver chlorobromide.

Preferred silver chlorobromide grains are high silver chloride grains having a silver chloride content of at least 80 mol %, especially at least 85 mol %, which have been gold sensitized and/or have at the grain surface a localized phase with a higher silver bromide content than in the interior. Preferred examples of the localized structure include a thin shell structure and grains having localized phases at the edge and corner of a crystal surface or as projections on the crystal surface. The halogen composition in the localized phase should preferably have a silver bromide content of 10 to 95 mol %, more preferably 15 to 90 mol %, further preferably 20 to 60 mol %.

Preferably these localized phases account for 0.03 to 20 mol %, more preferably 0.1 to 15 mol % of the silver halide constituting the entire silver halide grains. The localized phases need not be composed of a single halogen composition, and there may be present two or more localized phases having definitely different silver bromide contents. In another example, silver halide grains are formed such that the interface between a localized phase and another phase may have a continuously varying halogen composition.

Such localized silver bromide phases can be formed by various methods, for example, a method of starting with an emulsion containing preformed silver chloride or high silver chloride grains, and mixing it with a water-soluble silver salt and a water-soluble halogen salt including a water-soluble bromide by the double jet technique for reaction, thereby causing precipitation; a method of converting part of preformed silver chloride or high silver chloride grains into silver bromide-rich phases by the so-called halogen conversion process; and a method of adding to preformed silver chloride or high silver chloride grains, microparticulate silver bromide or high silver bromide grains with a size equal to or smaller than the size of the silver chloride or high silver chloride grains, or other difficultly soluble silver salts, thereby causing silver bromide to recrystallize on the surface of the silver chloride or high silver chloride grains. These preparation methods are also described in EP 273430.

The silver bromide content of the localized phase may be analyzed by X-ray diffractometry as described in the Chemical Society of Japan, "New Experimental Chemistry Series No. 6, Structural Analysis", Maruzen, or x-ray photoelectron spectroscopy (XPS) as described in "Surface Analysis—Application of IMA, Auger Electron and Photoelectron Spectroscopy", Kodansha. The localized phase of silver bromide can be ascertained by means of an electron microscope or the method of the above-referred EP 273430.

Among these methods, the method of forming localized phases of silver bromide which is especially useful in the practice of the invention is by forming silver bromide on the surface of high silver chloride grains during chemical ripening. More particularly, a method of adding to high silver chloride grains, microparticulate silver bromide or silver chlorobromide having a higher solubility to thereby form localized phases of silver bromide or silver chlorobromide on the high silver chloride grains is favorable because of high sensitivity and low fog.

A method for forming the photosensitive silver halide is well known in the art. Any of the methods disclosed in Research Disclosure No. 17029 (June 1978) and U.S. Pat. No. 3,700,458, for example, may be used. Useful is a method of adding a silver-providing compound and a halogen-providing compound to a solution of gelatin or another polymer to form photosensitive silver halide grains and mixing the grains with an organic silver salt.

The photosensitive silver halide should preferably have a smaller mean grain size for the purpose of minimizing white turbidity after image formation. Specifically, the grain size is preferably up to 0.20 $\mu$m, more preferably 0.01 $\mu$m to 0.15 $\mu$m, most preferably 0.02 $\mu$m to 0.12 $\mu$m. The term grain size designates the length of an edge of a silver halide grain where silver halide grains are regular grains of cubic or octahedral shape. Where silver halide grains are tabular, the grain size is the diameter of an equivalent circle having the same area as the projected area of a major surface of a tabular grain. Where silver halide grains are not regular, for example, in the case of spherical or rod-shaped grains, the grain size is the diameter of an equivalent sphere having the same volume as a grain.

The shape of silver halide grains may be cubic, octahedral, tabular, spherical, rod-like and potato-like, with cubic and tabular grains being preferred in the practice of the invention. Where tabular silver halide grains are used, they should preferably have an average aspect ratio of from 100:1 to 2:1, more preferably from 50:1 to 3:1. Silver halide grains having rounded corners are also preferably used. No particular limit is imposed on the face indices (Miller indices) of an outer surface of photosensitive silver halide grains. Preferably silver halide grains have a high proportion of {100} face featuring high spectral sensitization efficiency upon adsorption of a spectral sensitizing dye. The proportion of {100} face is preferably at least 50%, more preferably at least 65%, most preferably at least 80%. Note that the proportion of Miller index {100} face can be determined by the method described in T. Tani, J. Imaging Sci., 29, 165 (1985), utilizing the adsorption dependency of {111} face and {100} face upon adsorption of a sensitizing dye.

The photosensitive silver halide grains used herein may contain any of metals or metal complexes belonging to Groups VII and VIII (or Groups 7 to 10) in the Periodic Table. Preferred metals or central metals of metal complexes belonging to Groups VII and VIII in the Periodic Table are rhodium, rhenium, ruthenium, osmium, and iridium. The metal complexes may be used alone or in admixture of complexes of a common metal or different metals. The content of metal or metal complex is preferably $1\times10^{-9}$ mol to $1\times10^{-2}$ mol, more preferably $1\times10^{-8}$ mol to $1\times10^{-4}$ mol, per mol of silver. Illustrative metal complexes are those of the structures described in JP-A 225449/1995.

The rhodium compounds which can be used herein are water-soluble rhodium compounds, for example, rhodium (III) halides and rhodium complex salts having halogen, amine or oxalato ligands, such as hexachlororhodium(III) complex salt, pentachloroaquorhodium(III) complex salt, tetrachlorodiaquorhodium(III) complex salt, hexabromorhodium(III) complex salt, hexamminerhodium (III) complex salt, and trioxalatorhodium(III) complex salt. On use, these rhodium compounds are dissolved in water or suitable solvents. They are preferably added by a method commonly employed for stabilizing a solution of a rhodium compound, that is, a method of adding an aqueous solution of a hydrogen halide (e.g., hydrochloric acid, hydrobromic acid or hydrofluoric acid) or an alkali halide (e.g., KCl, NaCl, KBr or NaBr). Instead of using the water-soluble rhodium, it is possible to add, during preparation of silver halide, separate silver halide grains previously doped with rhodium, thereby dissolving rhodium.

An appropriate amount of the rhodium compound added is $1\times10^{-8}$ to $5\times10^{-6}$ mol, especially $5\times10^{-8}$ to $1\times10^{-6}$ mol, per mol of silver halide.

The rhodium compounds may be added at an appropriate stage during preparation of silver halide emulsion grains or prior to the coating of the emulsion. Preferably, the rhodium compound is added during formation of the emulsion so that the compound is incorporated into silver halide grains.

In the practice of the invention, rhenium, ruthenium and osmium are added in the form of water-soluble complex salts as described in JP-A 2042/1988, 285941/1989, 20852/1990 and 20855/1990. Especially preferred are hexa-coordinate complexes representedby the formula:

$$[ML_6]^{n-}$$

wherein M is Ru, Re or Os, L is a ligand, and letter n is equal to 0, 1, 2, 3 or 4. The counter ion is not critical although it is usually an ammonium or alkali metal ion. Preferred ligands are halide ligands, cyanide ligands, cyanate ligands, nitrosil ligands, and thionitrosil ligands.

Illustrative, non-limiting, examples of the complex used herein are given below.

| | | |
|---|---|---|
| $[ReCl_6]^{3-}$ | $[ReBr_6]^{3-}$ | $[ReCl_5(NO)]^{2-}$ |
| $[Re(NS)Br_5]^{2-}$ | $[Re(NO)(CN)_5]^{2-}$ | $[Re(O)_2(CN)_4]^{3-}$ |
| $[RuCl_6]^{3-}$ | $[RuCl_4(H_2O)_2]^{-}$ | $[RuCl_5(H_2O)]^{2-}$ |
| $[RuCl_5(NO)]^{2-}$ | $[RuBr_5(NS)]^{2-}$ | |

-continued

| | | |
|---|---|---|
| $[Ru(CO)_3Cl_3]^{2-}$ | $[Ru(CO)Cl_5]^{2-}$ | $[Ru(CO)Br_5]^{2-}$ |
| $[OsCl_6]^{3-}$ | $[OsCl_5(NO)]^{2-}$ | $[Os(NO)(CN)_5]^{2-}$ |
| $[Os(NS)Br_5]^{2-}$ | $[Os(O)_2(CN)_4]^{4-}$ | |

An appropriate amount of these compounds added is $1\times10^{-9}$ to $1\times10^{-5}$ mol, especially $1\times10^{-8}$ to $1\times10^{-6}$ mol, per mol of silver halide.

These compounds may be added at an appropriate stage during preparation of silver halide emulsion grains or prior to the coating of the emulsion. Preferably, the compound is added during formation of the emulsion so that the compound is incorporated into silver halide grains.

In order that the compound be added during formation of silver halide grains so that the compound is incorporated into silver halide grains, there can be employed a method of adding a powder metal complex or an aqueous solution of a powder metal complex dissolved together with NaCl or KCl, to a water-soluble salt or water-soluble halide solution during formation of grains; a method of preparing silver halide grains by adding an aqueous solution of a metal complex as a third solution when silver salt and halide solutions are simultaneously mixed, thereby simultaneously mixing the three solutions; or a method of admitting a necessary amount of an aqueous solution of a metal complex into a reactor during formation of grains. Of these, the method of adding a powder metal complex or an aqueous solution of a powder metal complex dissolved together with NaCl or KCl to a water-soluble halide solution is especially preferred.

For addition to surfaces of grains, a necessary amount of an aqueous solution of a metal complex can be admitted into a reactor immediately after formation of grains, during or after physical ripening or during chemical ripening.

As the iridium compound, a variety of compounds may be used. Examples include hexachloroiridium, hexammineiridnium, trioxalatoiridium, hexacyanoiridium, and pentachloronitrosiliridium. These iridium compounds are used by dissolving in water or suitable solvents. They are preferably added by a method commonly employed for stabilizing a solution of an iridium compound, that is, a method of adding an aqueous solution of a hydrogen halide (e.g., hydrochloric acid, hydrobromic acid or hydrofluoric acid) or an alkali halide (e.g., KCl, NaCl, KBr or NaBr). Instead of using the water-soluble iridium, it is possible to add, during preparation of silver halide, separate silver halide grains previously doped with iridium, thereby dissolving iridium.

The silver halide grains used herein may contain metal atoms such as cobalt, iron, nickel, chromium, palladium, platinum, gold, thallium, copper, and lead. Preferred compounds of cobalt, iron, chromium and ruthenium are hexacyano metal complexes. Illustrative, non-limiting, examples include ferricyanate, ferrocyanate, hexacyanocobaltate, hexacyanochromate and hexacyanoruthenate ions. The distribution of the metal complex in silver halide grains is not critical. That is, the metal complex may be contained in silver halide grains uniformly or at a high concentration in either the core or the shell.

An appropriate amount of the metal added is $1\times10^{-9}$ to $1\times10^{-4}$ mol per mol of silver halide. The metal may be contained in silver halide grains by adding a metal salt in the form of a single salt, double salt or complex salt during preparation of grains.

Photosensitive silver halide grains may be desalted by any of well-known water washing methods such as noodle and flocculation methods although silver halide grains may be either desalted or not according to the invention.

When the silver halide emulsion according to the invention is subject to gold sensitization, there may be used any of gold sensitizers whose gold may have an oxidation number of +1 or +3. Conventional gold sensitizers are useful. Typical examples include chloroaurates such as potassium chloroaurate, auric trichloride, potassium auric thiocyanate, potassium iodoaurate, tetracyanoauric acid, ammonium aurothiocyanate, and pyridyl trichlorogold. The amount of the gold sensitizer added varies with various conditions although it is typically $1\times10^{-7}$ to $10^{-3}$ mol, preferably $10^{-6}$ to $5\times10^{-4}$ mol per mol of the silver halide.

The silver halide emulsion used herein should preferably be subject to gold sensitization and another chemical sensitization in combination. The chemical sensitization methods which can be used herein are sulfur, selenium, tellurium, and noble metal sensitization methods which are well known in the art. When they are used in combination with gold sensitization, preferred combinations are a combination of sulfur sensitization with gold sensitization, a combination of selenium sensitization with gold sensitization, a combination of sulfur sensitization and selenium sensitization with gold sensitization, a combination of sulfur sensitization and tellurium sensitization with gold sensitization, and a combination of sulfur sensitization, selenium sensitization, and tellurium sensitization with gold sensitization.

Sulfur sensitization is generally carried out by adding a sulfur sensitizer to an emulsion and agitating the emulsion at an elevated temperature above 40° C. for a certain time. The sulfur sensitizers used herein are well-known sulfur compounds, for example, sulfur compounds contained in gelatin as well as various sulfur compounds such as thiosulfates, thioureas, thiazoles, and rhodanines. Preferred sulfur compounds are thiosulfate salts and thiourea compounds. The amount of the sulfur sensitizer added varies with chemical ripening conditions including pH, temperature and silver halide grain size although it is preferably $10^{-7}$ to $10^{-2}$ mol, more preferably $10^{-5}$ to $10^{-3}$ mol per mol of silver halide.

It is also useful to use selenium sensitizers which include well-known selenium compounds. Specifically, selenium sensitization is generally carried out by adding an unstable selenium compound and/or non-unstable selenium compound to an emulsion and agitating the emulsion at elevated temperature above 40° C. for a certain time. Preferred examples of the unstable selenium compound include those described in JP-B 15748/1969, JP-B 13489/1968, JP-A 25832/1992, JP-A 109240/1992 and Japanese Patent Application No. 121798/1991. Especially preferred are the compounds represented by general formulae (VIII) and (IX) in Japanese Patent Application No. 121798/1991.

The tellurium sensitizers are compounds capable of forming silver telluride, which is presumed to become sensitization nuclei, at the surface or in the interior of silver halide grains. The production rate of silver telluride in a silver halide emulsion can be determined by the test method described in Japanese Patent Application No. 146739/1992. Exemplary tellurium sensitizers include diacyltellurides, bis(oxycarbonyl)tellurides, bis(carbamoyl)tellurides, bis(oxycarbonyl)ditellurides, bis(carbamoyl)ditellurides, compounds having a P=Te bond, tellurocarboxylic salts, Te-organyltellurocarboxylic esters, di(poly)tellurides, tellurides, telluroles, telluroacetals, tellurosulfonates, compounds having a P-Te bond, Te-containing heterocycles, tellurocarbonyl compounds, inorganic tellurium compounds, and colloidal tellurium.

Examples are described in U.S. Pat. Nos. 1,623,499, 3,320,069, 3,772,031, BP 235,211, 1,121,496, 1,295,462, 1,396,696, Canadian Patent No. 800,958, Japanese Patent Application Nos. 333819/1990, 53693/1991, 131598/1991, 129787/1992, J. Chem. Soc. Chem. Commun., 635 (1980), ibid., 1102 (1979), ibid., 645 (1979), J. Chem. Soc. Perkin. Trans., 1, 2191 (1980), S. Patai Ed., The Chemistry of Organic Selenium and Tellurium Compounds, Vol. 1 (1986), ibid., Vol. 2 (1987). Especially preferred are the compounds represented by general formulae (II), (III) and (IV) in Japanese Patent Application No. 146739/1992.

The amounts of the selenium and tellurium sensitizers used vary with the type of silver halide grains, chemical ripening conditions and other factors although they are preferably about $10^{-8}$ to $10^{-2}$ mol, more preferably about $10^{-7}$ to $10^{-3}$ mol per mol of silver halide. The chemical sensitizing conditions are not particularly limited although preferred conditions include a pH of 5 to 8, a pAg of 6 to 11, more preferably 7 to 10, and a temperature of 40 to 95° C., more preferably 45 to 85° C.

In the preparation of the silver halide emulsion used herein, any of cadmium salts, sulfite salts, lead salts, and thallium salts may be co-present in the silver halide grain forming step or physical ripening step.

Reduction sensitization may also be used in the practice of the invention. Illustrative examples of the compound used in the reduction sensitization method include ascorbic acid, thiourea dioxide, stannous chloride, aminoiminomethanesulfinic acid, hydrazine derivatives, borane compounds, silane compounds, and polyamine compounds. Reduction sensitization may also be accomplished by ripening the emulsion while maintaining it at pH 7 or higher or at pAg 8.3 or lower. Reduction sensitization may also be accomplished by introducing a single addition portion of silver ion during grain formation.

To the silver halide emulsion according to the invention, thiosulfonic acid compounds may be added by the method described in EP-A 293,917.

The silver halide emulsion in the photothermographic element according to the invention may be a single emulsion or a mixture of two or more emulsions which are different in mean grain size, halogen composition, crystal habit or chemical sensitizing conditions.

According to the invention, the photosensitive silver halide is preferably used in an amount of 0.01 to 0.5 mol, more preferably 0.02 to 0.3 mol, most preferably 0.03 to 0.25 mol per mol of the organic silver salt. With respect to a method and conditions of admixing the separately prepared photosensitive silver halide and organic silver salt, there may be used a method of admixing the separately prepared photosensitive silver halide and organic silver salt in a high speed agitator, ball mill, sand mill, colloidal mill, vibratory mill or homogenizer or a method of preparing an organic silver salt by adding the already prepared photosensitive silver halide at any timing during preparation of an organic silver salt. Any desired mixing method may be used insofar as the benefits of the invention are fully achievable.

Organic silver salt

The organic silver salt which can be used herein is relatively stable to light, but forms a silver image when heated at 80° C. or higher in the presence of an exposed photocatalyst (as typified by a latent image of photosensitive silver halide) and a reducing agent. The organic silver salt may be of any desired organic compound containing a source capable of reducing silver ion. Preferred are silver salts of organic acids, typically long chain aliphatic carboxylic acids having 10 to 30 carbon atoms, especially 15 to 28 carbon atoms. Also preferred are complexes of organic or inorganic silver salts with ligands having a stability constant in the range of 4.0 to 10.0. A silver-providing substance is preferably used in an amount of about 5 to 70% by weight of the image forming layer. Preferred organic silver salts include silver salts of organic compounds having a carboxyl group. Examples include silver salts of aliphatic carboxylic acids and silver salts of aromatic carboxylic acids though not limited thereto. Preferred examples of the silver salt of aliphatic carboxylic acid include silver behenate, silver arachidate, silver stearate, silver oleate, silver laurate, silver caproate, silver myristate, silver palmitate, silver maleate, silver fumarate, silver tartrate, silver linolate, silver butyrate, silver camphorate and mixtures thereof.

Silver salts of compounds having a mercapto or thion group and derivatives thereof are also useful. Preferred examples of these compounds include a silver salt of 3-mercapto-4-phenyl-1,2,4-triazole, a silver salt of 2-mercaptobenzimidazole, a silver salt of 2-mercapto-5-aminothiadiazole, a silver salt of 2-(ethylglycolamido)-benzothiazole, silver salts of thioglycolic acids such as silver salts of S-alkylthioglycolic acids wherein the alkyl group has 12 to 22 carbon atoms, silver salts of dithiocarboxylic acids such as a silver salt of dithioacetic acid, silver salts of thioamides, a silver salt of 5-carboxyl-1-methyl-2-phenyl-4-thiopyridine, silver salts of mercaptotriazines, a silver salt of 2-mercaptobenzoxazole as well as silver salts of 1,2,4-mercaptothiazole derivatives such as a silver salt of 3-amino-5-benzylthio-1,2,4-thiazole as described in U.S. Pat. No. 4,123,274 and silver salts of thion compounds such as a silver salt of 3-(3-carboxyethyl)-4-methyl-4-thiazoline-2-thione as described in U.S. Pat. No. 3,301,678. Compounds containing an imino group may also be used. Preferred examples of these compounds include silver salts of benzotriazole and derivatives thereof, for example, silver salts of benzotriazoles such as silver methylbenzotriazole, silver salts of halogenated benzotriazoles such as silver 5-chlorobenzotriazole as well as silver salts of 1,2,4-triazole and l-H-tetrazole and silver salts of imidazole and imidazole derivatives as described in U.S. Pat. No. 4,220,709. Also useful are various silver acetylide compounds as described, for example, in U.S. Pat. No. 4,761,361 and 4,775,613.

The organic silver salt which can be used herein may take any desired shape although needle crystals having a minor axis and a major axis are preferred. In the practice of the invention, grains should preferably have a minor axis of 0.01 μm to 0.20 μm and a major axis of 0.10 μm to 5.0 μm, more preferably a minor axis of 0.01 μm to 0.15 μm and a major axis of 0.10 μm to 4.0 μm. The grain size distribution is desirably monodisperse. The monodisperse distribution means that a standard deviation of the length of minor and major axes divided by the length, respectively, expressed in percent, is preferably up to 100%, more preferably up to 80%, most preferably up to 50%. It can be determined from the measurement of the shape of organic silver salt grains using an image obtained through a transmission electron microscope. Another method for determining a monodisperse distribution is to determine a standard deviation of a volume weighed mean diameter. The standard deviation divided by the volume weighed mean diameter, expressed in percent, which is a coefficient of variation, is preferably up to 100%, more preferably up to 80%, most preferably up to 50%. It may be determined by irradiating laser light, for example, to organic silver salt grains dispersed in liquid and determining the autocorrelation function of the fluctuation of scattering light relative to a time change, and obtaining the grain size (volume weighed mean diameter) therefrom.

The organic silver salt used herein is preferably desalted. The desalting method is not critical. Any well-known method may be used although well-known filtration methods such as centrifugation, suction filtration, ultrafiltration, and flocculation/water washing are preferred.

In the practice of the invention, the organic silver salt is prepared into a solid microparticulate dispersion using a dispersant, in order to provide fine particles of small size and free of flocculation. A solid micro-particulate dispersion of the organic silver salt may be prepared by mechanically dispersing the salt in the presence of dispersing aids by well-known comminuting means such as ball mills, vibrating ball mills, planetary ball mills, sand mills, colloidal mills, jet mills, roller mills, and high-pressure homogenizers.

The dispersant used in the preparation of a solid microparticulate dispersion of the organic silver salt may be selected from synthetic anionic polymers such as polyacrylic acid, copolymers of acrylic acid, copolymers of maleic acid, copolymers of maleic acid monoester, and copolymers of acryloylmethylpropanesulfonic acid; semi-synthetic anionic polymers such as carboxymethyl starch and carboxymethyl cellulose; anionic polymers such as alginic acid and pectic acid; anionic surfactants as described in JP-A 92716/1977 and WO 88/04794; the compounds described in Japanese Patent Application No. 350753/1995; well-known anionic, nonionic and cationic surfactants; and well-known polymers such as polyvinyl alcohol, polyvinyl pyrrolidone, carboxymethyl cellulose, hydroxypropyl cellulose, and hydroxypropyl methyl cellulose, as well as naturally occurring high molecular weight compounds such as gelatin.

In general, the dispersant is mixed with the organic silver salt in powder or wet cake form prior to dispersion. The resulting slurry is fed into a dispersing machine. Alternatively, a mixture of the dispersant with the organic silver salt is subject to heat treatment or solvent treatment to form a dispersant-bearing powder or wet cake of the organic silver salt. It is acceptable to effect pH control with a suitable pH adjusting agent before, during or after dispersion.

Rather than mechanical dispersion, fine particles can be formed by roughly dispersing the organic silver salt in a solvent through pH control and thereafter, changing the pH in the presence of dispersing aids. An organic solvent can be used as the solvent for rough dispersion although the organic solvent is usually removed at the end of formation of fine particles.

The thus prepared dispersion may be stored while continuously stirring for the purpose of preventing fine particles from settling during storage. Alternatively, the dispersion is stored after adding hydrophilic colloid to establish a highly viscous state (for example, in a jelly-like state using gelatin). An antiseptic agent may be added to the dispersion in order to prevent the growth of bacteria during storage.

The organic silver salt is used in any desired amount, preferably about 0.1 to 5 $g/m^2$, more preferably about 1 to 3 $g/m^2$, as expressed by a silver coverage per square meter of the photothermographic element.

Reducing agent

The photothermographic element of the invention preferably contains a reducing agent for the organic silver salt. The reducing agent for the organic silver salt may be any of substances, preferably organic substances, that reduce silver ion into metallic silver. Conventional photographic developing agents such as Phenidone®, hydroquinone and catechol are useful although hindered phenols are preferred reducing agents. The reducing agent should preferably be contained in an amount of 5 to 50 mol %, more preferably 10 to 40 mol % per mol of silver on the side bearing the image forming layer or photosensitive layer. The reducing agent may be added to any layer on the image forming layer-bearing side. Where the reducing agent is added to a layer other than the image forming layer, the reducing agent should preferably be contained in a slightly greater amount of about 10 to 50 mol % per mol of silver. The reducing agent may take the form of a precursor which is modified so as to exert its effective function only at the time of development.

For photothermographic elements using organic silver salts, a wide range of reducing agents are disclosed, for example, in JP-A 6074/1971, 1238/1972, 33621/1972, 46427/1974, 115540/1974, 14334/1975, 36110/1975, 147711/1975, 32632/1976, 1023721/1976, 32324/1976, 51933/1976, 84727/1977, 108654/1980, 146133/1981, 82828/1982, 82829/1982, 3793/1994, U.S. Pat. No. 3,667, 958, 3,679,426, 3,751,252, 3,751,255, 3,761,270, 3,782,949, 3,839,048, 3,928,686, 5,464,738, German Patent No. 2321328, and EP 692732. Exemplary reducing agents include amidoximes such as phenylamidoxime, 2-thienylamidoxime, and p-phenoxyphenylamidoxime; azines such as 4-hydroxy-3,5-dimethoxybenzaldehydeazine; combinations of aliphatic carboxylic acid arylhydrazides with ascorbic acid such as a combination of 2,2-bis(hydroxymethyl)propionyl-β-phenylhydrazine with ascorbic acid; combinations of polyhydroxybenzenes with hydroxylamine, reductone and/or hydrazine, such as combinations of hydroquinone with bis(ethoxyethyl)hydroxylamine, piperidinohexosereductone or formyl-4-methylphenylhydrazine; hydroxamic acids such as phenylhydroxamic acid, p-hydroxyphenylhydroxamic acid, and β-anilinehydroxamic acid; combinations of azines with sulfonamidophenols such as a combination of phenothiazine with 2,6-dichloro-4-benzenesulfonamidephenol; α-cyanophenyl acetic acid derivatives such as ethyl-α-cyano-2-methylphenyl acetate and ethyl-α-cyanophenyl acetate; bis-β-naphthols such as 2,2-dihydroxy-1,1-binaphthyl, 6,6'-dibromo-2,2'-dihydroxy-1,1'-binaphthyl, and bis(2-hydroxy-1-naphthyl)-methane; combinations of bis-β-naphthols with 1,3-dihydroxybenzene derivatives such as 2,4-dihydroxybenxophenone and 2,4-dihydroxyacetophenone; 5-pyrazolones such as 3-methyl-1-phenyl-5-pyrazolone; reductones such as dimethylaminohexosereductone, anhydrodihydroaminohexosereductone and anhydrodihydropiperidonehexosereductone; sulfonamidephenol reducing agents such as 2,6-dichloro-4-benzenesulfonamidephenol and p-benzenesulfonamidephenol; 2-phenylindane-1,3-dione, etc.; chromans such as 2,2-dimethyl-7-t-butyl-6-hydroxychroman; 1,4-dihydropyridines such as 2,6-dimethoxy-3,5-dicarboethoxy-1,4-dihydropyridine; bisphenols such as bis(2-hydroxy-3-t-butyl-5-methylphenyl)-methane, 2,2-bis(4-hydroxy-3-methylphenyl)propane, 4,4ethylidene-bis(2-t-butyl-6-methylphenol), 1,1-bis(2-hydroxy-3,5-dimethylphenyl)-3,5,5-trimethylhexane, and 2,2-bis(3,5-dimethyl-4-hydroxyphenyl)propane; ascorbic acid derivatives such as 1-ascorbyl palmitate and ascorbyl stearate; aldehydes and ketones such as benzil and diacetyl; 3-pyrazolidones and certain indane-1,3-diones; and chromanols (tocopherols). Preferred reducing agents are bisphenols and chromanols.

The reducing agent may be added in any desired form such as solution, powder or solid particle dispersion. The solid particle dispersion of the reducing agent may be prepared by well-known comminuting means such as ball mills, vibrating ball mills, sand mills, colloidal mills, jet mills, and roller mills. Dispersing aids may be used for facilitating dispersion.

Toner

A higher optical density is sometimes achieved when an additive known as a "toner" for improving images is contained. The toner is also sometimes advantageous in forming black silver images. The toner is preferably used in an amount of 0.1 to 50 mol %, especially 0.5 to 20 mol % per mol of silver on the image forming layer-bearing side. The toner may take the form of a precursor which is modified so as to exert its effective function only at the time of development.

For photothermographic elements using organic silver salts, a wide range of toners are disclosed, for example, in JP-A 6077/1971, 10282/1972, 5019/1974, 5020/1974, 91215/1974, 2524/1975, 32927/1975, 67132/1975, 67641/1975, 114217/1975, 3223/1976, 27923/1976, 14788/1977, 99813/1977, 1020/1978, 76020/1978, 156524/1979, 156525/1979, 183642/1986, and 56848/1992, JP-B 10727/1974 and 20333/1979, U.S. Pat. No. 3,080,254, 3,446,648, 3,782,941, 4,123,282, 4,510,236, BP 1,380,795, and Belgian Patent No. 841,910. Examples of the toner include phthalimide and N-hydroxyphthalimide; cyclic imides such as succinimide, pyrazolin-5-one, quinazolinone, 3-phenyl-2-pyrazolin-5-one, 1-phenylurazol, quinazoline and 2,4-thiazolidinedione; naphthalimides such as N-hydroxy-1,8-naphthalimide; cobalt complexes such as cobaltic hexammine trifluoroacetate; mercaptans as exemplified by 3-mercapto-1,2,4-triazole, 2,4-dimercaptopyrimidine, 3-mercapto-4,5-diphenyl-1,2,4-triazole, and 2,5-dimercapto-1,3,4-thiadiazole; N-(aminomethyl) aryldicarboxyimides such as (N,N-dimethylaminomethyl) phthalimide and N,N-(dimethylaminomethyl)-naphthalene-2,3-dicarboxyimide; blocked pyrazoles, isothiuronium derivatives and certain photo-bleach agents such as N,N'-hexamethylenebis(1-carbamoyl-3,5-dimethyl-pyrazole), 1,8-(3,6-diazaoctane)bis(isothiuroniumtrifluoroacetate) and 2-tribromomethylsulfonyl-benzothiazole; 3-ethyl-5-{(3-ethyl-2-benzothiazolinylidene)-1-methyl- -ethylidene}-2-thio-2,4-oxazolidinedione; phthalazinone, phthalazinone derivatives or metal salts, or derivatives such as 4-(1-naphthyl)phthalazinone, 6-chlorophthalazinone, 5,7-dimethoxyphthalazinone and 2,3-dihydro-1,4-phthalazinedione; combinations of phthalazinones with phthalic acidderivatives (e.g., phthalic acid, 4-methylphthalic acid, 4-nitrophthalic acid and tetrachlorophthalic anhydride); phthalazine, phthalazine derivatives or metal salts such as 4-(1-naphthyl)phthalazine, 6-chlorophthalazine, 5,7-dimethoxyphthalazine and 2,3-dihydrophthalazine; combinations of phthalazine with phthalic acid derivatives (e.g., phthalic acid, 4-methylphthalic acid, 4-nitrophthalic acid and tetrachlorophthalic anhydride); quinazolinedione, benzoxazine or naphthoxazine derivatives; rhodium complexes which function not only as a tone regulating agent, but also as a source of halide ion for generating silver halide in situ, for example, ammonium hexachlororhodinate (III), rhodium bromide, rhodium nitrate and potassium hexachlororhodinate (III); inorganic peroxides and persulfates such as ammonium peroxide disulfide and hydrogen peroxide; benzoxazine-2,4-diones such as 1,3-benzoxazine-2,4-dione, 8-methyl-1,3-benzoxazine-2,4-dione, and 6-nitro-1,3-benzoxazine-2,4-dione; pyrimidine and asym-triazines such as 2,4-dihydroxypyrimidine and 2-hydroxy-4-aminopyrimidine; azauracil and tetraazapentalene derivatives such as 3,6-dimercapto-1,4-diphenyl-1H,4H-2,3a,5,6a-tetraazapentalene, and 1,4-di(o-chlorophenyl)-3,6-dimercapto-1H,4H-2,3a,5,6a-tetraazapentalene.

The toner may be added in any desired form, for example, as a solution, powder and solid particle dispersion. The solid particle dispersion of the toner is prepared by well-known finely dividing means such as ball mills, vibrating ball mills, sand mills, colloid mills, jet mills, and roller mills. Dispersing aids may be used in preparing the solid particle dispersion.

Polymer latex

At least one layer of the image forming layers used herein is an image forming layer wherein a polymer latex constitutes at least 50% by weight of the entire binder. This image forming layer is sometimes referred to as "inventive image forming layer" and the polymer latex used as the main binder therefor is referred to as "inventive polymer latex," hereinafter. Beside the image forming layer, the polymer latex may also be used in a protective layer or back layer. Particularly when the photothermographic element of the invention is used in a printing application where dimensional changes are a problem, it is necessary to use the polymer latex in the protective layer and back layer too.

The "polymer latex" is a dispersion of a microparticulate water-insoluble hydrophobic polymer in a water-soluble dispersing medium. With respect to the dispersed state, a polymer emulsified in a dispersing medium, an emulsion polymerized polymer, a micelle dispersion, and a polymer having a hydrophilic structure in a part of its molecule so that the molecular chain itself is dispersed on a molecular basis are included. With respect to the polymer latex, reference is made to Okuda and Inagaki Ed., "Synthetic Resin Emulsion," Kobunshi Kankokai, 1978; Sugimura, Kataoka, Suzuki and Kasahara Ed., "Application of Synthetic Latex," Kobunshi Kankokai, 1993; and Muroi, "Chemistry of Synthetic Latex," Kobunshi Kankokai, 1970. Dispersed particles should preferably have a mean particle size of about 1 to 50,000 rm, more preferably about 5 to 1,000 nm. No particular limit is imposed on the particle size distribution of dispersed particles, and the dispersion may have either a wide particle size distribution or a monodisperse particle size distribution.

The polymer latex used herein may be either a latex of the conventional uniform structure or a latex of the so-called core/shell type. In the latter case, better results are sometimes obtained when the core and the shell have different glass transition temperatures.

Polymers of polymer latexes used as the binder according to the invention have glass transition temperatures (Tg) whose preferred range differs among the protective layer, the back layer and the image-forming layer. For the image forming layer, polymers having a Tg of −30° C. to 40° C., especially 0° C. to 40° C. are preferred in order to promote the diffusion of photographically effective addenda upon heat development. For the protective layer and the back layer which are to come in contact with various equipment, polymers having a Tg of 25° C. to 70° C. are especially preferred.

The polymer latex should preferably have a minimum film-forming temperature (MFT) of about −30° C. to 90° C., more preferably about 0° C. to 70° C. A film-forming aid may be added in order to control the minimum film-forming temperature. The film-forming aid is also referred to as a plasticizer and includes organic compounds (typically organic solvents) for lowering the minimum film-forming temperature of a polymer latex. It is described in Muroi, "Chemistry of Synthetic Latex," Kobunshi Kankokai, 1970.

Polymers used in the polymer latex according to the invention include acrylic resins, vinyl acetate resins, polyester resins, polyurethane resins, rubbery resins, vinyl chloride resins, vinylidene chloride resins, polyolefin resins, and copolymers thereof. The polymer may be linear, branched or crosslinked. The polymer may be either a homopolymer or a copolymer having two or more monomers polymerized together. The copolymer may be either a random copolymer or a block copolymer. The polymer preferably has a weight average molecule weight Mw of about 5,000 to about 1,000,000, more preferably about 10,000 to about 100,000. Polymers with a too lower molecular weight would generally provide a low mechanical strength as the binder whereas polymers with a too higher molecular weight are difficult to form films.

Illustrative examples of the polymer latex which can be used as the binder in the photothermographic element of the invention include latexes of methyl methacrylate/ethyl methacrylate/methacrylic acid copolymers, latexes of methyl methacrylate/2-ethylhexyl acrylate/hydroxyethyl methacrylate/styrene/acrylic acid copolymers, latexes of styrene/butadiene/acrylic acid copolymers, latexes of styrene/butadiene/divinyl benzene/methacrylic acid copolymers, latexes of methyl methacrylate/vinyl chloride/acrylic acid copolymers, and latexes of vinylidene chloride/ethyl acrylate/acrylonitrile/methacrylic acid copolymers. These polymers or polymer latexes are commercially available. Exemplary acrylic resins are Sebian A-4635, 46583 and 4601 (Daicell Chemical Industry K. K.), Nipol LX811, 814, 820, 821, 857 and 857×2 (Nippon Zeon K. K.), VONCORT R3340, R3360, R3370, 4280, 2830 and 2210 (Dai-Nippon Ink & Chemicals K. K.), Jurimer ET-410, 530, SEK101-SEK301, FC30 and FC35 (Nippon Junyaku K. K.), and Polyzol F410, AM200 and AP50 (Showa Kobunshi K. K.). Exemplary polyester resins are FINETEX ES650, 611, 675, and 850 (Dai-Nippon Ink & Chemicals K. K.) and WD-size and WMS (Eastman Chemical Products, Inc.). Exemplary polyurethane resins are HYDRAN AP10, 20, 30 and 40 and VONDIC 1320NS (Dai-Nippon Ink & Chemicals K. K.). Exemplary rubbery resins are LACSTAR 7310K, 3307B, 4700H, 7132C and LQ-618-1 (Dai-Nippon Ink & Chemicals K. K.) and Nipol Lx416, 410, 430, 435 and 2507 (Nippon Zeon K. K.). Exemplary vinyl chloride resins are Nipol G351 and G576 (Nippon Zeon K. K.). Exemplary vinylidene chloride resins are L502 and L513 (Asahi Chemicals K. K.) and Aron D7020, D5040 and D5071 (Toa Synthesis K. K.). Exemplary olefin resins are Chemipearl S120 and SA100 (Mitsui Petro-Chemical K. K.). These polymers may be used alone or in admixture of two or more.

Of these polymer latexes, latexes of styrene-butadiene copolymers are preferable as the binder in the image forming layer. Illustrative preferred examples are LACSTAR 3307B and Nipol Lx430 and 435 rubbery resins.

As the binder in the protective layer, acrylic, styrene, acrylic/styrene, vinyl chloride, and vinylidene chloride polymer latexes are preferable. Illustrative preferred examples are VONCORT R3370, 4280, and Nipol Lx857 acrylic resins, methyl methacrylate/2-ethylhexyl acrylate/hydroxyethyl methacrylate/styrene/acrylic acid copolymers, Nipol G576 vinyl chloride resin, and Aron D5071 vinylidene chloride resin.

As the binder in the back layer, latexes of acrylic, olefinic and vinylidene chloride polymers are preferable.

Illustrative preferred examples are Jurimer ET-410, Sebian A-4635 and Polyzol F410 acrylic resins, Chemipearl S120 olefin resin, L502 and Aron D7020 vinylidene chloride resins.

A hydrophilic polymer may be added to the binder in an amount of up to 20% by weight of the entire binder. Such hydrophilic polymers are polyvinyl alcohol, methyl cellulose, hydroxypropyl cellulose, carboxymethyl cellulose, and hydroxypropyl methyl cellulose. The amount of the hydrophilic polymer added is preferably less than 10% by weight of the entire binder in each of the protective layer and the image-forming layer.

In the practice of the invention, the photographic component layers, especially image forming layers are preferably formed by applying aqueous coating solutions followed by drying. By the term "aqueous", it is meant that water accounts for at least 60% by weight of the solvent or dispersing medium of the coating solution. The component other than water of the coating solution may be a water-miscible organic solvent such as methyl alcohol, ethyl alcohol, isopropyl alcohol, methyl cellosolve, ethyl cellosolve, dimethylformamide, ethyl acetate, diacetone alcohol, furfuryl alcohol, benzyl alcohol, diethylene glycol monoethyl ether, and oxyethyl phenyl ether.

In the image forming layer according to the invention, the total amount of binder is preferably 0.2 to 30 $g/m^2$, more preferably 1.0 to 15 $g/m^2$.

In the protective layer according to the invention, the total amount of binder is preferably 0.2 to 5.0 $g/m^2$, more preferably 0.5 to 3.0 $g/m^2$.

In the back layer according to the invention, the total amount of binder is preferably 0.01 to 3 $g/m^2$, more preferably 0.05 to 1.5 $g/m^2$.

To the respective layers, crosslinking agents for crosslinking, surfactants for ease of application, and other addenda may be added.

Sometimes each of these layers consists of two or more sub-layers. Where two or more image forming layers are included, it is preferred to use a polymer latex as the binder in all the image forming layers. The protective layer is a layer on the image forming layer, and two or more protective layers are sometimes included. In this case, a polymer latex is preferably used in at least one protective layer, especially in the outermost protective layer. The back layer is a layer on a subbing layer on the back surface of the support, and two or more back layers are sometimes included. In this case, a polymer latex is preferably used in at least one back layer, especially in the outermost back layer.

As the binders in the protective layer and back layer, there may be used hydrophilic binders commonly used in conventional photographic photosensitive materials, for example, gelatin. These binders will be described later in detail.

Antifoggant

With antifoggants, stabilizers and stabilizer precursors, the silver halide emulsion and/or organic silver salt according to the invention can be further protected against formation of additional fog and stabilized against lowering of sensitivity during shelf storage. Suitable antifoggants, stabilizers and stabilizer precursors which can be used alone or in combination include thiazonium salts as described in U.S. Pat. Nos. 2,131,038 and 2,694,716, azaindenes as described in U.S. Pat. Nos. 2,886,437 and 2,444,605, mercury salts as described in U.S. Pat. No. 2,728,663, urazoles as described in U.S. Pat. No. 3,287,135, sulfocatechols as described in U.S. Pat. No. 3,235,652, oximes, nitrons and nitroindazoles as described in BP 623,448, polyvalent metal salts as described in U.S. Pat. No. 2,839,405, thiuronium salts as described in U.S. Pat. No. 3,220,839, palladium, platinum and gold salts as described in U.S. Pat. Nos. 2,566,263 and 2,597,915, halogen-substituted organic compounds as described in U.S. Pat. Nos. 4,108,665 and 4,442,202, triazines as described in U.S. Pat. Nos. 4,128,557, 4,137,079, 4,138,365 and 4,459,350, and phosphorus compounds as described in U.S. Pat. No. 4,411,985.

Preferred antifoggants are organic halides, for example, the compounds described in JP-A 119624/1975, 120328/1975, 121332/1976, 58022/1979, 70543/1981, 99335/1981, 5 90842/1984, 129642/1986, 129845/1987, 208191/1994, 5621/1995, 2781/1995, 15809/1996, U.S. Pat. Nos. 5,340,712, 5,369,000, and 5,464,737.

The antifoggant may be added in any desired form such as solution, powder or solid particle dispersion. The solid particle dispersion of the antifoggant may be prepared by well-known comminuting means such as ball mills, vibrating ball mills, sand mills, colloidal mills, jet mills, and roller mills. Dispersing aids may be used for facilitating dispersion.

It is sometimes advantageous to add a mercury (II) salt to an emulsion layer as an antifoggant though not necessary in the practice of the invention. Mercury (II) salts preferred to this end are mercury acetate and mercury bromide. The mercury (II) salt is preferably added in an amount of 1 nmol to 1 mmol, more preferably 10 nmol to 100 $\mu$mol per mol of silver coated.

Still further, the photothermographic element of the invention may contain a benzoic acid type compound for the purposes of increasing sensitivity and restraining fog. Any of benzoic acid type compounds may be used although examples of the preferred structure are described in U.S. Pat. Nos. 4,784,939 and 4,152,160, Japanese Patent Application Nos. 98051/1996, 151241/1996, and 151242/1996. The benzoic acid type compound may be added to any site in the photosensitive element, preferably to a layer on the same side as the photosensitive layer serving as the image forming layer, and more preferably an organic silver salt-containing layer. The benzoic acid type compound may be added at any step in the preparation of a coating solution. Where it is contained in an organic silver salt-containing layer, it may be added at any step from the preparation of the organic silver salt to the preparation of a coating solution, preferably after the preparation of the organic silver salt and immediately before coating. The benzoic acid type compound may be added in any desired form including powder, solution and fine particle dispersion. Alternatively, it may be added in a solution form after mixing it with other additives such as a sensitizing dye, reducing agent and toner. The benzoic acid type compound may be added in any desired amount, preferably 1 $\mu$mol to 2 mol, more preferably 1 mmol to 0.5 mol per mol of silver.

In the image forming layer, typically photosensitive layer, polyhydric alcohols (e.g., glycerin and diols as described in U.S. Pat. No. 2,960,404), fatty acids and esters thereof as described in U.S. Pat. Nos. 2,588,765 and 3,121,060, and silicone resins as described in BP 955,061 may be added as a plasticizer and lubricant.

Protective layer

A surface protective layer may be provided in the photothermographic element of the present invention for the purpose of preventing sticking of the image forming layer.

The surface protective layer is based on a binder which may be any desired polymer, although the layer preferably contains 100 $mg/m^2$ to 5 $g/m^2$ of a polymer having a carboxylic acid residue. The polymers having carboxylic acid residues include natural polymers (e.g., gelatin and alginic acid), modified natural polymers (e.g., carboxymethyl cellulose and phthalated gelatin), and synthetic polymers (e.g., polymethacrylate, polyacrylate, polyalkyl methacrylate/acrylate copolymers, and polystyrene/polymethacrylate copolymers). The content of the carboxylic acid residue is preferably 10 mmol to 1.4 mol per 100 g of the polymer. The carboxylic acid residue may form a salt with an alkali metal ion, alkaline earth metal ion or organic cation.

In the surface protective layer, any desired anti-sticking material may be used. Examples of the anti-sticking material include wax, silica particles, styrene-containing elastomeric block copolymers (eg., styrene-butadiene-styrene and styrene-isoprene-styrene), cellulose acetate, cellulose acetate butyrate, cellulose propionate and mixtures thereof. Crosslinking agents for crosslinking, surfactants for ease of application, and other addenda are optionally added to the surface protective layer.

In the image forming layer or a protective layer therefor according to the invention, there may be used light absorbing substances and filter dyes as described in U.S. Pat. Nos. 3,253,921, 2,274,782, 2,527,583, and 2,956,879. The dyes may be mordanted as described in U.S. Pat. Nos. 3,282,699. The filer dyes are used in such amounts that the layer may have an absorbance of 0.1 to 3, especially 0.2 to 1.5 at the exposure wavelength.

In the photosensitive layer serving as the image forming layer, a variety of dyes and pigments may be used from the standpoints of improving tone and preventing irradiation. Any desired dyes and pigments may be used in the image recording layer according to the invention. Useful pigments and dyes include those described in Colour Index and both organic and inorganic, for example, pyrazoloazole dyes, anthraquinone dyes, azo dyes, azomethine dyes, oxonol dyes, carbocyanine dyes, styryl dyes, triphenylmethane dyes, indoaniline dyes, indophenol dyes, and phthalocyanine dyes. The preferred dyes used herein include anthraquinone dyes (e.g., Compounds 1 to 9 described in JP-A 341441/1993 and Compounds 3–6 to 3–18 and 3–23 to 3–38 described in JP-A 165147/1993), azomethine dyes (e.g., Compounds 17 to 47 described in JP-A 341441/1993), indoaniline dyes (e.g., Compounds 11 to 19 described in JP-A 289227/1993, Compound 47 described in JP-A 341441/1993 and Compounds 2–10 to 2–11 described in JP-A 165147/1993), and azo dyes (e.g., Compounds 10 to 16 described in JP-A 341441/1993). The dyes and pigments may be added in any desired form such as solution, emulsion or solid particle dispersion or in a form mordanted with polymeric mordants. The amounts of these compounds used are determined in accordance with the desired absorption although the compounds are generally used in amounts of 1 $\mu$g to 1 g per square meter of the recording element.

In one preferred embodiment, the photothermographic element of the invention is a one-side photosensitive element having at least one photosensitive layer containing a silver halide emulsion and serving as the image forming layer on one side and a back layer on the other side of the support.

The back layer preferably exhibits a maximum absorbance of about 0.3 to 2 in the desired wavelength range. When the desired wavelength range is from 750 to 1,400 rim, the back layer is preferably an antihalation layer having an optical density of 0.001 to less than 0.5, especially 0.001 to less than 0.3, in the wavelength range of 750 to 360 nm. When the desired wavelength range is up to 750 nm, the back layer is preferably an antihalation layer having a maximum absorbance of 0.3 to 2.0 at the desired range before image formation and an optical density of 0.005. to less than 0.3 at 360 to 750 nm after image formation. The method of reducing the optical density after image formation to the above-defined range is not critical. For example, the density given by a dye can be reduced by thermal decolorization as described in Belgian Patent No. 733706, or the density is reduced through decolorization by light irradiation as described in JP-A 17833/1979.

Where an antihalation dye is used in the invention, it may be selected from various compounds insofar as it has the desired absorption in the wavelength range, is sufficiently low absorptive in the visible region after processing, and provides the antihalation layer with the preferred absorbance profile. Exemplary antihalation dyes are given below though the dyes are not limited thereto. Useful dyes which are used alone are described in JP-A 56458/1984, 216140/1990, 13295/1995, 11432/1995, U.S. Pat. No. 5,380,635, JP-A 68539/1990, page 13, lower-left column, line 1 to page 14, lower-left column, line 9, and JP-A 24539/1991, page 14, lower-left column to page 16, lower-right column. Useful dyes which will decolorize during processing are disclosed in JP-A 139136/1977, 132334/1978, 501480/1981, 16060/1982, 68831/1982, 101835/1982, 182436/1984, 36145/1995, 199409/1995, JP-B 33692/1973, 16648/1975, 41734/1990, U.S. Pat. No. 4,088,497, 4,283,487, 4,548,896, and 5,187,049.

In the practice of the invention, the binder used in the back layer is preferably transparent or translucent and generally colorless. Exemplary binders are naturally occurring polymers, synthetic resins, polymers and copolymers, and other film-forming media, for example, gelatin, gum arabic, poly(vinyl alcohol), hydroxyethyl cellulose, cellulose acetate, cellulose acetate butyrate, poly(vinyl pyrrolidone), casein, starch, poly(acrylic acid), poly(methyl methacrylate), polyvinyl chloride, poly(methacrylic acid), copoly(styrene-maleic anhydride), copoly(styrene-acrylonitrile), copoly(styrene-butadiene), polyvinyl acetals (e.g., polyvinyl formal and polyvinyl butyral), polyesters, polyurethanes, phenoxy resins, poly(vinylidene chloride), polyepoxides, polycarbonates, poly(vinyl acetate), cellulose esters, and polyamides. The binder may be dispersed in water, organic solvent or emulsion to form a dispersion which is coated to form a layer.

In the practice of the invention, a matte agent may be added to the element for improving transportation The matte agents used herein are generally microparticulate water-insoluble organic or inorganic compounds. There may be used any desired one of matte agents, for example, well-known matte agents including organic matte agents as described in U.S. Pat. Nos. 1,939,213, 2,701,245, 2,322,037, 3,262,782, 3,539,344, and 3,767,448 and inorganic matte agents as described in U.S. Pat. Nos. 1,260,772, 2,192,241, 3,257,206, 3,370,951, 3,523,022, and 3,769,020. Illustrative examples of the organic compound which can be used as the matte agent are given below; exemplary water-dispersible vinyl polymers include polymethyl acrylate, polymethyl methacrylate, polyacrylonitrile, acrylonitrile-α-methylstyrene copolymers, polystyrene, styrene-divinylbenzene copolymers, polyvinyl acetate, polyethylene carbonate, and polytetrafluoroethylene; exemplary cellulose derivatives include methyl cellulose, cellulose acetate, and cellulose acetate propionate; exemplary starch derivatives include carboxystarch, carboxynitrophenyl starch, urea-formaldehydestarch reaction products, gelatin hardened with well-known curing agents, and hardened gelatin which has been coaceruvation hardened into microcapsulated hollow particles. Preferred examples of the inorganic compound which can be used as the matte agent include silicon dioxide, titanium dioxide, magnesium dioxide, aluminum oxide, barium sulfate, calcium carbonate, silver chloride and silver bromide desensitized by a well-known method, glass, and diatomaceous earth. The aforementioned matte agents may be used as a mixture of substances of different types if necessary. The size and shape of the matte agent are not critical. The matte agent of any particle size may be used although matte agents having a particle size of 0.1 $\mu$m to 30 $\mu$m are preferably used in the practice of the invention. The particle size distribution of the matte agent may be either narrow or wide. Nevertheless, since the haze and surface luster of coating are largely affected by the matte agent, it is preferred to adjust the particle size, shape and particle size distribution of a matte agent as desired during preparation of the matte agent or by mixing plural matte agents.

In one preferred embodiment of the invention, the matte agent is added to the back layer. The back layer should preferably have a degree of matte as expressed by a Bekk smoothness of 10 to 250 seconds, more preferably 50 to 180 seconds.

In the practice of the invention, the matte agent is preferably added to an outermost surface layer on the photothermographic element or a layer serving as the outermost surface layer or a layer near the outer surface, and also preferably to a layer serving as the so-called protective layer. The emulsion-bearing side surface may have any degree of matte insofar as no star dust failures occur although a Bekk smoothness of 500 to 10,000 seconds, especially 500 to 2,000 seconds is preferred.

The emulsion used in the photothermographic element according to the one preferred embodiment of the invention is contained in one or more layers on a support. In the event of single layer construction, it should contain an organic silver salt, silver halide, developing agent, and binder, and other optional additives such as a toner, coating aid and other auxiliary agents. In the event of two-layer construction, a first emulsion layer which is generally a layer disposed adjacent to the support should contain an organic silver salt and silver halide and a second emulsion layer or both the layers contain other components. Also envisioned herein is a two-layer construction consisting of a single emulsion layer containing all the components and a protective topcoat. In the case of multi-color sensitive photothermographic material, a combination of such two layers may be employed for each color. Also a single layer may contain all necessary components as described in U.S. Pat. No. 4,708,928. In the case of multi-dye, multi-color sensitive photothermographic material, emulsion (or photosensitive) layers are distinctly supported by providing a functional or non-functional barrier layer therebetween as described in U.S. Pat. Nos. 4,460,681.

A backside resistive heating layer as described in U.S. Pat. Nos. 4,460,681 and 4,374,921 may be used in a photographic thermographic image recording system according to the present invention.

According to the invention, a hardener may be used in various layers including an image forming layer, protective layer, and back layer. Examples of the hardener include polyisocyanates as described in U.S. Pat. Nos. 4,281,060 and JP-A 08193/1994, epoxy compounds as described in U.S. Pat. No. 4,791,042, and vinyl sulfones as described in JP-A 89048/1987.

A surfactant may be used for the purposes of improving coating and electric charging properties. The surfactants used herein may be nonionic, anionic, cationic and fluorinated ones. Examples include fluorinated polymer surfactants as described in JP-A 170950/1987 and U.S. Pat. No. 5,380,644, fluorinated surfactants as described in JP-A 244945/1985 and 188135/1988, polysiloxane surfactants as described in U.S. Pat. No. 3,885,965, and polyalkylene oxide and anionic surfactants as described in JP-A 301140/1994.

Support

According to the invention, the thermographic emulsion may be coated on a variety of supports. Typical supports include polyester film, subbed polyester film, poly(ethylene terephthalate) film, polyethylene naphthalate film, cellulose nitrate film, cellulose ester film, poly(vinyl acetal) film, polycarbonate film and related or resinous materials, as well as glass, paper, metals, etc. Often used are flexible substrates, typically paper supports, specifically baryta paper and paper supports coated with partially acetylated ?-olefin polymers, especially polymers of ?-olefins having 2 to 10 carbon atoms such as polyethylene, polypropylene, and ethylene-butene copolymers. The supports are either transparent or opaque, preferably transparent. Especially preferred is a biaxially oriented polyethylene terephthalate film of about 75 to 200 μm thick When plastic film is passed through a thermographic processor where it will encounter a temperature of at least 80° C., the film experiences dimensional shrinkage or expansion. When the thermographic element as processed is intended for printing plate purposes, this dimensional shrinkage or expansion gives rise to a serious problem against precision multi-color printing. Therefore, the invention favors the use of a film experiencing a minimal dimensional change, that is, a film which has been biaxially stretched and then properly treated for mitigating the internal distortion left after stretching and for preventing distortion from being generated by thermal shrinkage during subsequent heat development. One exemplary material is polyethylene terephthalate (PET) film which has been heat treated at 100 to 210° C. prior to the coating of a photothermographic emulsion. Also useful are materials having a high glass transition temperature, for example, polyether ethyl ketone, polystyrene, polysulfone, polyether sulfone, polyarylate, and polycarbonate.

The photothermographic element of the invention may have an antistatic or electroconductive layer, for example, a layer containing soluble salts (e.g., chlorides and nitrates), an evaporated metal layer, or a layer containing ionic polymers as described in U.S. Pat. Nos. 2,861,056 and 3,206,312, insoluble inorganic salts as described in U.S. Pat. No. 3,428,451, or tin oxide microparticulates as described in JP-A 252349/1985 and 104931/1982.

A method for producing color images using the photothermographic element of the invention is as described in JP-A 13295/1995, page 10, left column, line 43 to page 11, left column, line 40. Stabilizers for color dye images are exemplified in BP 1,326,889, U.S. Pat. Nos. 3,432,300, 3,698,909, 3,574,627, 3,573,050, 3,764,337, and 4,042,394.

In the practice of the invention, the thermographic photographic emulsion can be applied by various coating procedures including dip coating, air knife coating, flow coating, and extrusion coating using a hopper of the type described in U.S. Pat. No. 2,681,294. If desired, two or more layers may be concurrently coated by the methods described in U.S. Pat. No. 2,761,791 and BP 837,095.

In the photothermographic element of the invention, there may be contained additional layers, for example, a dye accepting layer for accepting a mobile dye image, an opacifying layer when reflection printing is desired, a protective topcoat layer, and a primer layer well known in the photothermographic art. The photosensitive material of the invention is preferably such that only a single sheet of the photosensitive material can form an image. That is, it is preferred that a functional layer necessary to form an image such as an image receiving layer does not constitute a separate member.

The photothermographic element of the invention may be developed by any desired method although it is generally developed by heating after imagewise exposure. The preferred developing temperature is about 80 to 250° C., more preferably 100 to 140° C. The preferred developing time is about 1 to 180 seconds, more preferably about 10 to 90 seconds.

Any desired technique may be used for the exposure of the photothermographic element of the invention. The preferred light source for exposure is a laser, for example, a gas laser, YAG laser, dye laser or semiconductor laser. A semiconductor laser combined with a second harmonic generating device is also useful.

Owing to low haze upon exposure, the photothermographic element of the invention tends to generate interference fringes. Known techniques for preventing generation of interference fringes are a technique of obliquely directing laser light to a photosensitive material as disclosed in JP-A 113548/1993 and the utilization of a multi-mode laser as disclosed in WO 95/31754. Exposure is preferably carried out in combination with these techniques.

Upon exposure of the photothermographic element of the invention, exposure is preferably made by overlapping laser light so that no scanning lines are visible, as disclosed in SPIE, Vol. 169, Laser Printing 116–128 (1979), JP-A 51043/1992, and WO 95/31754.

EXAMPLE

Examples of the invention are given below by way of illustration and not by way of limitation.

Example 1

Organic silver salt dispersion A

A mixture of 40 g of behenic acid, 7.3 g of stearic acid, and 500 ml of distilled water was stirred at 90° C. for 15 minutes. With stirring, 187 ml of 1N NaOH aqueous solution was added over 15 minutes, 61 ml of 1N nitric acid was added, and the solution was cooled to 50° C. Then, 124 ml of an aqueous solution of 1N silver nitrate was added over 2 minutes and stirring was continued for 30 minutes. Thereafter, the solids were separated by suction filtration and washed with water until the water filtrate reached a conductivity of 30 μS/cm. The thus collected solids were handled as a wet cake without drying. To 100 g calculated as dry solids of the wet cake were added 10 g of polyvinyl alcohol (trade name PVA-205 by Kurare K. K.) and water. This was further diluted with water to a total weight of 500 g and pre-dispersed by a homomixer.

The pre-dispersed liquid was processed three times by a dispersing machine Micro-Fluidizer M-110S-EH (with G10Z interaction chamber, manufactured by Microfluidex International Corp.) which was operated under a pressure of 1,750 kg/cm$^2$. There was obtained a dispersion of organic acid silver microcrystalline grains having a volume weighed mean diameter of 0.93 μm as measured by Master Sizer X (Malvern Instruments Ltd.). It is noted that cooling was carried out by mounting serpentine heat exchangers before and after the interaction chamber and adjusting the temperature of the coolant, thereby setting at the desired dispersion temperature.

Silver halide emulsion

In 1000 ml of water were dissolved 27 g of phthalated gelatin, 1.8 g of sodium chloride, and 10 mg of sodium thiosulfonate. The solution was adjusted to pH 5.0 at a temperature of 40° C. To the solution, 120 ml of an aqueous solution containing 60 g of silver nitrate and 120 ml of an aqueous halide solution A containing 21.6 g of sodium chloride were added over 4 minutes by the double jet method. Then, 30 ml of an aqueous solution containing 15 g of silver nitrate and 30 ml of an aqueous halide solution B containing 4.35 g of sodium chloride and 2.13 g of potassium bromide were added over 2 minutes. After 2 g of 4-hydroxy-6-methyl-1,3,3a,7-tetrazaindene was added, desalting was carried out by lowering the pH to cause agglomeration and sedimentation. With 0.1 g of phenoxyethanol added, the emulsion was adjusted to pH 5.9 and pAg 7.6. There were obtained cubic grains of silver chlorobromide having a silver bromide content of 6 mol %, a mean grain size of 0.12 μm, and a coefficient of variation of the projected area diameter of 8%.

The thus obtained silver halide grains were heated at 60° C., to which 85 μmol of sodium thiosulfonate, 11 μmol of 2,3,4,5,6-pentafluorophenyldiphenylphosphine selenide, 15 μmol of Tellurium Compound 1, and 120 μmol of chloroauric acid were added per mol of silver. The emulsion was ripened for 120 minutes.

Thereafter the temperature was lowered to 40° C. With stirring, 6×10$^{-4}$ mol of sensitizing dye D-23 was added per mol of silver halide. After 5 minutes of stirring, 10 mol of an inventive compound or comparative compound as shown in Table 23 was added per mol of the dye. After 5 minutes of stirring, the emulsion was quenched to 25° C., completing the preparation of silver halide grains. In this way, a variety of silver halide grains were prepared.

Note that Tellurium Compound 1, Sensitizing Dye D-23, and comparative compounds used herein have the following chemical structures.

Tellurium Compound 1

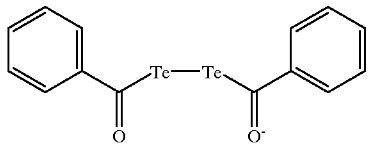

Sensitizing Dye D-23

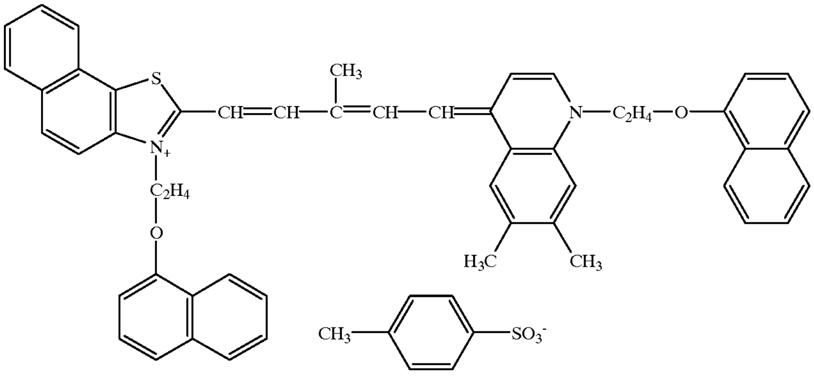

Comparative compound a (described in JP-A 182639/1992 and 341432/1993)

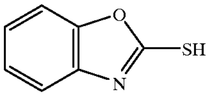

Comparative compound b (described in JP-A 182639/1992 and 341432/1993)

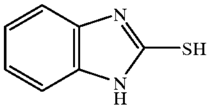

Solid particle dispersions of chemical addenda

Solid particle dispersions of tetrachlorophthalic acid (C-1), 4-methylphthalic acid (C-2), 1,1-bis(2-hydroxy-3,5-dimethylphenyl)-3,5,5-trimethylhexane (C-3), phthalazine (C-4), and tribromomethylphenylsulfone (C-5) were prepared.

(C-1)

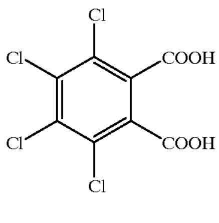

(C-2)

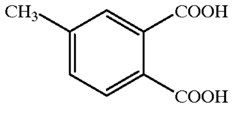

-continued (C-3)

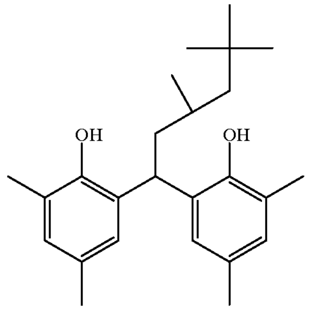

(C-4)

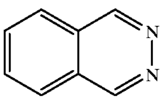

(C-5)

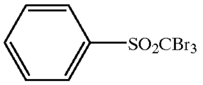

To tetrachlorophthalic acid were added 0.81 g of hydroxypropyl cellulose and 94.2 ml of water. They were thoroughly agitated to form a slurry, which was allowed to stand for 10 hours. A vessel was charged with the slurry together with 100 ml of zirconia beads having a mean diameter of 0.5 mm. A dispersing machine as used above in the preparation of the organic acid silver grain dispersion was operated for 5 hours for dispersion, obtaining a solid particle dispersion of tetrachlorophthalic acid in which particles with a diameter of up to 1.0 μm accounted for 70% by weight.

Solid particle dispersions of the remaining chemical addenda were similarly prepared by properly changing the amount of the dispersing agent and the dispersion time to achieve a desired mean particle size.

Emulsion layer coating solution

To the above-prepared organic silver salt grain dispersion (corresponding to 1 mol of silver), the above-prepared silver halide emulsion, a binder and the dispersions of developing addenda were added, obtaining an emulsion layer coating solution.

| | |
|---|---|
| Organic acid silver microscrystalline dispersion | 1 mol |
| Silver halide emulsion | 0.05 mol |
| Binder: LACSTAR 3307B SBR latex | 430 g |
| Developing addenda: | |
| Tetrachlorophthalic acid | 5 g |
| 1,1-bis(2-hydroxy-3,5-dimethylphenyl)-3,5,5-trimethylhexane | 98 g |
| Phthalazine | 9.2 g |
| Tribromomethylphenylsulfone | 12 g |
| 4-methylphthalic acid | 7 g |
| Contrast enhancer (Table 23) | (Table 23) |

It is noted that the type and amount of a contrast enhancer are shown in Table 23, the amount being expressed by moles per mole of silver originating from silver halide and silver behenate combined. Contrast enhancers H-125a and B-1 have the following formulas.

H-125a

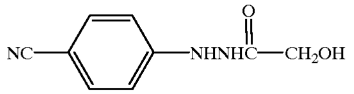

B-1

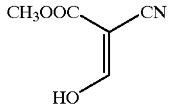

It is noted that LACSTAR 3307B is a styrene-butadiene rubber (SBR) latex commercially available from Dai-Nippon Ink & Chemicals K. K. wherein the polymer has an equilibrium moisture content of 0.6 wt % at 25° C. and RH 60% and the dispersed particles have a mean particle diameter of about 0.1 to 0.15 μm. The polymer had a Tg of 13° C. as measured by differential scanning colorimetry (DSC).

Emulsion surface protective layer coating solution

An emulsion surface protective layer coating solution was prepared by adding the following components to inert gelatin.

| | |
|---|---|
| Inert gelatin | 10 g |
| Surfactant A | 0.26 g |
| Surfactant B | 0.09 g |
| Silica microparticulates (mean particle size 2.5 μm) | 0.9 g |
| 1,2-bis(vinylsulfonylacetamide)ethane | 0.3 g |
| Water | 64 g |

Surfactant A

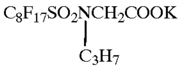

Surfactant B

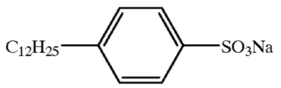

Back layer coating solution

To 64 g of 2-propanol were added 6 g of polyvinyl butyral (Denka Butyral #4000-2, by Denki Kagaku Kogyo K. K.), 0.2 g of spherical silica Sildex H121 (mean particle size 12 μm, by Dokai Chemical K. K.), 0.2 g of spherical silica Sildex H51 (mean particle size 5 μm, by Dokai Chemical K. K.), and 0.1 g of fluorinated surfactant Megafac F-176P (Dai-Nippon Ink & Chemicals K. K.). The mixture was stirred for mixing and dissolution. A solution containing 420 mg of Dyestuff A in 10 g of methanol and 20 g of acetone and a solution containing 0.8 g of 3-isocyanatomethyl-3,5,5-trimethylhexyl isocyanate in 6 g of ethyl acetate were then added, obtaining a back layer coating solution.

Dyestuff A

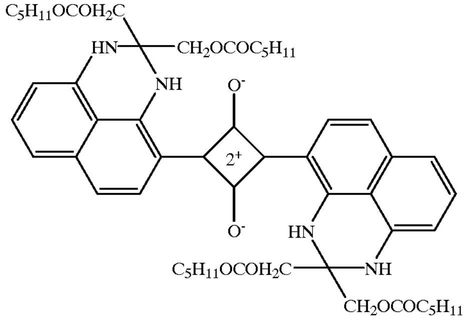

Coated sample

Onto one surface of a polyethylene terephthalate support, the emulsion layer coating solution was coated so as to give a silver coverage of 1.6 $g/m^2$. The emulsion surface protective layer coating solution was then coated on the emulsion layer so as to give a gelatin coverage of 1.8 $g/m^2$. After drying, the back layer coating solution was coated onto the surface of the support opposite to the emulsion layer so as to give an optical density of 0.7 at 780 nm, obtaining a coated sample.

Photograhic property test

The samples prepared above were exposed to xenon flash light for an emission time of 10–4 sec through an interference filter having a peak at 780 nm and a step wedge and heated for development at 115° C. for 25 seconds. The resulting images were determined for density by a densitometer. The sensitivity ($S_{1.5}$) is the reciprocal of a ratio of the exposure providing a density of Dmin+1.5. The gradient of a straight line connecting points of density 0.3 and 3.0 on a characteristic curve is also reported as gradation G0330. The results are shown in Table 23.

Aging test

To estimate how photographic properties change during long-term storage, the samples were aged for 3 days under conditions of 50° C. and RH 75% (forcedly aged samples) before the photographic test. As a comparative aging test, the samples were stored in a refrigerator at 4° C. before the photographic test to determine a relative sensitivity providing a density 1.5. Age stability was determined according to the following equation.

Age stability (%)=(sensitivity of forcedly aged sample)/(sensitivity of comparative aged sample)x100 An age stability equal to 100% indicates best age stability. A lower age stability indicates desensitization during aging, and a higher age stability indicates sensitization during aging.

The results are shown in Table 23.

TABLE 23

| Sample | Contrast enhancer | | Sensitizing dye | Compound of formula (I) | | | Age stability |
|---|---|---|---|---|---|---|---|
| No. | Type | Amount (mol/mol Ag) | Type | Type | S1.5 | G0330 | (%) |
| 101* | none | none | D-23 | none | 10 | 4 | ≦30 |
| 102* | none | none | D-23 | comparative compound a | 15 | 4 | ≦30 |
| 103* | none | none | D-23 | comparative compound b | 20 | 4 | 60 |
| 104 | none | none | D-23 | 2 | 18 | 4 | 89 |
| 105 | none | none | D-23 | 19 | 18 | 4 | 89 |
| 106 | none | none | D-23 | 51 | 75 | 5 | 95 |
| 107 | none | none | D-23 | 52 | 70 | 5 | 95 |
| 108 | none | none | D-23 | 53 | 80 | 5 | 95 |
| 109 | none | none | D-23 | 31 | 90 | 5 | 98 |
| 110 | none | none | D-23 | 32 | 100 | 5 | 98 |
| 111* | H-125a | $6.4 \times 10^{-2}$ | D-23 | none | 20 | 8 | ≦30 |
| 112* | H-125a | $6.4 \times 10^{-2}$ | D-23 | comparative compound a | 30 | 8 | ≦30 |
| 113* | H-125a | $6.4 \times 10^{-2}$ | D-23 | comparative compound b | 40 | 6 | 55 |
| 114 | H-125a | $6.4 \times 10^{-2}$ | D-23 | 2 | 40 | 12 | 85 |
| 115 | H-125a | $6.4 \times 10^{-2}$ | D-23 | 19 | 40 | 12 | 85 |
| 116 | H-125a | $6.4 \times 10^{-2}$ | D-23 | 51 | 210 | 15 | 92 |
| 117 | H-125a | $6.4 \times 10^{-2}$ | D-23 | 52 | 200 | 15 | 92 |
| 118 | H-125a | $6.4 \times 10^{-2}$ | D-23 | 53 | 230 | 15 | 92 |
| 119 | H-125a | $6.4 \times 10^{-2}$ | D-23 | 31 | 275 | 18 | 95 |
| 120 | H-125a | $6.4 \times 10^{-2}$ | D-23 | 32 | 300 | 18 | 95 |
| 121* | B-1 | $1.4 \times 10^{-2}$ | D-23 | none | 25 | 18 | ≦30 |
| 122* | B-1 | $1.4 \times 10^{-2}$ | D-23 | comparative compound a | 35 | 9 | ≦30 |
| 123* | B-1 | $1.4 \times 10^{-2}$ | D-23 | comparative compound b | 50 | 8 | 55 |
| 124 | B-1 | $1.4 \times 10^{-2}$ | D-23 | 2 | 55 | 14 | 85 |
| 125 | B-1 | $1.4 \times 10^{-2}$ | D-23 | 19 | 55 | 14 | 85 |
| 126 | B-1 | $1.4 \times 10^{-2}$ | D-23 | 51 | 250 | 18 | 95 |
| 127 | B-1 | $1.4 \times 10^{-2}$ | D-23 | 52 | 245 | 18 | 95 |
| 128 | B-1 | $1.4 \times 10^{-2}$ | D-23 | 53 | 280 | 18 | 95 |
| 129 | B-1 | $1.4 \times 10^{-2}$ | D-23 | 31 | 320 | 20 | 98 |
| 130 | B-1 | $1.4 \times 10^{-2}$ | D-23 | 32 | 360 | 20 | 98 |

*comparison

It is evident from Table 23 that as compared with the comparative samples, the samples falling with the range of the invention exhibit higher sensitivity and higher contrast and experience a minimized variation of sensitivity during aging. The sensitivity and contrast are drastically enhanced when contrast enhancers are used in combination with the compounds of the invention.

There have been described photothermographic elements which exhibit a high sensitivity and a high contrast and experience a minimized variation of sensitivity during aging.

EXAMPLE 2

Silver halide emulsion A

In 700 ml of water were dissolved 11 g of phthalated gelatin, 30 mg of potassium bromide, and 10 mg of sodium benzenethiosulfonate. The solution was adjusted to pH 5.0 at a temperature of 55° C. To the solution, 159 ml of an aqueous solution containing 18.6 g of silver nitrate and an aqueous solution containing 1 mol/liter of potassium bromide were added over 6.5 minutes by the controlled double jet method while maintaining the solution at pAg 7.7. Then, 476 ml of an aqueous solution containing 55.5 g of silver nitrate and an aqueous halide solution containing 1 mol/liter of potassium bromide were added over 28.5 minutes by the controlled double jet method while maintaining the solution at pAg 7.7. The solution was then desalted by lowering its pH for flocculation and sedimentation. With 0.17 g of Compound A and 23.7 g of deionized gelatin (having a calcium content of less than 20 ppm) added, the solution was adjusted to pH 5.9 and pAg 8.0. There were obtained cubic grains having a mean grain size of 0.11 μm, a coefficient of variation of the projected area of 8%, and a (100) face proportion of 93%.

The thus obtained silver halide grains were heated at 60° C., to which 76 μmol of sodium benzenethiosulfonate was added per nol of silver. After 3 minutes, 154 μmol of sodium thiosulfate (per mol of silver) was added to the solution, which was ripened for 100 minutes.

Thereafter, while the solution was kept at 40° C., $12.8\times10^{-4}$ mol of a sensitizing dye as shown in Table 24 and $6.4\times10^{-3}$ mol of a compound of formula (I) or Comparative Compound T as shown in Table 24 were added per mol of silver halide with stirring. After 20 minutes, the emulsion was quenched to 30° C., completing the preparation of silver halide emulsion A.

Compound A

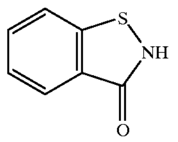

Comparative Compound T

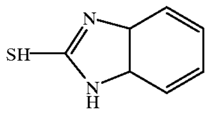

Organic acid silver dispersion A

A mixture of 6.1 g of arachidic acid, 37.6 g of behenic acid, 700 ml of distilled water, 70 ml of tertbutanol, and 123 ml of a 1N NaOH aqueous solution was stirred for reaction at 75° C. for 1 hour and then cooled to 65° C. Then 112.5 ml of an aqueous solution containing 19.2 g of silver nitrate was added over 45 seconds to the solution, which was allowed to stand for 5 minutes and then cooled to 30° C. Thereafter, the solids were separated by suction filtration and washed with water until the water filtrate reached a conductivity of 30 μS/cm.

The thus collected solids were handled as wet cake without drying. To 100 g calculated as dry solids of the wet cake were added 5 of polyvinyl alcohol (trade name: PVA-205) and water. This was further diluted with water to a total weight of 500 g and pre-dispersed by a homomixer.

The pre-dispersed liquid was processed three times by a dispersing machine Micro-Fluidizer M-110S-EH (with G10Z interaction chamber, manufactured by Microfluidex International Corp.) which was operated under a pressure of 1,750 kg/$cm^2$. There was obtained an organic acid silver dispersion A. This dispersion contained needle grains of organic acid silver having a mean minor diameter of 0.04 μm, a mean major diameter of 0.8 μm, and a coefficient of variation of 30%. The grain size was measured by Master Sizer X (Malvern Instruments Ltd.) . Cooling was carried out by mounting serpentine heat-exchangers before and after the interaction chamber and adjusting the temperature of the coolant, thereby setting the desired dispersion temperature. There was obtained organic acid silver A having a silver behenate content of 85 mol %.

Solid particle dispersion of 1,1-bis(2-hydroxy-3,5-dimethylphenyl)-3.5,5-trimethylhexane (C-3)

To 20 g of 1,1-bis(2-hydroxy-3,5-dimethylphenyl)-3,5,5-trimethylhexane were added 3.0 g of polyvinyl alcohol MP-203 (by Kurare K. K.) and 77 ml of water. They were thoroughly agitated to form a slurry, which was allowed to stand for 3 hours. A vessel was charged with the slurry together with 360 g of zirconia beads having a mean diameter of 0.5 mm. A dispersing machine 1/4G Sand Grinder Mill (Imex K. K.) was operated for 3 hours for dispersion, obtaining a solid particle dispersion of the reducing agent in which particles with a diameter of 0.3 to 1.0 μm accounted for 80% by weight.

Solid particle dispersion of tribromomethylphenylsulfone (C-5)

To 30 g of tribromomethylphenylsulfone were added 0.5 g of hydroxypropyl methyl cellulose, 0.5 g of Compound C, and 88.5 g of water. They were thoroughly agitated to form a slurry, which was allowed to stand for 3 hours. The subsequent procedure was the same as in the preparation of the solid particle dispersion of reducing agent. There was obtained a solid particle dispersion of the antifoggant in which particles with a diameter of 0.3 to 1.0 μm accounted for 80% by weight.

Preparation of emulsion layer coating solution

To the above-prepared organic acid silver microcrystalline dispersion (corresponding to 1 mol of silver), the above-prepared silver halide emulsion A, a binder and the dispersions of developing addenda were added, and water added, obtaining an emulsion layer coating solution.

Binder:

| | |
|---|---|
| LACSTAR 3307B SBR latex | 470 g (as solids) |
| Developing addenda: | |
| 1,1-bis(2-hydroxy-3,5-dimethylphenyl)-3,5,5-trimethylhexane | 110 g (as solids) |
| Tribromomethylphenylsulfone | 25 g (as solids) |
| Sodium benzenethiosulfonate | 0.25 g |

-continued

| | |
|---|---|
| Polyvinyl alcohol (MP-203 by Kurare K.K.) | 46 g |
| 6-iso-butylphthalazine | 0.12 mol |
| Dyestuff A | 0.62 g |
| Contrast enhancer (Table 24) | (Table 24) |
| Silver halide emulsion A | 0.05 mol (as Ag) |

It is noted that LACSTAR 3307B is a styrene-butadiene rubber (SBR) latex commercially available from Dai-Nippon Ink & Chemicals K. K. wherein the polymer has an equilibrium moisture content of 0.6 wt % at 25° C. and RH 60% and the dispersed particles have a mean particle diameter of about 0.1 to 0.15 μm. The polymer had a Tg of 17° C.

Compound C

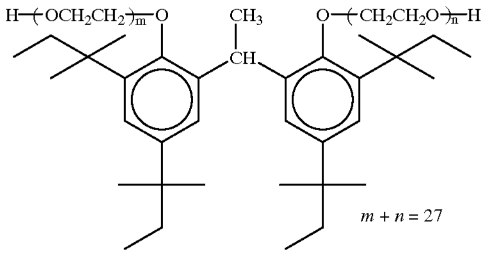

Dyestuff A

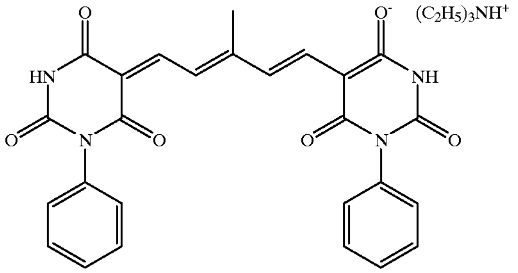

Emulsion surface Drotective layer coating solution

An emulsion surface protective layer coating solution was prepared by adding 3.75 g of $H_2O$ to 109 g of a polymer latex having a solid content of 27.5% (methyl methacrylate/styrene/2-ethylhexyl acrylate/2-hydroxyethyl methacrylate/methacrylic acid=59/9/26/5/1 copolymer, Tg=55° C.), adding 4.5 g of benzyl alcohol as a film-forming aid, 0.45 g of Compound D, 0.125 g of Compound E, 0.0125 mol of Compound F, and 2.25 g of polyvinyl alcohol (PVA-217 by Kurare K. K.), and further adding water to a total weight of 150 g.

Compound D

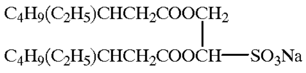

Compound E

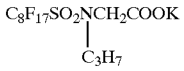

Compound F

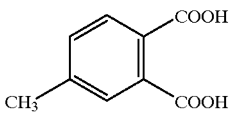

PET support with back and subbing layers (1) Preparation of support

Using terephthalic acid and ethylene glycol, a polyethylene terephthalate (PET) having an intrinsic viscosity of 0.66 as measured in a phenol/tetrachloroethane 6/4 (weight ratio) mixture at 25° C. was prepared in a conventional manner. After the PET was pelletized and dried at 130° C. for 4 hours, it was melted at 300° C., extruded through a T-shaped die, and quenched to form an unstretched film having a thickness sufficient to give a thickness of 120 μm after heat curing.

The film was longitudinally stretched by a factor of 3.3 by means of rollers having different circumferential speeds and then transversely stretched by a factor of 4.5 by means of a tenter. The temperatures in these stretching steps were 110° C. and 130° C., respectively. Thereafter, the film was heat cured by heating at 240° C. for 20 seconds and then transversely relaxed 4% at the same temperature. Thereafter, with the chuck of the tenter being slit and the opposite edges being knurled, the film was taken up under a tension of 4.8 kg/cm². In this way, a film of 2.4 m wide, 3,500 m long and 120 μm thick was obtained in a roll form.

| | |
|---|---|
| (2) Subbing layer (a) | |
| Polymer Latex 1 (styrene/butadiene/hydroxyethyl methacrylate/divinyl benzene = 67/30/2.5/0.5 wt % copolymer) | 160 mg/m² |
| 2,4-dichloro-6-hydroxy-s-triazine | 4 mg/m² |
| Matte agent (polystyrene, mean particle size 2.4 μm) | 3 mg/m² |
| (3) Subbing layer (b) | |
| Deionized gelatin ($Ca^{++}$ content 0.6 ppm, jelly strength 230 g) | 50 mg/m² |
| (4) Conductive layer | |
| Jurimer ET-410 (Nippon Junyaku K.K.) | 96 mg/m² |
| Alkali-treated gelatin (molecular weight ~10,000, $Ca^{+-}$ content 30 ppm) | 42 mg/m² |
| Deionized gelatin ($Ca^{++}$ content 0.6 ppm) | 8 mg/m² |
| Compound A | 0.2 mg/m² |
| Polyoxyethylene phenyl ether | 10 mg/m² |
| Sumitex Resin M-3 (water-soluble melamine compound, Sumitomo Chemical Industry K.K.) | 18 mg/m² |
| Dyestuff A | coating weight to give an optical density 1.0 at 780 nm |
| $SnO_2$/Sb (9/1 weight ratio, needle particles, major/minor diameter = 20 to 30, Ishiwara Industry K.K.) | 160 mg/m² |
| Matte agent (polymethyl methacrylate, mean particle size 5 μm) | 7 mg/m² |

-continued

| | |
|---|---|
| (5) Protective layer | |
| Polymer latex 2 (methyl methacrylate/styrene/2-ethylhexyl acrylate/2-hydroxyethyl methacrylate/methacrylic acid = 59/9/26/5/1 wt % copolymer) | 1000 mg/m² |
| Polystyrene sulfonate (molecular weight 1000–5000) | 2.6 mg/m² |
| Cellosol 524 (Chukyo Yushi K.K.) | 25 mg/m² |
| Sumitex Resin M-3 (water-soluble melamine compound, Sumitomo Chemical Industry K.K.) | 218 mg/m² |

On one surface of a support, the subbing layer (a) and the subbing layer (b) each were successively coated and dried at 180° C. for 4 minutes. On the other surface of the support opposite to the one surface where subbing layer (a) and subbing layer (b) had been coated, the conductive layer and the protective layer each were successively coated and dried at 180° C. for 4 minutes. There was obtained the PET support with the back/subbing layers.

(5) Heat treatment on feed

The PET support with the back/subbing layers was automatically fed at a feed speed of 20 m/min. through a heat treating zone of 30 m in overall length which was set at a temperature of 1600C and a tension of 14 g/cm². The PET support was then passed through a zone of 40° C. for 15 seconds and taken up into a roll under a take-up tension of 10 kg/cm².

Compound A

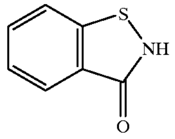

Dyestuff A

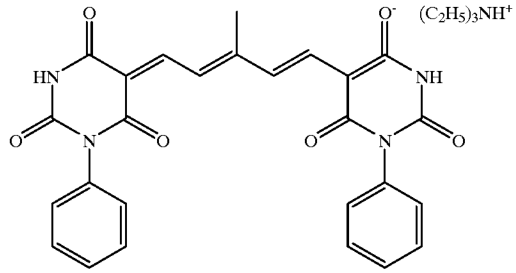

Photothermoarahic samples

On the PET support with the back/subbing layers, the emulsion layer coating solution was applied to the subbing layer so as to give a silver coverage of 1.6 g/m². Concurrent with the emulsion layer coating solution, the emulsion surface protective layer coating solution was applied thereon so as to give a coverage of 2.0 g/m² of the polymer latex.

Photographic test

After the samples prepared above were exposed to xenon flash light for an emission time of $10^{-6}$ sec. through an interference filter having a peak at 780 nm and a step wedge, they were heat developed at 115° C. for 20 seconds by means of a heat developing apparatus.

The resulting images were measured for visible density by means of a Macbeth TD904 densitometer. A minimum density (Dmin), a sensitivity (reciprocal of a ratio of an exposure dose providing a density of Dmin+1.0), and contrast were measured. The sensitivity was expressed in a relative value based on a sensitivity of 100 for photographic sample No. 4. The contrast was expressed by the gradient of a straight line connecting points of density 0.3 and 1.0 in a graph wherein the logarithm of the exposure dose is on the abscissa.

The results are shown in Table 24.

TABLE 24

| Photothermographic sample No. | Contrast enhancer | Addition amount | Sensitizing dye of formula (S) | Compound of formula (I) | Dmin | Relative sensitivity | Contrast | Remarks |
|---|---|---|---|---|---|---|---|---|
| 1 | — | — | comparative dye 1 | — | 0.08 | 6 | unmeasurable | — |
| 2 | — | — | comparative dye 1 | 32 | 0.08 | 40 | 3 | invention |
| 3 | — | — | S-19 | — | 0.08 | 16 | unmeasurable | — |
| 4 | — | — | S-19 | 32 | 0.08 | 100 | 5 | invention |
| 5 | H-42 | $5 \times 10^{-3}$ | S-19 | — | 0.12 | 32 | 4 | — |
| 6 | H-42 | $5 \times 10^{-3}$ | S-19 | 32 | 0.11 | 200 | 12 | invention |
| 7 | H-42 | $5 \times 10^{-3}$ | S-19 | 57 | 0.10 | 180 | 10 | invention |
| 8 | H-42 | $5 \times 10^{-3}$ | S-19 | 51 | 0.11 | 190 | 11 | invention |
| 9 | H-42 | $5 \times 10^{-3}$ | S-20 | 51 | 0.10 | 195 | 11 | invention |
| 10 | H-42 | $5 \times 10^{-3}$ | comparative dye 1 | 51 | 0.12 | 78 | 8 | invention |
| 11 | H-1 | $5 \times 10^{-3}$ | S-20 | 57 | 0.10 | 185 | 10 | invention |
| 12 | H-1 | $5 \times 10^{-3}$ | comparative dye 1 | 57 | 0.12 | 74 | 7 | invention |
| 13 | H-8 | $5 \times 10^{-3}$ | S-20 | 57 | 0.10 | 190 | 11 | invention |
| 14 | H-8 | $5 \times 10^{-3}$ | comparative dye 1 | 57 | 0.12 | 76 | 7 | invention |
| 15 | 54a | $5 \times 10^{-3}$ | S-20 | 57 | 0.11 | 190 | 11 | invention |
| 16 | 54a | $5 \times 10^{-3}$ | comparative dye 1 | 57 | 0.13 | 76 | 7 | invention |
| 17 | 54a | $5 \times 10^{-3}$ | S-20 | Comparative compound T | 0.26 | 180 | unmeasurable | |

Comparative compound T 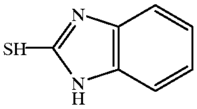

It is evident that the samples within the scope of the invention exhibit low fog, high contrast and high sensitivity.

Japanese Patent Application No. 287891/1997 is incorporated herein by reference.

Reasonable modifications and variations are possible from the foregoing disclosure without departing from either the spirit or scope of the present invention as defined by the claims.

What is claimed is:

1. A photothermographic element comprising on a support a non-photosensitive organic silver salt, a photosensitive silver halide which has been formed independent of the non-photosensitive organic silver salt, and a binder, said photothermographlic element further comprising an image forming layer which contains the photosensitive silver halide, a binder, a synthetic latex of a polymer having a glass transition temperature of −30° C. to 40° C. accounting for at least 50% by weight of the binder, and at least one compound of the following formula (I):

(I)

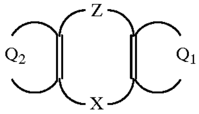

wherein X is —N═, —N(R)—, —O—, or —S—, wherein R is hydrogen, hydroxyl, aliphatic hydrocarbon, aryl or heterocyclic group, Z is a single bond or a group of non-metallic atoms necessary to form a 5- to 7-membered ring with X, and $Q_1$ and $Q_2$ each are a group of non-metallic atoms necessary to form an aromatic hydrocarbon ring or aromatic heterocyclic ring fused to the ring completed by Z.

2. The photothermographic element of claim 1 wherein the compound of formula (I) is a compound of the following formula (IIa) or (IIb):

(IIa)

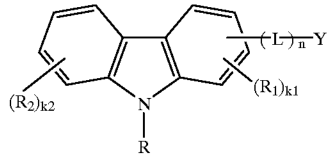

(IIb)

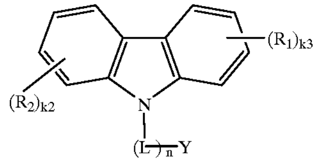

wherein R is hydrogen, hydroxyl, aliphatic hydrocarbon, aryl or heterocyclic group, $R_1$ and $R_2$ each are a monovalent substituent, Y is a group for promoting adsorption to the silver halide, L is a divalent linkage group, letter n is equal to 0 or 1, $k_1$ is an integer of 0 to 3, $k_2$ is an integer of 0 to 4, and $k_3$ is an integer of 0 to 4.

3. The photothermographic element of claim 1 which contains on the same side of the support as the image forming layer at least one compound of formula (I) and at least one sensitizing dye of the following formula (S):

(S)

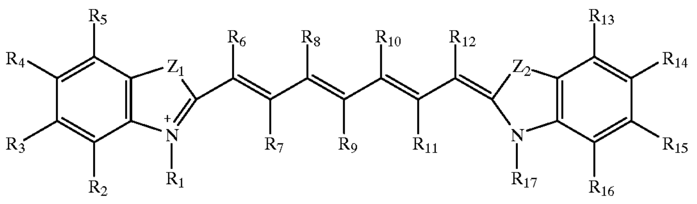

wherein $Z_1$ and $Z_2$ each are S, O or Se, $R_1$ and $R_{17}$ are independently alkyl or sulfoalkyl groups, at least one of which may have substituted thereon a fluoro, chloro, bromo, iodo, alkoxy, aryloxy or ester group, $R_2$ to $R_5$, and $R_{13}$ to $R_{16}$ are independently hydrogen, chloro, bromo, fluoro, nitro, cyano, keto, sulfo, carboxy, ester, sulfonamide, amide, dialkylamino, alkyl, alkenyl, heterocyclic, aryl, alkoxy or aryloxy group which may be substituted or unsubstituted, or $R_2$ and $R_3$, $R_3$ and $R_4$, $R_4$ and $R_5$, $R_{13}$ and $R_{14}$, $R_{14}$ and $R_{15}$, and $R_{15}$ and $R_{16}$, taken together, may form a substituted or unsubstituted benzene ring, $R_6$ to $R_{12}$ are independently hydrogen, substituted or unsubstituted alkyl, chloro, fluoro, bromo, iodo, unsubstituted amino, and when substituted, the substituent may form a 5- or 6-membered heterocyclic ring, or $R_6$ and $R_8$, $R_8$ and $R_{10}$, $R_{10}$ and $R_{12}$, and $R_9$ and $R_{11}$, taken together, may form a substituted or unsubstituted 5- or 6-membered carbocyclic or heterocyclic ring, $R_7$ and $R_9$, taken together, may form a 5- or 6-membered heterocyclic ring or 5-membered carbocyclic ring, $R_1$ and $R_6$, and $R_{12}$ and $R_{17}$, taken together, may form a substituted or unsubstituted 5- or 6-membered heterocyclic ring, and X is an ion for rendering the ionic charge of the dye neutral.

4. The photothermographic element of claim 1 wherein the image forming layer and/or a layer adjacent thereto contains at least one contrast enhancer.

5. The photothermographic element of claim 1 wherein the silver halide has been spectrally sensitized in the wavelength range of 750 to 1,400 nm.

6. The photothermographic element of claim 1 wherein the image forming layer has been formed by applying a coating solution of components in a solvent containing at least 60% by weight of water.

* * * * *

UNITED STATES PATENT AND TRADEMARK OFFICE

CERTIFICATE OF CORRECTION

PATENT NO. : 6,153,372
DATED : November 28, 2000
INVENTOR(S) : Tsutomu Arai et al.

It is certified that error appears in the above-identified patent and that said Letters Patent is hereby corrected as shown below:

Column 140, claim 1,
Line 2, after "by Z" please insert the following: -- , wherein said at least one compound of formula (I) contains a group promoting adsorption to silver halide --.

Signed and Sealed this

Eighth Day of January, 2002

Attest:

JAMES E. ROGAN
*Director of the United States Patent and Trademark Office*

*Attesting Officer*